United States Patent
Mir

(10) Patent No.: US 10,836,551 B1
(45) Date of Patent: Nov. 17, 2020

(54) RESEALABLE PACKAGING DEVICE AND METHOD FOR PACKAGING FOOD PRODUCT

(71) Applicant: Nazir Mir, Somerset, NJ (US)

(72) Inventor: Nazir Mir, Somerset, NJ (US)

(*) Notice: Subject to any disclaimer, the term of this patent is extended or adjusted under 35 U.S.C. 154(b) by 0 days.

(21) Appl. No.: 16/713,783

(22) Filed: Dec. 13, 2019

Related U.S. Application Data

(63) Continuation-in-part of application No. 16/365,871, filed on Mar. 27, 2019, now Pat. No. 10,589,917, and a continuation-in-part of application No. 16/672,456, filed on Nov. 2, 2019.

(51) Int. Cl.

| | |
|---|---|
| *B65D 75/62* | (2006.01) |
| *B65D 81/18* | (2006.01) |
| *B65D 85/34* | (2006.01) |
| *A23B 7/148* | (2006.01) |
| *B32B 7/12* | (2006.01) |
| *B32B 3/26* | (2006.01) |
| *B65D 75/58* | (2006.01) |
| *B65D 75/36* | (2006.01) |
| B65B 25/04 | (2006.01) |
| B65D 77/20 | (2006.01) |

(52) U.S. Cl.
CPC ....... *B65D 75/5855* (2013.01); *B65D 75/366* (2013.01); *A23B 7/148* (2013.01); *B65B 25/041* (2013.01); *B65D 77/2096* (2013.01); *B65D 2565/388* (2013.01); *B65D 2575/586* (2013.01)

(58) Field of Classification Search
CPC .............. B65D 75/5855; B65D 75/366; B65D 77/2096; B65D 2565/388; B65D 2575/586; B65D 81/2069; B65D 85/34; B65D 2577/2025; B65D 2577/2091; B65D 75/5838; B65D 77/2024; B65D 81/20; B65B 25/041; A23B 7/152; A23B 4/16; A23B 7/148; A23V 2002/00
See application file for complete search history.

(56) References Cited

U.S. PATENT DOCUMENTS

2010/0221393 A1* 9/2010 Lim ................. A23B 7/148
426/124

* cited by examiner

*Primary Examiner* — Yan Lan
(74) *Attorney, Agent, or Firm* — Rueppell Consulting; Chris Rueppell

(57) ABSTRACT

A packaging device incorporating a breathable peel/reseal film and enabling a preservation process for allowing for the distribution, storage and multiple servings of a food product, particularly perishable food product(s), and initiating and controlling the transmission rates, respiration rates or deterioration of the perishable food product(s) and thereby, maintaining good internal and external food quality and normal development of flavor and aroma characteristics. The packaging device includes a plurality of atmospheric control attributes that modulates or controls the atmosphere within the packaging device as the food product(s) respire in order to promote the extended shelf-life of the food product and the maintenance of the quality and desirable marketable characteristics of the food product. The atmospheric control attributes can include perforations that may be positioned in breathable peel/reseal film portion of the package to allow the product respiration for multiple servings without substantially altering the shelf life extension properties of the packaging device.

20 Claims, 23 Drawing Sheets

RESEALABLE PACKAGING DEVICE AND METHOD FOR PACKAGING FOOD PRODUCT

CROSS-REFERENCE TO RELATED APPLICATION(S)

This application claims the benefit and priority of and is a continuation-in-part of U.S. patent application Ser. No. 16/540,001, filed Mar. 27, 2019, and U.S. patent application Ser. No. 16/672,456, filed on Nov. 2, 2019, both applications are herein incorporated by reference in their entireties.

FIELD OF THE INVENTION

The present invention generally relates to the field of packaging for food products, including perishable food products, and particularly to a package and method of packaging perishable food products which optimizes the food product life, provides the food product in a ready to eat form, and allows the package with breathable peel-reseal function for multiple servings.

Fruits and vegetables have been receiving considerable attention as consumers become more health conscious. Health benefits associated with regular consumption of fresh fruits and vegetables such as blueberries, cranberries, strawberries, apple, carrots, broccoli and tomato are generally well recognized (Clemens, 2015; Nile & Park, 2014).

Health conscious consumers are increasingly spending more on fresh produce and are buying new value-added fresh-produce products (Heneghan, 2016). Value-added fresh-produce products include fresh-cut fruits and vegetables, such as carrots, broccoli, cauliflower, corn, leafy greens, strawberries, blueberries, apple, grapes, cranberries etc., which are offered for sale in a pre-packaged form. This type of value-added benefit, which provides the product in a Ready-to-Eat form, may allow the consumer to consume the product while still within the package, if breathable peel-reseal function is added to the package.

The US fresh vegetables and fruits was valued at $104.7 billion (Grand-View-Research, 2018) and these value-added products comprise the most rapidly growing segment of the fresh produce industry as well as one of the most rapidly growing categories in the supermarket and food service markets. This growth is evidenced by facts, such as that value-added produce represented about 17% of total produce department sales; value added fruits and vegetables had more than 8% and 10% increase from 2011 to 2015, respectively (Cook, 2016). Retail sales of packaged salads increased 8% to $3.7 billion from 2015 to 2016 (Watson, 2016). Additionally, the percentage of health-conscious consumers is increasing, as more and more consumers demand healthier, safer, and environmentally friendly food products. Concurrently, the consumer recognizes the functional properties of produce, such as lycopene in tomato and other anti-carcinogenic compounds in many fruits and vegetables.

In addition to increased fruit and vegetable consumption, the demand for high quality, variety and convenience of fresh produce products has also increased (Schouten, 2017). The explosion in produce department offerings in supermarkets evidences this trend. For instance, the entry of premium priced greenhouse vegetable products into US supermarkets from Spain, Israel, The Netherlands and Canada provide an indication that the consumer is looking for premium quality produce and may be willing to pay the associated premium price (Agriculture and Agri-Food Canada, 2016). As described previously, this growing market demand has resulted in the fresh-cut fruit and vegetable industry experiencing significant growth over the past few years.

One of the major factors contributing to successfully increasing consumption of fruit and vegetables is delivering products with good quality. Efforts to maintain the quality of lightly processed perishable products (fresh fruit and vegetables) throughout the processes of distribution and storage has focused on modifying or controlling the internal atmospheric environment provided by the packages within which these products are distributed and stored (Oliveira, Abadias, Usall, Torres, Teixido, & Villas, 2015). The atmospheric modification which takes place in packages may be dependent upon several variables such as permeability of the material of the package, respiration rate of the perishable product and temperature during distribution and storage (Ben-Yehoshua, Beaudry, Fishman, Jayanty, & Mir, 2005; Mir & Beaudry, 2016). Currently, there are techniques which attempt to modify or control the atmosphere within the package(s) containing these products. Typically, these controlled atmosphere packaging devices utilize regimes similar to those of controlled-atmosphere storage. Unfortunately, these controlled-atmosphere regimes may not provide optimal atmospheric conditions within the package for the various products during their distribution and storage, which may result in premature fermentation (degradation) of the product within. This premature fermentation may result in decreased shelf-life of the perishable food products which in turn may result in decreased sales of the products.

The Ready-to-Eat packaging devices mentioned above may provide a simplified meal alternative or may allow for the packaged product to be consumed in multiple servings while still maintaining the quality with breathable peel-reseal function. Current technology provides packaging devices which allow the package, including the product within, to be stored without optimum package atmospheres which reduces shelf life and product quality. Non-breathable peel-reseal packaging may not employ any modified atmosphere capabilities or simply employ those which are currently known and do not optimize product life. Therefore, fermentation (degradation) of the food product may result after a shortened product life making the product aesthetically undesirable and possibly nutritionally compromised.

Therefore it would be desirable to provide a packaging device and method of packaging food products, including fresh produce and other perishable foods, which promotes atmospheric conditions within the package that promotes the prolonging of shelf-life of food product and the maintenance of excellent food product quality during the life-cycle of the packaged food product, including throughout the food product processing, and may also allow the food to be served in multiple offerings in situ, allowing maximum quality and nutrient retention.

SUMMARY OF THE INVENTION

Accordingly, exemplary embodiments of the present invention provide a breathable, peelable and resealable film structure and/or device or container able to connect with and/or thereby, utilize the breathable, peelable and resealable film structure. It is further contemplated that the current invention provides a resealable packaging device(s) and/or system(s) comprising the breathable, peelable and resealable film structure in connection with various rigid or flexible packaging devices, containers and/or constructs. Still further, the current invention contemplates method(s) of prolonging the shelf-life of food products by utilizing the resealable film structure and/or packaging device or system for the enclosing of food products, thereby promoting an extended life-cycle of processing and use of the food product. Other contemplated method(s) of the current invention can provide for the manufacturing of exemplary resealable films and/or resealable packaging devices for promoting the extended shelf-life of food product to be enclosed therein.

It is an object of the current invention in providing for the enclosure of food products within to actively and/or passively promote various atmospheric conditions by and due to the presence of one or more atmospheric control attributes, including without limitation perforations (micro- and/or macro-), slits, slots, micropores, and the like. Further, by affecting atmospheric conditions, another object of the current invention is to support the life-cycle of food products in the enclosure. As such, it is contemplated that an object of the current invention is to affect the life-cycle of the food products located within, which can include without limitation the processing, packing, handling, ripening, transporting, distribution, marketing, storing, consumption and/or such other activities that may comprise the life-cycle of the food products located within or from an exemplary embodiment of the current invention.

It is another object of the current invention to promote increased desirability in the marketplace for various food products. Further objects of the current invention include increasing consumer choices, alternative food options and/or ease of food product consumption by promoting the providing of food product in various combinations and/or ready to eat forms. Additional objects of the current invention based on the promotion of desired internal atmospheric conditions is to promote and maintain food product quality, extend and/or prolong shelf life of food product, minimize microbial activity, enzymatic changes, affect respiration and/or reduce decay (inhibit fermentation). Still further, the atmospheric conditions promoted by exemplary aspects of the current invention can promote the object of affecting the desirable and/or undesirable marketable characteristics of food product within exemplary embodiments. It is another object of the invention to provide a cost-effective quality preservation process for packing, handling, ripening, distribution, marketing, and/or consumption of food products. This can further support the object of enabling opportunities to increase product offerings to retail and food service outlets by various food products manufacturers and distributors.

It is an object to promote the established protocols of packing, transport, ripening, distribution, and marketing for food products, particularly perishable food products, of the food industry by allowing the use of flexible polymeric films, such as a polyethylene, polystyrene, polypropylene, polyester films, or combinations, thereof that may be variously configured, such as into variously dimensioned bag(s), tray(s), roll/lid stock(s) and/or container(s), thereby reducing interference with such protocols. Thus, construction and configuration of exemplary embodiments of the current invention encompass an on-demand flexibility and customizability which is yet another object of the current invention.

It shall be understood that use of terms herein, such as "exemplary" and/or "current"; "aspects" and/or "embodiments"; "comprised" and/or "comprising"; and such other terms as may be used by those skilled in the art, shall be and are intended to be and indicate exemplary, inclusive and non-exhaustive terms. Therefore, the description provided for the current invention shall encompass alternatives and/or any additional scope as may be contemplated.

Exemplary aspects and embodiments of the resealable film structure and packaging systems of the current invention include an RF or resealable packaging device (RPD) comprising an RF connected to or integrated with a packaging device, wherein atmospheric control attributes, such as perforations and the like, are located in the RF and/or packaging device. The atmospheric control attributes can be of varying numbers, configurations, dimensions or other factors. The exemplary RF and/or packaging systems embodiments can be of varying dimensions both externally and as forming an internal or enclosure space.

In an exemplary embodiment, the RF comprises a structure having an opening through at least a first part of the structure, wherein the opening is defined as less than a surface area of the structure and is covered by a second part of the structure that is peelable from and resealable (PR) to the first part of the structure. The PR part of the structure may comprise of single or multiple layers which are weakly adhered to the first part of the structure by pressure sensitive adhesive. The structure further includes one or a plurality of variously constructed, configured and dimensioned atmospheric control attributes, wherein the atmospheric control attributes can be located in the first or second part of the structure and/or in both the first and second parts of the structure. The structure may further include a registered die cut to guide sealing and eventual opening process at the consumer level.

In another exemplary embodiment, the RF comprises a five layered structure, wherein one side of the first layer is heat sealable to the rigid or flexible component of the packaging device. The other side of the first layer is weakly adhered to the first side of the third layer by a weak adhesive polymer layer two. The third layer may be laminated or bonded with a laminating agent layer four to the fifth layer such that layers 3 to 5 become the PR part of the RF or RPD. Prior to laminating layers 3 and 5, layer 5 may be reverse printed. One or a plurality of variously constructed, configured and dimensioned atmospheric control attributes can be located in one or more or all of the layers. The structure may further include a registered die cut to guide sealing at food packing; and eventual opening process at the consumer level.

In another exemplary embodiment, the RF comprises a five layered structure, wherein one side of the first layer is heat sealed (weld seal) to the rigid or flexible component of the packaging device. The other side of the first layer is weakly adhered with pressure sensitive adhesive layer two to the first side of the third layer. The second side of the third layer is laminated or bonded with a laminating agent layer four to the fifth layer such that layers 3 to 5 are the PR part of RPD. One or a plurality of variously constructed, configured and dimensioned atmospheric control attributes can be located in one or more of the layers. The embodiment further includes a registered die cut for eventual opening process at the consumer level for PR function of PRD.

In another exemplary embodiment, the RF comprises a three-layered structure, wherein one side of the first layer is heat sealable to the rigid or flexible component of the packaging device. The other side of the first layer is weakly adhered to the first side of the third layer by a weak adhesive polymer layer two. The third layer is a peelable layer that can be peeled and resealed to the adjacent layer through the weak adhesive polymer layer two. The structure may further include a registered die cut to guide sealing at food packing; and eventual opening process at the consumer level. Further, the first layer of the exemplary embodiment may be surface printed for tamper evidence such that the print is within and outside of registered die cut. The second side of the third layer may or may not be printed. One or a plurality of variously constructed, configured and dimensioned atmospheric control attributes can be located in one or more of the layers.

In another exemplary embodiment, the RF comprises a three-layered structure, wherein one side of the first layer is heat sealed to the rigid or flexible component of the packaging device. The other side of the first layer, may or may not be printed and is weakly adhered to the first side of the third layer by a weak adhesive polymer layer two. The third layer is a peelable layer that can be peeled and resealed to the adjacent layer, through the adhesive polymer layer two. One or a plurality of variously constructed, configured and dimensioned atmospheric control attributes can be located in one or more of the layers. The embodiment further includes a registered die cut for eventual opening process at the consumer level for PR function of PRD. Further, the first layer of the exemplary embodiment may be surface printed for tamper evidence such that the print is placed within and outside of registered die cut. When consumer pulls 'pull tab'; layer two is separated from layer one such that the printed portion within the registered die-cut does not fall in original place on resealing to layer one thus serving as proof for tamper evidence.

Further exemplary embodiments can include a packaging system comprising a packaging device or container connected to or integrated with a three-layered resealable film structure (RF) in accordance with exemplary aspects of the current invention. Such exemplary embodiments can further comprise atmospheric control attributes, such as micro-perforations and the like, that can be located in the RF and/or packaging device/container. Still further, exemplary embodiments can include a packaging system comprising a packaging device or container connected to or integrated with a five-layered resealable film structure (RF) in accordance with exemplary aspects of the current invention. Such exemplary embodiments can further comprise atmospheric control attributes, such as micro-perforations and the like, that can be located in the RF and/or packaging device/container.

In additional exemplary embodiments of the current invention, a process for modulating the life-cycle of food product packaged in an exemplary packaging system is provided. Still further exemplary embodiments of the current invention comprise a process of packaging food product by enclosing it within an exemplary packaging system, wherein the atmospheric environment within the packaging system modulates the life-cycle of the food product. It is an object of the current invention to modulate packaging system atmospheric conditions comprising designated levels of various gases, such as $CO_2$, $H_2O$ vapor and $O_2$, and in addition other gases or ripening modifying agents such as $C_2H_4$ (ethylene), $C_3H_6$ (propylene) or other ripening agents that can promote synergistic interactions for retaining quality attributes and extending shelf life throughout the life-cycle of food product enclosed in exemplary embodiments.

It is to be understood that both the foregoing general description and the following detailed description are exemplary and explanatory only and are not restrictive of the invention.

DETAILED DESCRIPTION OF THE INVENTION

Figure 1A:
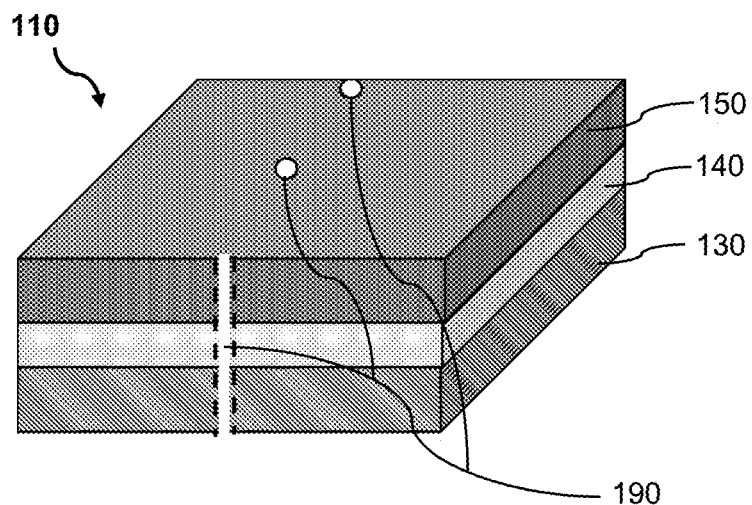
FIG. 1A is an illustration of a resealable film comprising a three-layer resealable film structure with a plurality of atmospheric control attributes in accordance with an exemplary embodiment of the present invention.

The present invention provides a breathable peel/reseal (resealable) film and/or membrane structure that includes at least one or more atmospheric control attributes, features, factors and/or properties. In addition, the present invention provides a breathable peel/reseal (resealable) packaging device construct comprising the film and/or membrane structure connected with or to a container or various other storage devices. The control attributes promote various characteristics and/or capabilities including, without limitation, the active and/or passive control over atmospheric conditions, including without limitation, transmission and/or transmission rate(s) of gases (e.g., $CO_2$, $N_2$, $O_2$ and such other gases as may be found), heat, cold, agent(s) (such as ripening agents $C_2H_4$ (ethylene), $C_3H_6$ (propylene) and others as may be contemplated), relative humidity and/or water vapor. The promotional capabilities provided by the control attributes can affect the life-cycle, in whole or part, of food product while located within an exemplary embodiment of the current invention, which can encompass food product processing, including any handling, packing, ripening, distribution, marketing, storing, consumption and/or such other activities that may be contemplated as comprising at least a part of the life-cycle of the enclosed food product.

As will be described further herein, control features or attributes that can provide, affect and impact upon the promotion capabilities of the current invention, may include without limitation, opening(s) and/or transmission constructs, such as variously sized perforations or pores (e.g., macro- & micro-perforations or pores), (punch) slits/slots, vents, and/or punctures, established or located within the film(s) or layer(s) of the RF and/or RPD structures. The control features can be formed using various technologies and/or techniques, such as laser drilling, cutting, perforating or such other technologies and/or techniques as are known to those skilled in the art. Additional controls that can impact upon the promotion capabilities of the structure(s) may include, without limitation, the physical, dimensional and/or chemical composition of any materials used in constructing and/or configuring exemplary embodiments of the current invention. For example, the chemical composition and/or thickness of the film(s), base film and/or various layers that may comprise an exemplary RF and/or RPD can impact upon the permeability and breathability provided to any exemplary embodiment of the current invention. It is contemplated for exemplary embodiments of the current invention that the structures, film(s) and/or layers formed, from the one or more material(s), provide a breathability or $O_2$ transmission capability of 180 cubic centimeters per 100 square inches per day (e.g., time period of roughly 24 hr.) or lower. Alternatively, the breathability or $O_2$ transmission capability may range from up to 300 to 180 cubic centimeters per 100 square inches per day. The various control features, which may be understood and referred to herein as atmospheric control attributes/properties or environmental control attributes/properties, atmospheric or environmental factors or features and the like, promote the advantageous capabilities, such as the active and/or passive control over atmospheric or environmental conditions, of the current invention.

As described and shown herein, exemplary embodiments of the current invention can include a breathable, resealable film structure, including atmospheric control attributes, that is a stand-alone film structure that can be utilized in connection with various other component structures, such as separate storage, container and/or packaging technologies and constructs. This breathable, resealable film structure, including atmospheric control attributes, can be referred to herein as a "resealable film" or "RF". The RF can be provided as a separate, stand-alone construct and/or in connection with various storage and/or packaging technologies and constructs, such as bags, pouches, lid/roll stock, container(s), device(s), other package(s) (collectively referred to herein as "packaging device" or "packaging devices"). Additional exemplary embodiments of the current invention include a packaging system(s) that can comprise various rigid or flexible packaging devices connected and/or integrated with one or more RF structures. These resealable packaging systems can also be referred to herein as "resealable packaging device", "RPD" and/or "resealable packaging system", "RPS". As used herein, the various terms, such as RF and/or RPD, can be understood to refer to the stand-alone breathable resealable film structure and/or the breathable resealable film structure in connection with, able to be connected to or integrated with a packaging container or device. Any description provided herein for the advantages of the current invention, either the RF or RPD exemplary embodiments, shall be understood as applicable to and embodied by the other.

It is contemplated that exemplary RF and/or RPD embodiments of the current invention can be utilized in exemplary method embodiments of the current invention. The methods contemplated can provide prolonged shelf-life for food product when packaged within exemplary embodiments of the current invention. Food product processing can include any handling, packing, ripening, distribution, marketing, storing, consumption and/or such other activities that may be contemplated as or comprise the life-cycle of food product while located within the enclosure. The method embodiments utilize and take advantage of the improved atmospheric control features provided by the current invention for optimizing internal atmospheric conditions for food product located within an enclosure.

In exemplary embodiments, the RF (resealable film) is at least part of a resealable packaging device (RPD) or storage construct that provides an enclosure within which food product can be located and stored. The RF can be enabled by and provide various resealable technologies that allows for the closing, opening, exposing, accessing and resealing of the enclosure. The RF can be closed, sealed and resealed over the enclosure as well as peeled away, detached and removed from over the enclosure. It is via the RF that the enclosure can be opened, accessed and exposed. As such, at least part of the RF can be peeled away from and resealed to itself and/or at least part of the packaging device that it is connected to. Thus, the RF provides for the exposing of the enclosure and closing and/or resealing of the enclosure.

In exemplary embodiments, the enclosure defines a storage or interior space. Thus, when the RF is closed, sealed or resealed over the enclosure interior space, within which food product can be stored, it is promoting and/or controlling, such as by establishing, providing, enabling, maintaining and/or affecting, an interior atmosphere or environment within the interior space. This control is provided by the atmospheric control features that promote, affect and provide various transmission properties characteristics to the current invention related to interior atmospheric conditions (e.g., $O_2$ transmission rate(s), water vapor content, and the like). As will be described further herein, various types of food products with various respiration characteristics, such as low, medium or high respiration rates can be stored within the enclosures and impact upon the interior atmospheric conditions to be promoted within the interior space of the enclosure. The enclosures provided by the exemplary embodiments of the current invention, via interaction with the atmospheric control attributes, provide advantages by affecting, improving and/or optimizing internal atmospheric conditions for food product with various respiration characteristics located within an enclosure.

The breathability provided by the current invention is its ability to actively and/or passively modify or affect the interior atmosphere or atmospheric conditions within the enclosure via the atmospheric control attributes. Atmospheric conditions and/or environmental factors that may be affected can include, without limitation, water vapor, heat, cold, relative humidity, agent(s) (e.g., ripening agents and others) and/or gases (e.g., $CO_2$, $N_2$, $O_2$ and such other gases as may be found). It is contemplated that the atmospheric control attributes of the current invention, via the transmission and/or transmission rate(s) that can be provided, promote the optimization of the concentration(s) of atmospheric conditions present within the interior atmosphere of the enclosure. at least in part based on the respiration rate(s) of food product located therein. Therefore, breathable peel/reseal structures that include one or more various atmospheric control attributes are contemplated for the exemplary embodiments of the current invention.

The atmospheric control attribute technology may be utilized in conjunction with existing storage (bag, container, lid/roll stock, pouch) technologies or with newly constructed storage technologies. The configuration, type, number and size of atmospheric control attributes can vary and can be located in any one or combination of various components, films, layers or features that may comprise exemplary embodiments of the current invention. It is further contemplated that the present invention can include atmospheric control attributes located within varying and various components, film(s), layers or features of any material that may be configured as and form any part of the current invention.

Exemplary embodiments of the current invention can utilize perforation technology for providing the atmospheric control attributes. The characteristics of the perforation(s) provided, including considerations of configuration, including volumetric configuration, number and density of the perforations, perforation size and length, and location and positioning within the materials, either alone or in combination may factor into providing the promotion and/or achievement of the optimized atmospheric conditions for one or more environmental factors, such as $O_2$, $CO_2$, $N_2$, water vapor and the like, within an interior atmosphere of an enclosure as is provided by the current invention. It is contemplated that the perforation technology can be employed with various packaging devices and with packaging devices that may employ additional various atmospheric control technologies. For example, the material (base film, layers or other components) of the RF and/or the packaging device may provide a desired permeability factor, breathability or $O_2$ transmission capability, such as, without limitation, 180 cubic centimeter per 100 square inches per day (e.g., time period of roughly 24 hr.) or lower.

It is contemplated that the characteristics of the perforation(s) (e.g., configuration, number, size, length, density and the like) may vary for any exemplary embodiment of the current invention. It is contemplated that the determination of perforation characteristics, such as the size and number of the perforations, for an exemplary embodiment of the current invention can be based on one or more different considerations, such as shelf-life requirements, respiration rate of food product and/or the per unit (food product) weight to surface area (RF and/or RPD construct) ratio. Therefore, food product quality and shelf-life optimization/maximization (or less than maximum) can be affected and determined by the number and size of perforations employed with any embodiment.

The perforation(s) employed with exemplary embodiments of the current invention can include, without limitation, macro-perforations and/or micro-perforations. Macro-perforation size is a function of the diameter of the opening established and may be in the range of a diameter of equal to or more than six hundred microns (600 µm), preferably from 600 µm to 800 µm and more preferably from thirteen (13) to thirty (30) millimeters. Macro-perforation numbers included in exemplary embodiments of the current invention may range from one (1) to fifty (50), preferably from two (2) to thirty (30) and more preferably three (3) to fifteen (15). The density of holes (macro-perforations) in the film can be understood as providing or establishing, at least in part, an open area in and for the construct that forms an RF and/or RPD of the current invention. Micro-perforation size is a function of the diameter of the opening established and may be in the range of ten microns (10 µm) to six hundred microns (600 µm), more preferably from fifty microns (50 µm) to five hundred twenty microns (520 µm). Micro-perforation numbers included in exemplary RF and/or RPD embodiments of the current invention may range from one (1) to one thousand (1,000), more preferably one (1) to one hundred (100).

The density of holes (micro- and/or macro-perforations) in the film can be understood as providing or establishing, at least in part, an open area in and for the construct that forms an RF and/or RPD of the current invention. The open area can be further understood as a percent open area, wherein the percentage reflects the relationship of the open area provided by the size and number of perforations and the total surface area of the enclosure of the RF and/or RPD. Determination of desired, required or optimal percent open area can be achieved by the above mentioned parameters but will generally be in the range of one (1) to fifty (50) perforations or holes per unit weight (i.e., gram(s), ounce(s), pound(s), and the like) of food product. The parameters can be affected by various factors such as the properties of the food product within, required open area and gas transmission properties of materials used in construction.

The open area refers to the cumulative amount of open space provided by the perforations through the material(s) used in constructing an exemplary RF and/or RPD of the current invention. The type of food product stored in an enclosure established by the current invention, respiration rate(s) and/or various other alternative considerations may provide at least a partial pre-determination of and for the open area requirements to be established without departing from the scope and spirit of the present invention. Open area can be determined from the number and size of perforations provided within exemplary embodiments. By way of example and without limitation, three (3) micro-perforations each with a diameter of twenty microns (20 µm) may be substantially equal to $9.42 \times 10^{-10}$ m$^2$. Total open area is defined by the cumulative size (area) of each the openings. Assuming the opening is circular, the surface area for each opening is equal to m$^2$, where r is equal to $(10 \times 10^{-6}$ m) and thus, each opening provides $3.14 \times 10^{-10}$ m$^2$ of open area. Therefore, the open area provided by the three micro-perforations may be substantially equal to $3 \times 3.14 \times 10^{-10}$ m$^2$ which equals $9.42 \times 10^{-10}$ m$^2$.

It is contemplated for preferred embodiments of the current invention that it can include micro-perforations with diameter sizes of: (i) 75 microns (75 µm) providing a per perforation open area of $4.415625 \times 10^{-9}$ m$^2$; (ii) 90 microns (90 µm) providing a per perforation open area of $6.3585 \times 10^{-9}$ m$^2$; (iii) 100 microns (100 µm) providing a per perforation open area of $7.85 \times 10^{-9}$ m$^2$; (iv) 120 microns (120 µm) providing a per perforation open area of $1 \times 10^{-8}$ m$^2$; (v) 130 microns (130 µm) providing a per perforation open area of $1 \times 10^{-8}$ m$^2$; (vi) 150 microns (150 µm) providing a per perforation open area of $2 \times 10^{-8}$ m$^2$; (vii) 240 microns (240 µm) providing a per perforation open area of $5 \times 10^{-8}$ m$^2$; or (viii) such other sizes and per perforation open area as may provide the atmospheric promotional advantages. It is contemplated for exemplary embodiments, RF per unit package and/or RPD, of the current invention that the total open area provided by the atmospheric control attributes may range generally from $1.5 \times 10^{-11}$ m$^2$ to $1.5 \times 10^{-4}$ m$^2$. Open area for openings in other shapes that are not circular can be easily calculated by those skilled in the art.

Various food products can be located within the enclosure, such as fresh produce and other perishable food products, and that within this internal environment or atmosphere of the enclosure (otherwise referred to herein as the "internal atmosphere", "interior atmosphere", "enclosure environment", "modified environment" and/or "gaseous environment") various atmospheric conditions are actively and/or passively promoted by and due to the presence of the one or more atmospheric control attributes (e.g., micro-perforations and the like) provided in the RF and/or RPD which can influence transmission between the internal environment and an environment external thereto.

Food products can include non-perishable and/or perishable food products. As used herein, the "perishable food product" would include all foods that spoil, decay or become unsafe to consume when not stored at recommended conditions. It includes fresh cut or whole fruits, such as strawberries, melon, pineapple, and vegetables, such as broccoli florets, cauliflower, carrots, corn, and salads, other leafy greens and the like which exhibit higher rates of respiration over other food products. Additionally, meat products and/or other food products are contemplated by the current invention. The food products can be frozen or non-frozen or in such states and forms as may be contemplated for use with the current invention by those skilled in the arts.

Conventional solid (i.e., no holes) film or other packaging devices which attempt to provide modified atmosphere capabilities often over-modify the atmosphere within the packaging resulting in (pre-mature) fermentation and reduction in shelf-life of the food product. This over-modification is significantly reduced by the exemplary embodiments (RF and/or RPD) described herein and thus the current invention provides significant advantage over the use of previous storage and/or packaging technologies.

The enclosure(s) formed by and included in the various exemplary embodiments of the current invention, within which food product can be located, in conjunction with the atmospheric control attributes promotes the achievement and/or accomplishment, in part, significantly and/or in total, of desired, improved and/or optimized internal atmospheric conditions for the food product. The promotion provided by the current invention can include establishing, managing, modifying, maintaining, modulating and/or affecting the atmospheric conditions in the internal atmosphere of the enclosure. The promotion provided, via the atmospheric control attributes, can include the passive and/or active management of transmission rates of one or more gases across the RF (resealable film) structure(s), thereby, at least in part, providing optimized internal atmospheric conditions. As such, the promotion provided by the current invention also allows for the optimizing of the internal atmospheric conditions, at least in part, based on, in synergy with and/or for the benefit of the food product located within the environment of the enclosure. For example, the current invention can promote the synergistic interaction of environmental factors, such as but not limited to $CO_2$, $N_2$, $O_2$, ripening agent(s), and $H_2O$ Vapor, within an enclosure. The RF and/or RPD promotes internal atmospheric conditions, such as the gaseous concentrations/conditions, within the internal environment allowing the current invention to establish and maintain optimized and/or desired atmospheric conditions for longer periods of time than that which had been made possible by any other technologies or techniques previously known in the art. These capabilities are provided for as long as possible within the enclosure, as described herein below, throughout the life-cycle of the food product therein.

To achieve and/or accomplish desired internal atmospheric conditions throughout the life-cycle of food product located within an enclosure of the current invention, internal environmental/atmospheric conditions that can be promoted include, without limitation, the concentrations of various gases and conditions, such as oxygen, carbon dioxide, nitrogen, other volatile gases and agents, relative humidity and/or water ($H_2O$) vapor concentrations and/or temperature. In exemplary embodiments, the current invention provides atmospheric conditions within an enclosure wherein the concentrations of various gases and conditions are at least significantly within identified ranges and/or tolerances, such as low oxygen and high carbon dioxide regimes. Transmission rates of various gases across the RF (resealable film) structure(s) of the current invention can be affected by various factors, such as the percent open area that determines the interaction between the number and size of perforations (e.g., macro- and/or micro-perforations) such that the number and size may be selected to achieve, at least for some period of time, an optimized interior environment of an enclosure. Exemplary atmospheric conditions provided by transmission rates of atmospheric control attributes employed for exemplary embodiments of the current invention may comprise an $O_2$ content of 0.5% to 20%, >0.5% and/or >2% but <15%; a $CO_2$ content of 1% to 25%, >2% and/or >5% but <15%; and a relative humidity (RH) equal to or greater than 60% and/or 70% to 100% or such other ranges as may optimize an internal atmosphere for a particular food product located in an enclosure of an exemplary embodiment herein. Still further, the current invention contemplates the promotion of transmission rates whereby the interior environment may preferably comprise an $O_2$ content of ≥0.5%, $CO_2$ content of ≥1% and relative humidity of ≥60%. Still further, the current invention contemplates the promotion of transmission rates whereby the interior environment of the enclosure comprises a preferred ratio of $CO_2$ to $O_2$ ranging from 1:1 to 50:1 or 1:1 to 1:50 or such other ranges as may optimize an internal atmosphere for a particular food product located in an enclosure of an exemplary embodiment herein. The ratio may have a higher or lower ratio factor as determined by the respiration needs of the food product or desired design characteristics of the bag. Therefore, the ratio may vary, and the interior atmosphere may have a higher or lower $CO_2$ and/or $O_2$ concentration(s) without departing from the scope and spirit of the present invention.

The optimizing of desired internal atmospheric conditions within the enclosure, more particularly within a closed enclosure, provided by the current invention also promotes and maintains food product quality, extends and/or prolongs shelf life of food product, minimizes microbial activity, minimizes enzymatic changes, affects respiration and/or reduces decay (inhibits fermentation). Still further, the atmospheric conditions provided by the current invention promotes the marketable characteristics of food product within the enclosure which are those attributes of the food products that may or can be perceived and can include, without limitation, color, smell, sound, feel and/or taste.

The marketable characteristics and/or sensory attributes that are contemplated as capable of being perceived and recognized can include, but need not be limited to, sensory recognition such as visual perception, olfactory perception, auditory perception, touch perception and/or taste perception. Therefore, the perception of one or more recognizable attributes can include color(s) that can be seen, odor(s) that can be smelled, sound(s) that can be heard, texture(s) that can be felt and/or flavor(s) that can be tasted. Any one or combination of marketable characteristics may be perceived, sensed, managed, maintained, suppressed and recognizable, as described herein for the current invention and/or contemplated by those skilled in the art.

It is further contemplated that the current invention may enable the perception and/or recognition of sensory attributes that can be understood as desirable marketable characteristics or undesirable marketable characteristics. Desirable marketable characteristics can be understood as those attributes that when perceived are generally recognized as promoting the quality and/or desirability of a food product. Undesirable marketable characteristics can be understood as those attributes that when perceived are generally recognized as decreasing the quality and/or desirability of a food product. The perception of desirability or undesirability based on recognition of one or more attributes, such as color(s) that can be seen, odor(s) that can be smelled, sound(s) that can be heard, texture(s) that can be felt and/or flavor(s) that can be tasted, may comprise or be identifiable as one or more indicators that may be associated with an attribute(s) and may vary for each instance of the current invention and food product located within an enclosure. These identifiable indicators may be understood as providing a designation in support of the desirability and/or undesirability of a food product located within an exemplary embodiment of the current invention. For example, one indicator may be for designating a desired, marketable color/color stages. The color/color stages may comprise one or more specific numbers or a numbers range, such as one (1) to one hundred (100), or any other range designation as may be associated with any particular color/color stages. In one instance the number indicator may be recognized as similar to or falling within a desirable designation(s) and therefore indicate a desirable marketable characteristic or attribute. It is therefore contemplated that color/color stages indications for the perishable food product packaged within the current invention that are dissimilar to a specific desired number designation or fall outside the identified number range may be recognized as an indication of an undesirable marketable characteristic or attribute.

The current invention promotes increased desirability in the marketplace for various food products while packaged in the enclosure by providing an improved, cost-effective quality preservation process for improving food product utility and quality during packing, handling, ripening, transporting, distributing, marketing, and/or consumption. Not appreciably delaying the onset of ripening to achieve desired marketable characteristics and delaying further ripening post-desired marketable characteristics are benefits provided by the current invention and recognizes the commercial importance of providing food products with desirable and expected marketable characteristics and sensory attributes. For example, the initiation and control of the ripening process for perishable food products can have a significant impact on the preservation and quality of a food product. This can be critically important for medium to high-respiring and climacteric fruits (i.e., fruits that produce and respond to a ripening-related gas, such as the ripening hormone ethylene). Thus, while the current invention can promote consumer-preferred eating qualities of food products, including uniform color and other sensory attributes, it is further contemplated that the onset of undesirable marketable characteristics, such as discoloration, off-putting odors and/or undesired flavor notes and/or unwanted textures, can be delayed and/or inhibited. The current invention, by not appreciably delaying the ripening process to desirable marketable characteristics (i.e., desired stages of appearance, color, sound, texture, smell and/or taste), and also providing appreciable delay in ripening beyond or post such stages of desirable marketable characteristics provides a cost-effective way to extend shelf-life with improved quality preservation technologies and techniques.

The RF either alone or as part of an RPD may be constructed and configured in various manners utilizing various processes, technologies, techniques, materials, either alone or in combination (composite), and formed from one or more films, components and/or layers. As discussed herein, it is generally understood that the materials used in constructing the exemplary film(s) and layer(s) of the current invention can be of a flexible, polymeric film (plastic) nature. Any of the various configurations that may be given an RF provides all the features, advantages and capabilities described herein for the current invention.

As such, exemplary configurations for various exemplary embodiments may include (i) a heat sealable layer or component (also referred to herein as a "base film", "first layer" or "first flexible film"), (ii) a defined opening, (iii) a peelable layer or component (also referred to herein as a "peelable film", "peelable layer" or "second flexible film") and (iv) atmospheric control attributes. Various other components as described and contemplated by those skilled in the art may be included without departing from the scope and spirit of the current invention.

Contemplated exemplary embodiments for an RF and/or RPD can comprise a first layer including an opening, wherein a second peelable layer that covers the opening is connected to the first layer. The second peelable layer can be peeled away from and then resealed to the first layer. In addition, an RF and/or RPD, can comprise a first layer including a registered die-cut for opening, wherein a third peelable layer that covers the die-cut opening is connected to the first layer by an adhesive second layer. The adhesive layer can be a pressure sensitive adhesive. The third peelable layer can be peeled away from and then resealed to the first layer.

In additional exemplary embodiments, an RF and/or RPD, comprises a first layer including a registered die-cut for opening, wherein a peelable third layer that covers the die-cut opening is connected to the first layer. The peelable third layer is connected to the first layer by an adhesive layer second layer, such as a pressure sensitive adhesive layer. A fifth layer, which can be designed for printing, is connected to the peelable third layer by a laminate adhesive fourth layer. The peelable third layer, in connection with the fifth layer, can be peeled away from and then resealed to the first layer. The first layer is capable of being printed on and including various designs.

It is contemplated that the base (plastic) film is of a heat sealable design allowing it to be sealed and/or connected to another surface. Such other surfaces can include, without limitation, a surface of a container, device and/or package. The heat-sealing process and methodology creates a weld seal on application of heat with food packaging container. The heat seal is substantially stronger than the pressure sensitive adhesive seal created by application of pressure sensitive adhesive between base film and peelable film layers of the invention. It is contemplated that the RF, including the various layers, may be comprised of similar or different materials than that of a packaging device to which it may be connected or integrated with into forming the RPD.

The opening is preferably defined in the base film or first layer but may be defined in any component or layer as may be contemplated. The definition or construction of the opening can employ various processes, technologies and/or techniques such as scoring with mechanical or laser methodologies in and of the base film. It is further contemplated that the first layer may be cut using various technologies and techniques, such as being die-cut, water jet cut, ultra-sonic cut, laser drilled, and other techniques known to those skilled in the art to any desired shape and thereby forming an opening. The scoring or cut may be made once the layers of the RF and/or RPD are created, wherein peeling the peelable layer on the RF and/or RPD exposes the opening, typically defined in and on the first layer or base film, while removing portions of the first layer with the peelable layer. It is also contemplated that the definition of the opening may be made in a partial manner Thus, exemplary embodiments may include a defined opening with one or more edges not cut or where at least a section of one or more edges is not cut and such non-cut edges or edge sections anchor the peelable layer when peeled away from the first layer and, as such, are not removed from the opening when the peelable layer is peeled away. Alternatively, the cut may be made on the first layer followed by the weak adhesion of the peelable layer, wherein peeling the peelable layer on the RF and/or RPD exposes the opening on the first layer, without removing portions of the first layer with the peelable layer. Where the base film is one layer or includes two or more layers it is understood that the definition of the opening is established through each and all layers allowing each layer to be part of the forming of an opening during peeling. The definition of the opening can be configured with any desired shape to allow forming of an opening during peeling.

In preferred embodiments, it is contemplated that a base film of the current invention can be variously configured and/or constructed to include, without limitation, (1) a single film layer or multilayers coextruded together (2) two or more film layers bonded together. The base films may further be coated with heat sealable polymers. In preferred embodiments, it is contemplated that a peelable film of the current invention can be variously configured and/or constructed to include, without limitation, (1) a single film layer; (2) two or more film layers bonded together or (3) two or more film layers laminated and/or adhered together. The number of layers may vary in any combination, from two to three, four or five or more layers. Layers may be connected to one another directly or indirectly. The connection of the layers can be established using various techniques and technologies, including the use of adhesive materials, heat sealing or other materials and means known by those skilled in the art.

The structure of any of the breathable (composite) peel/reseal film (RF and/or RPD packaging system embodiments) of the invention may include a peelable layer that is continuous throughout a structure or registered to only a certain preferred area of the structure. For instance, it is contemplated that the peelable layer can be between 5% to 100%; 10% to 90%; 20% to 80%; 25% to 75% or such other percentage as contemplated of the total area of the RF and/or RPD.

Various construction processes, technologies and techniques can be used in producing any of the films, components and/or layers of the current invention. For example, construction of the single layer base film and/or peelable film configurations can employ extrusion processes, technologies and techniques whereby the single layer is extruded. Further, construction of the multiple layer base film and/or peelable film configurations can employ co-extrusion processes, technologies and techniques whereby the multiple layers are bonded together during the extrusion process and extruded as a single film construct. It is further contemplated for the construction of multiple layer peelable film configurations that it can employ processes, technologies and techniques whereby the multiple layers are produced and then are laminated and/or adhered together to form a single film construct.

The RF and/or RPD can be variously shaped, configured and provided as a web, bag, tray, lid stock, device, container or other storage configuration, for at least partially and in a resealable manner encompassing a food product within the enclosure. It is contemplated that the RF can include one or more various secondary shapes configured in any manner and located at various positions. For example, one or more structures, such as a tab or pull, can be positioned on an outer edge of the peelable film in a manner that promotes the peelable functionality. As described above, the RPD and/or RF form an enclosure within which food product can be located. The enclosures provided by the exemplary embodiments of the RF and/or RPD promote and provide improved and optimized internal atmospheric conditions for food product located therein.

An RF can be formed as a roll/lid-stock and/or film capable of connecting with a packaging device. The finished roll/lid-stock and/or film may have various dimensional characteristics, such as a length dimension that can range from five hundred (500) feet to two thousand (2,000) feet and a width dimension that can range from three (3) inches to sixty (60) inches. In the alternative, the RF and/or RPD may be configured as a film having length and width dimensions ranging from one or more centimeters or meters and/or one or more inches or feet. The height or thickness dimension for various configurations including, without limitation, a roll/lid-stock, film and/or tray can range from 0.5 mil to eight (8) mil. A packaging device, to which the roll/lid-stock and/or film can be connected, can have varying configurations and/or dimensional characteristics. For instance, the packaging device may be formed in the shape of a bowl, rounded container, square, rectangle and/or such other forms as may be contemplated that enable the establishment of an enclosure in accordance with exemplary embodiments of the current invention. The materials for such RPD may include but not limited to polyethylene (PE), polypropylene (PP), polyethylene terephthalate (PET), amorphous polyethylene terephthalate (APET), crystalline polyethylene terephthalate (CPET), glycol-modified polyethylene terephthalate (PETG), polystyrene (PS) and Compostable and recyclable materials. The RPD may comprise of 100% virgin, 100% recyclable or a combination of virgin and recyclable materials. The length, width and/or height (thickness) dimensions for any packaging device and/or RPD of the current invention can vary significantly from millimeters, centimeters and/or meters to inches and/or feet.

By way of example, an RPD can be formed from film as a bag including and/or connected with an RF configured as a part of the bag construct. The percent area of the bag construct provided by the RF can vary significantly, such as from 5% to 50%. The bag may have a width ranging from 50 to 500 millimeters and a length ranging from 100 to 700 millimeters. Bags can include various additional component features, such as gusseting on one or more sides which may comprise an individual width ranging from 20 to 100 millimeters. The dimensional characteristics of the bag construct define an enclosure (opening) space within the interior within which food product can be located. The RF is located proximally with the enclosure to provide an enclosure that can be opened and closed. The RF can be peeled away from the film construct of the bag, thereby allowing access into the interior space of the bag and closed by resealing/re-connecting the RF with and/or to the film construct of the bag.

As described herein, the connection of the base film with the peelable film can be established using various techniques and technologies. Preferably, the connection is made in a resealable manner including the use of adhesive materials. All aspects, including without limitation the type and compositional characteristics, of adhesive material used can vary so long as the functional peel and reseal capabilities are still being provided. It is contemplated that various different types of adhesives or other sealants, such as laminates or other materials and means known by those skilled in the art can be employed to provide the connection and functionality for the different films and layers of the current invention.

The adhesive layer contemplated for use by the contemplated embodiments above can be formed utilizing various adhesives and/or compounds including, without limitation, heat sensitive adhesive(s), pressure sensitive adhesive(s) and the like, as may be contemplated. Still further, the adhesive layer can be formed using adhesives with various properties and/or characteristics, such as strong and/or weak adhesive characteristics and the like. The structure of any of the exemplary embodiments may include one or more adhesive layers having various physical characteristics including, without limitation, the thickness of the adhesive materials used in constructing the layer(s). For instance, it is contemplated that the adhesive layer(s) of any exemplary RF and/or RPD embodiment can be constructed having a material thickness ranging from 0.01 to 3.0 mil, more preferably from 0.1 to 1.0 mil. Further, an adhesive layer can be provided having a material thickness of 0.11 mil, 0.51 mil or 0.57 mil. Alternative adhesives and thicknesses are contemplated for use by the current invention.

Given the identified specifications above for the adhesive layers that may comprise various exemplary embodiments of the current invention, it is contemplated that the adhesive used in any of the adhesive layers may have a total adhesive (TA) as measured in weight/unit area ($g/m^2$). The TA can range from 1 to 100 $g/m^2$ and more preferably from 5 to 70 $g/m^2$. In preferred embodiments, the TA can be 34.42 $g/m^2$, 10.17 $g/m^2$ or 65.50 $g/m^2$.

As used herein pressure sensitive adhesives (PSAs) refers to adhesives that require pressure to adhere to the substrate (film or foil) of any of the non-adhesive layers that are contemplated as part of an exemplary embodiment of the current invention. PSAs may include various hydrophilic, super-hydrophilic and/or other similarly affinity based substances, such as acrylic polymers in water, or various hydrophobic, super-hydrophobic, anhydrous substances and/or other similarly affinity based substances, such as acrylic polymers in a petroleum based solution or solvents; Styrene-block copolymers (SBC) which include but not limited to, for example, polystyrene-polyisoprene-polystyrene (SIS) and polystyrene-polybutadiene-polystyrene (SBS), polystyrene/ethylene-propylene/styrene (SEPS) and polystyrene/ethylene-butylene/styrene (SEBS) or blends of one or more of SBCs and SBCs. Various acrylic polymers contemplated for use can comprise, without limitation, one or more of Acrylic acid, Acrylic acid, 2 ethylhexyl ester, Acrylic acid, 2-hydroxypropyl ester, Acetic acid, vinyl ester, Methacrylic acid, methyl ester or 2-Methyl-4-isothiazolin-3-one. Other PSAs may include rubber, synthetic thermoplastic elastomer, silicone-based adhesives or other materials as may be contemplated by those skilled in the art. It is contemplated that any of the various adhesive materials may also include additional components, such as with or without tackifiers. Adhesive formulation(s) may further include antioxidants, such as 2,6-Di-tert.-butyl-p-cresol and the like, and/or hydrophilic and/or super-hydrophilic additives. It is further contemplated that for any of the various adhesive(s) formulations, which may be utilized for the adhesive layer(s) in exemplary embodiments, they may include, have added to them or be in combination with oils, plasticizers, surfactants and/or various other additives.

It is contemplated that the adhesive is applied and/or coated onto one or more surfaces of the material configuration of one or more of the non-adhesive layers as described herein for providing the adhesive layer. The method, techniques and/or technologies used in and for providing the adhesive layer may vary as contemplated by those skilled in the art. As has been described herein, the adhesive can be applied to a non-adhesive layer that provides a permeability factor ranging from high to medium to low and other various compositional characteristics as are contemplated.

For the current invention, the composition of the adhesive utilized for the adhesive layers of the various exemplary embodiments of an RF and/or RPD can provide a rate of water vapor movement (also referred to herein as "moisture vapor transmission rate" or "MVTR"). As such, the adhesives may provide an adhesive atmospheric control attribute. For embodiments wherein low respiring fresh produce products are to be packaged, water-based PSAs are preferable. For water-based PSAs when used in packaging devices that enclose medium to high respiring fresh produce products, the accumulation of condensate interacts with water-based PSAs and as a result a white ring is formed around the score line of peelable layer. On opening the peelable lid, the water-based adhesive gets exposed to oxygen which turns the PSA into white sticky glue and thus, the package becomes unattractive for marketing of the product. Therefore, for embodiments wherein medium to high respiring fresh produce products are to be packaged, partially water vapor permeable or water vapor permeable PSAs are preferred in conjunction with atmosphere control attributes.

The synthesis and use of PSA materials as an adhesive that is employed in forming an adhesive layer(s) for exemplary embodiments of the current invention provides a significant advantage to the current invention over the prior art. For various reasons, such as described above, it has typically been an accepted standard that water-based adhesives are undesired and/or unacceptable in forming packaging devices for respiring food products, such as the RFs and/or RPDs that are provided by the current invention. Thus, the MVTR provided by the current invention can be a significant improvement over currently employed techniques and technologies, as will be described further herein. In addition, the use of these types of adhesive(s) and adhesive layer(s) allows their production or synthesis through the use of methods, techniques and technologies that have not been typically employed to date in the industry, such as synthesis by emulsion polymerization, or such other methods, techniques and technologies which can introduce water into an adhesive.

Transmission of water vapor through an adhesive material can be measured in accordance with the procedure described in ASTM E96, with some modification. In accordance with this procedure, the test methods are limited to specimens not over 1 and ¼ in. (32 mm) in thickness. In this "Cup method", 10 ml of water is added to the cup and the sample to be tested is sealed to the open mouth of the cup in such a manner that the dish mouth defines the area of the specimen exposed to the vapor pressure in the dish. In this case where the test material is an adhesive, it may be coated onto a highly permeable backing, e.g., a nonwoven fabric, for support. The assembly is placed in a controlled atmosphere at a temperature of 40° C. and relative humidity of 20%. The difference between the relative humidity inside the cup and the relative humidity outside the cup causes water to diffuse through the test material. Periodic weighing determines the rate of water vapor movement through the test material. Water vapor permeability for the test material(s), in this example the adhesive, may be calculated and expressed as grams water vapor per 100 square inches per mil per 24 hours and the water vapor transmission is expressed in grams per 100 square inches per day.

The MVTR for an adhesive can be characterized as providing a water vapor impermeable, partially water vapor permeable or water vapor permeable adhesive to any of the embodiments shown and described herein of an RF and/or RPD. Water vapor impermeable can mean no measurable water vapor transmission through the adhesive takes place; partially water vapor impermeable adhesive can mean that a water vapor transmission rate of 0.001 to 100 grams per 100 square inches per day is provided; and a water vapor permeable adhesive can mean that a water vapor transmission rate of greater than 100 grams per 100 square inches per day is provided.

The atmospheric control attributes, such as the perforations and the like described herein, can interact synergistically with the adhesive atmospheric control attributes to improve the PSA performance for an exemplary RF and/or RPD of the current invention. As such, the total open area being provided by the atmospheric control attributes, that at least in part promote the optimization of internal atmosphere conditions for an exemplary embodiment of the current invention, may interact synergistically with the adhesive(s) of the adhesive layer(s) to further promote optimization and overcome undesired characteristics of the adhesive(s) as have been described or may be contemplated. For instance, a water based adhesive, which may otherwise fail to support or allow the promotion of desired internal atmospheric conditions that is provided by the current invention due to its solubility in respiratory package condensate, may be acceptable for a high respiring food product (i.e., produce) when used in conjunction with appropriate atmospheric control attributes, such as macro-perforations, providing a desired total open area. For similar reasons, in an alternative embodiment, partially water based adhesive, which may otherwise fail to support or allow the promotion of desired internal atmospheric conditions that is provided by the current invention due to its partial solubility in respiratory package condensate, may be acceptable for high respiring food product (i.e., produce) when used in conjunction with appropriate atmospheric control attributes, such as micro-perforations, providing a desired total open area. In another alternative embodiment, water resistant adhesive, which may otherwise fail to support or allow the promotion of desired internal atmospheric conditions that is provided by the current invention due to its negative impact on breathability properties, of the respiring food package may be used in conjunction with appropriate atmospheric control attributes, such as micro-perforations, providing a desired total open area.

For food products that can lead to the formation of free-moisture condensation in a package, including within enclosures of exemplary embodiments of the current invention, due to a medium to high food product respiration rate(s), it may be preferred to include atmospheric control attributes in combination with the adhesive atmospheric control attributes that promote the improved transmission of moisture thereby reducing potential free-moisture condensation in the package. The promotion of an improved MVTR is provided by the atmospheric control attributes working in conjunction with water vapor impermeable and partially water vapor permeable adhesives being utilized for the exemplary RF and/or RPD. When water permeable adhesives are employed it is contemplated that exemplary configurations for the current invention may include a limited number, including without limitation none, of atmospheric control attributes. Therefore, it is contemplated that exemplary embodiments of the RF and/or RPD may employ, either alone or in any combination, one or more atmospheric and/or adhesive atmospheric control attributes in order to promote atmospheric conditions within an enclosure storing food product and provide all the advantages of the current invention.

The solubility for an adhesive can be characterized as providing a respiratory condensate (water) soluble, partially respiratory condensate (water) soluble or respiratory condensate (water) resistant to any of the embodiments shown and described herein of a resealable packaging device. Respiratory condensate (water) resistant adhesive can mean no visual degradation or color change of adhesive takes place when micro-perforated RPD with high respiring product such as rocket salad is held at 5° C. for 25 days; partially respiratory condensate (water) soluble adhesive can mean some visual degradation or color change of adhesive takes place when micro-perforated RPD with high respiring product such as rocket is held at 5° C. for 15 days; respiratory condensate (water) soluble adhesive can mean visual degradation or color change of adhesive takes place when micro-perforated RPD with high respiring product such as rocket is held at 5° C. for 5 days.

The current invention further promotes a decreased risk of potential contamination of food product. The risk of potential contamination of food product stored in storage devices or containers is a critical issue for the food industry. The risk of potential contamination can come from a variety of different sources and may present various undesirable additives, either alone or in combination, for interaction with stored food product. One such source can be the contamination risk presented by the degradation of the materials employed in constructing the storage devices or containers within which food products are stored. The degradation of these materials can occur through interaction with one or more degradation factors and can result in the release of the various components or properties that comprise the materials, which may then interact with a food product. The components or properties released can comprise, additives, surfactants, tackifiers, agents, various other potential compounds and the like.

In addition to the many other advantages provided by the current invention, it is also the case that the current invention provides material(s) degradation control attributes. These attributes promote increased consumer safety and confidence in food product options stored within enclosures provided by the current invention by decreasing the degradation of water-based adhesives and, thereby, reducing the potential risk of contamination of food product when stored within exemplary embodiments. The material(s) degradation control attributes, which can be similar in all respects to the atmospheric control attributes or provided in various different configurations and positions, promote the optimization of water vapor content, condensate content and/or water content (collectively referred to herein as "moisture level(s)") within the enclosure storing the respiring food product. This optimization is typically a decrease, which can range from extreme, to significant, to influence, to minor and other affects as may be contemplated, in the moisture level(s) present within the enclosure. It is contemplated that these degradation control attributes can alternatively provide for a modulated and controlled increase in the moisture level(s), typically to establish and maintain a moisture level(s) within an acceptable range based on a desired MVTR. The promoted decrease and/or increase in moisture level(s) and, thereby, MVTR(s) can operate in synergy with the advantageous promotion of the various other atmospheric conditions as described herein for the current invention. The promoted influence on moisture level(s), directly and indirectly, can further promote and impact upon any water based adhesive by preventing, terminating, decreasing, reducing, retarding/slowing, and/or otherwise providing a modulating or controlling influence over the degradation or rate of degradation of any water based adhesive that is employed in exemplary embodiments of the current invention. Thus, the degradation control attributes promote an increased consumer confidence and safety level in a food product stored within an enclosure provided by the current invention by promoting a decreased risk of material(s) degradation and exposure of the food products to any contaminants while stored within an enclosure provided by the current invention. This total MVTR control provided by the current invention promotes desirable atmospheric conditions within the resealable packaging device and thereby provides all the advantages of the current invention. These advantages include the promotion of desirable marketable characteristics, significantly reduced deterioration for longer periods of time and prolonged shelf-life for the food product. Packaging devices that lack the MVTR controls of the current invention can fail to provide any of the advantages of the current invention and thereby the food product quality can be significantly deteriorated, the observation and/or presence of undesirable marketable characteristics can be seen earlier and may be more pronounced and shelf-life can be significantly reduced. All these failures can have a significantly negative impact upon the marketable characteristics and, therefore, potential commercial success for any packaged food product and, as such, may have a significant negative impact upon the choices, variety and quality provided to consumers of food products.

It is contemplated that for adhesive layer construction and function it is useful to have the high and almost similar surface energy on sealable and peelable layer sides to which PSA (i.e., water based and/or water impermeable or partially water impermeable) is applied. The surface energy of the package layers to which PSA is applied can be from 30 to 70 dynes/cm$^2$, more preferably 35 to 60 dynes/cm$^2$. In addition, the bond strength properties of the adhesive layer are a factor in construction and configuration. Details of the bond strength are shown in examples 12 and 13 of this invention. The adhesive bond strength may be from 0.1 to 2.5 lbs/inch, more preferably from 0.2 to 2.0 lbs/inch.

The bonding of the adhesive layer(s) to the non-adhesive layer(s) (i.e., flexible and breathable plastic films) may be affected by modifying any surface, or a partial amount thereof, of the non-adhesive layer(s) by applying a corona treatment, through a plasma processing or such other techniques and technologies as are contemplated by those skilled in the art. It is contemplated that various components, such as surfactants, release agents and the like, can be added to any adhesive and/or adhesive layer utilized in providing exemplary embodiments of the current invention. Still further, it is contemplated that various adhesive formulations that promote the maintenance of an adhesive's "tack" in cooler or higher temperatures and/or temperature ranges may be used for and without departing from the scope and spirit of the present invention.

Use of a weak adhesive polymer layer covering the entire surface area of a side of the peelable layer is contemplated. As used herein, the "weak adhesive polymer layer" comprises a pressure sensitive adhesive. The weak adhesive polymer layer selectively covers a percentage of the surface area of a side of the peelable layer that is less than the total surface area, of the RF and/or RPD. For example, the adhesive layer may cover 0.1% to 50% of the surface area of the peelable layer. In further embodiments, the adhesive (weak polymer) layer is selectively applied to a side along the edges of the peelable layer or at specific edges of the peelable layer covering a percentage of the surface area necessary to allow peel/reseal functionality and utility of the current invention.

The structure of any of the exemplary embodiments may include one or more non-adhesive layers, such as the base film/layer and/or peelable layer, having various physical characteristics including, without limitation, the thickness of the materials used in constructing the layer(s). For instance, it is contemplated that the base film or heat sealable layer of any exemplary RF and/or RPD embodiment can be constructed having a material thickness ranging from 0.5 to 5.0 mil, more preferably from 0.5 to 2.5 mil. Further, the peelable layer and other layers utilized in forming exemplary RF and/or RPD embodiments can be constructed having a material thickness ranging from 0.5 to 5.0 mil, more preferably between 0.5 and 2.5 mil. Still further, a peelable layer can be provided having a material thickness 1.02 mil, 1.0 mil or 2.23 mil. Alternative thicknesses for non-adhesive layers are contemplated for use by the current invention.

It is contemplated that any non-adhesive layer can be established as a single component layer or with two or more component layers and that the component layers may be of similar or different compositional characteristics. Given the identified specifications above for non-adhesive and/or adhesive layers that may comprise various exemplary embodiments of the current invention, it is contemplated that the RF may have a total thickness ranging from 1.0 to 8.0 mil. In preferred embodiments, the RF total thickness ranges from 2.0 to 5.0 mil. In other preferred embodiments, the RF total thickness ranges from 2.25 to 2.35 mil. In additional preferred embodiments, the RF total thickness ranges from 4.00 to 4.25 mil.

Material(s) used in constructing any exemplary embodiments herein described can have various properties and/or composition characteristics and/or qualities. The physical composition of an exemplary RF and/or RPD can include, but is not necessarily limited to, mechanical properties such as thickness, tensile strength, puncture resistance, laser absorption properties and such other properties as contemplated by those skilled in the art. For example, tensile strength may vary to promote improved commercial performance, such as lasting longer and/or reducing time, cost and/or waste in the construction and configuration of the exemplary embodiments of the current invention. The chemical composition can include, but not be limited to, the type of materials, polymer and additives used in manufacturing the layers.

Materials used can include one or more polymeric base films and/or stock. Other material(s) as contemplated by those skilled in the art may be used in constructing exemplary embodiments. It is contemplated that the films, components and/or layers ("films") used for any embodiment and/or component of the current invention may be any one of or combination of polymer groups such as polyalkenes (e.g., polyethylene—low density, low linear density, high density; polyethylene terephthalate (PET), amorphous polyethylene terephthalate (APET), etc.), polyvinyls (e.g., polypropelene, poly-propylene (PP)), polystyrenes (e.g., polyvinyl chloride), polysiloxanes (e.g., silicone rubber), and polydiens (e.g., natural rubber). Further, these films may be extruded from a single polymer and/or blends of various polymers where each polymer performs a specific function, such as contributing permeability, strength, transparency, sealability, or machineability, to meet specific product requirements. Similarly, the material(s) of the films may be processed using various technologies and treatment applications, such as lamination, to provide the packaging device with specific properties and for achieving particular configurations.

The films employed for the RF and/or RPD structures can be composite, wherein at least one layer or component of the structure is different in composition including without limitation, physical or chemical composition, than the other layers thereby forming a breathable composite peel/reseal structure. The construction and/or configuration of a breathable composite peel/reseal structure can be similar to the construction of the exemplary RF and/or RPD (breathable peel/reseal) structures described above, as such the breathable composite peel/reseal structure can be produced as a roll/lid-stock, film, and/or various other materials and constructs as described herein. In an example, a packaging system enclosing food product can be a rigid tray connected to or integrated with a breathable composite RF structure forming a composite RPD, thereby allowing for the sealing of the food product within the enclosure of the structure. In an alternative example, the RPD containing the food product can be a flexible bag or a standup pouch that can be sealed by and with the composite RF structure.

It is contemplated that the component layers of the RF and/or RPD may be constructed from materials designed to have varying properties, such as higher/lower permeability characteristics, thereby, affecting the material's direct gas transmission properties. It is also contemplated for exemplary embodiments of the current invention that the breathability is, at least in part, achieved through one or more perforations (micro- and/or macro-perforation) of the film layer or more than one film layers forming the RF. Alternatively, the breathability can be achieved, at least in part, by creating and locating one or more micropores, slots or slits in one or more than one of the RF component layers, thereby affecting the gas transmission rates achievable by the current invention. Alternatively, breathability may be achieved, through the chemical composition of the co-extruded layers of the RF if the food to be packaged in RPD has a breathability or $O_2$ transmission requirement of 180 cubic centimeters per 100 square inches RF per day or lower.

The RF can provide a total gas transmission rate comprising the transmission rate through any one or combination of the base film, peelable film and the atmospheric control attributes. In exemplary embodiments, the total gas transmission rate of oxygen for the RF itself is, in units of cubic centimeters per 100 square inches per day, 50 or higher; preferably 500 or higher, more preferably 1000 or higher. The rate of transmission of oxygen for the RF itself is, in units of cubic centimeters per 100 square inches per day is 100,000 or lower; preferably 10,000 or lower, more preferably 5000 or lower.

The total gas transmission rate of carbon dioxide for the RF itself is, in units of cubic centimeters per 100 square inches per day is, 100 or higher; preferably 500 or higher, more preferably 1000 or higher. The rate of transmission of oxygen for the RF itself is, in units of cubic centimeters per 100 square inches per day is 200,000 or lower; preferably 100,000 or lower, more preferably 50,000 or lower.

The total transmission rate of water vapor for the RF itself is, in units of grams per 100 square inches per day is, 0.001 or higher; preferably 0.005 or higher, more preferably 0.01 or higher. The rate of transmission of water vapor for the RF itself is, in units of grams per 100 square inches per day is 100 or lower; preferably 50 or lower, more preferably 35 or lower.

The current invention promotes the maintenance of a moisture level within the enclosure, such that condensate is continually maintained at minimal to low levels within the interior atmosphere of the packaging device. As such, exemplary embodiments of the current invention can provide a transmission rate based on units of grams per 100 square inches per day ranging from 0.001 to 0.1, more preferably 0.01 or higher, for water vapor content present in an interior atmosphere of the enclosure. The presence of condensate at proper amounts promotes the quality and prolonged/extended shelf-lives. As described herein below, the current invention can promote the maintenance of a desired relative humidity (i.e., 60-100% RH) within the internal atmosphere of an enclosure, thereby ensuring the proper moisture content within.

It is contemplated that the first layer, peelable layer or any other layers as indicated for these and other preferred embodiments, can be printed on and include various designs, symbols, logos, labels, insignia and other identifying marks. The printing techniques can include surface printing, reverse printing and such other techniques as may be contemplated by those skilled in the art. The printing may take place on either side of a layer, more preferably on the side of a layer that faces away from the enclosure or towards the environment outside the internal environment provided by the RF and/or RPD of the current invention. The printing can cover an amount of the surface area of a layer, such amount can vary from all to a small percentage (>0.1%); preferably >10% but <90%; and more preferably >20% but <70% of the total surface area of the printed layer.

It is contemplated that during a method of manufacturing an RF and/or resealable packaging device various identifiers, such as a label, logo, symbol, sign, indicator, insignia and other identifying marks may be included. These various identifiers may be printed on the layers of the device, integrally formed upon or connected to the layer(s) of the resealable packaging device. Alternatively, connection of various identifiers may occur by adhesion through the use of various adhesives, sealants, and the like as contemplated by those of ordinary skill in the art.

Figure 1B:
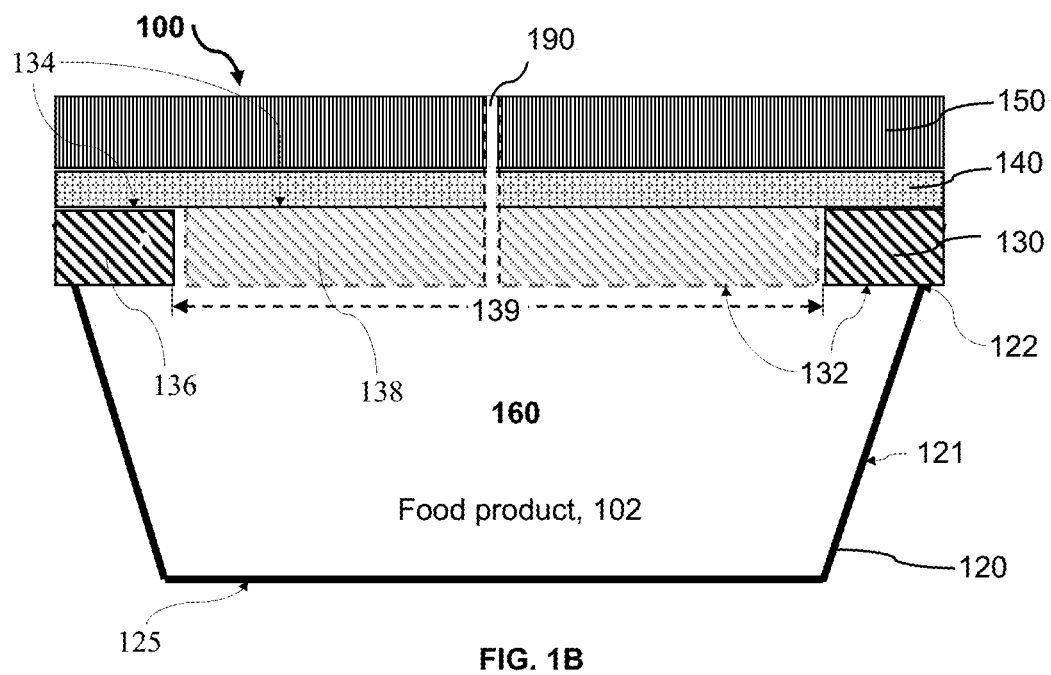
FIG. 1B is an illustration of the resealable film structure shown in FIG. 1A connected with a storage container forming a resealable packaging device including an enclosure within which food product can be located, wherein an interior environment is in communication with an exterior environment via the atmospheric control attribute(s) and can be accessed via the opening in accordance with an exemplary embodiment of the current invention.
Figure 1C:
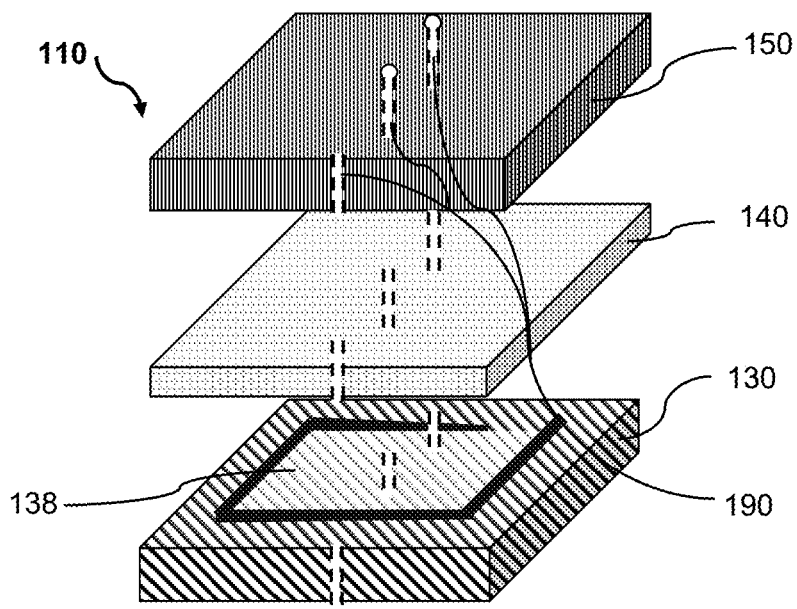
FIG. 1C is an exploded-view illustration of the resealable film structure shown in FIG. 1A.

In the preferred embodiments shown in FIGS. 1A, 1B and 1C, a resealable packaging device (RPD) 100 having a resealable film (RF) 110 connected to a storage container 120, thereby defining an enclosure 160, is provided. The storage container 120 is defined by a sidewall 121 with opposing sections continuously extending from its connection along a bottom edge 123 with a bottom wall 125. The sidewall 121 includes a continuous top edge 122 which defines an open perimeter that exposes the interior surfaces of the sidewall 121 and the bottom wall 125.

The RF 110 comprises three component layers, a first layer ("first flexible film" or "heat sealable layer") 130 that can be surface printed and designed to be heat sealable, an adhesive second layer 140 and a peelable third layer (peelable and/or second flexible film) 150. The first layer 130 has a bottom surface 132 and top surface 134 and is comprised of two connected sections, a sealing section or segment 136 connected with a resealable, removable or re-closable section 138 (also collectively referred to herein as "removable section" or "removable segment"). The first layer 130 is of a heat sealable design allowing at least a portion of the bottom surface 132 of the sealing section 136 of first layer 130 to be sealed and/or connected to the top edge 122 of the sidewall 121 of container 120. It is contemplated that the sealing of the first side 132 with edge 122 is accomplished using a tray sealing machine to create weld seal. Other techniques and/or technologies for connecting any layer of an RF with a storage container can be utilized as described herein and as may be contemplated by those skilled in the art. The first layer 130 has and is constructed with a material height or thickness of 1.2 mil. It is contemplated that the heat sealable layer of any exemplary RF and/or RPD embodiment can have and/or be formed with a material thickness ranging from 0.5 to 5.0 mil, more preferably from 0.5 to 2.5 mil. It is contemplated that the RF 110 can connect with various packaging devices and/or technologies to provide an enclosure capable of at least partially encompassing food product, 102 within.

With the first layer 130 sealed to the top edge 122 of container 120 the enclosure 160 is defined as the space that exists between opposing sidewall 121 sections and between the bottom surface 132 and the bottom wall 125. It is within enclosure 160 that various food products, as exemplified by food product 102 in the current embodiment, can be stored and located. The food products having various respiration characteristics, such as low, medium and/or high respiration rates.

When RF 110 is closed, as shown in the current embodiment, the enclosure 160 is understood as having an interior space that defines an interior atmosphere or environment. This environment comprising various environmental conditions as discussed previously herein. More particularly, when food product 102 is located in enclosure 160, the respiration characteristics impact upon the interior atmosphere and conditions, such as the concentrations of various gases, water vapor and/or agents present.

RF 110 includes atmospheric control attributes 190. The atmospheric control attributes being designed and included to provide a total open area for the RF and RPD that promotes the optimization of the interior atmosphere of enclosure 160, particularly when food product is encompassed therein. As discussed previously, the configuration, number, size and density of the atmospheric control attributes can vary to provide a desired per perforation open area and total open area. The atmospheric control attributes 190 are configured as three (3) micro-perforations and are open through all layer connecting the enclosure 160 and thereby the food product 102 to the external environment.

In the preferred embodiments of FIGS. 1A-1D, each of the atmospheric control attributes 190 are positioned and configured to provide an opening that extends through RF 110 and the removable section 138 of first layer 130. This provides a communication or synergistic interaction between the enclosure 160 and an exterior atmosphere outside the RPD 100 allowing and, at least in part, controlling transmission characteristics and properties. As described, the atmospheric control attributes are micro-perforations. The micro-perforations established can include one (1) to one hundred (100) micro-perforations, wherein each micro-perforation has a diameter of one hundred microns (100 μm) providing a per perforation open area of $7.85 \times 10^9$ m$^2$. The configuration of the atmospheric control attributes 190 for FIGS. 1A-1C provides a total open area of $2 \times 10^{-8}$ m$^2$. It is contemplated that a total open area of $7.85 \times 10^{-9}$ to $7.85 \times 10^{-7}$ m$^2$ can be established for the preferred embodiment.

It is contemplated for the current preferred embodiments of FIGS. 1A-1D that it include micro-perforations with diameter sizes of: (i) 75 microns (75 μm) providing a per perforation open area of $4.415625 \times 10^{-9}$ m$^2$; (ii) 90 microns (90 μm) providing a per perforation open area of $6.3585 \times 10^{-9}$ m$^2$; (iii) 100 microns (100 μm) providing a per perforation open area of $7.85 \times 10^{-9}$ m$^2$; (iv) 120 microns (120 μm) providing a per perforation open area of $1 \times 10^{-8}$ m$^2$; (v) 130 microns (130 μm) providing a per perforation open area of $1 \times 10^{-8}$ m$^2$; (vi) 150 microns (150 μm) providing a per perforation open area of $2 \times 10^{-8}$ m$^2$; (vii) 240 microns (240 μm) providing a per perforation open area of $5 \times 10^{-8}$ m$^2$; or (viii) such other sizes and per perforation open area as may provide the atmospheric promotional advantages. It is contemplated for exemplary embodiments, RF per unit package and/or RPD, of the current invention that the total open area provided by the atmospheric control attributes may range generally from $1.5 \times 10^{-11}$ m$^2$ to $1.5 \times 10^4$ m$^2$.

In the preferred embodiments shown in FIGS. 1A-1C, the 3 layers are shown connected and separated, as in the exploded view of FIG. 1C. The first layer (first flexible film) 130 is die-cut to form a desired shape for the removable section 138 and a desired shape of opening 139. The cut (die-cut) may be made once the layers of the RF and/or RPD are created, forming a continuous opening 139. With this configuration, the peelable layer 150, as connected to the removable section 138 via adhesive layer 140 has an original position, that is substantially closed or sealed over the opening 138 and enclosure 160. When peeling back the peelable layer 150, as connected to the removable section 138 via adhesive layer 140, it peels away and separates from the sealing section 136 and the top surface 134 of the first flexible film layer 130 and exposes the opening 139 and, thereby, enclosure 160. This configuration is designed to peel back completely and separate the removable section 138, the adhesive layer 140 and second flexible film layer 150 from the container 120. It is contemplated that for the adhesive layer 140 and second flexible film layer 150 that at least a portion to all of each or both of these layers can be peeled back completely and separated from container 120.

The peeled back and separated removable segment 138, adhesive layer 140 and second flexible film layer 150 can also be re-positioned, re-sealed and/or re-closed back into its original "closed" position that it was prior to being peeled away and separated from the first film layer 130 and container 120. In this manner, the current invention promotes the re-sealing and/or re-closing of the opening 138 and, thereby, enclosure 160. This re-sealing and/or re-closing capability provided allows a food product, stored in enclosure 160, to be re-closed within an interior atmosphere of the enclosure 160 after having been exposed to the exterior atmosphere outside the container 120. As such, the atmospheric control attributes 190 can once again provide to the re-closed RPD 100 the advantages of promoting an optimization of the interior atmosphere for the food product.

It shall be understood that the use of the terms "resealable", "removable" and/or "re-closable" herein, including in the claims, are non-limiting, non-restrictive and are intended to provide an indication of a capability being provided by any of the exemplary embodiments described and claims for the current invention. In this context, it is understood that the peeling away of the removable segment of any exemplary RF embodiment described herein results in at least a partial loss of connection between it and other segments to which it is connected, such as the sealable segment of the first film layer 130 described for this embodiment and contemplated such other non-adhesive layer configurations as may be contemplated. Thus, when the removable segment is reclosed into a closed position, it may or may not form the same or a similar connection with the other segment (e.g., sealable segment) as it originally had. For exemplary embodiments described herein, an opening may be provided in a film layer and a second film layer may cover the opening when established in a closed position. The closed position of such an embodiment not necessarily requiring a removable segment formed in a desired configuration. The second layer being able to peel away from the first layer to open or expose the opening and, thereby, an enclosure, is also enabled to be resealed to or re-closed with the first layer and, thereby, re-close the opening and enclosure. It being understood that such a second film layer may comprise such other multiple additional non-adhesive and/or adhesive layers as may be contemplated. However, it shall be understood that the re-closing of either the removable segment as connected to various additional layers or the opening in a non-adhesive layer positions it in a manner whereby the atmospheric control attributes are once again enabled to provide to the RF and/or RPD the advantages of promoting an optimization of the interior atmosphere for a food product in an enclosure. In an alternative embodiment, a cut (die-cut) can be made on the first layer forming an opening prior to the adhesion of the first layer to a peelable layer. In this example, exposing the opening on the first layer, by peeling back the peelable layer, does not remove portions of the first layer with the peelable layer. In a further alternative, the opening 139 can be formed using a registered technique, wherein the connection of the removable section 138 with the sealable section 136 is not fully compromised. For example, a length of the removable section 138 can be left fully connected and/or integrated with sealable section 136. Thus, when the layers and removable section 138 are peeled back at least a portion stays attached to the first flexible film 130 and cannot be separated completely from container 120. It is further contemplated that the first layer may be cut using various technologies and techniques, such as being laser drilled or scored with mechanical or laser methods to any desired shape to allow forming of an opening 139.

The technique(s) used to establish the removable section 138, such as the die-cut and registered die-cut disclosed, are designed to help promote the optimization of various internal atmospheric conditions, including one or combination of $O_2$, $CO_2$, $C_2H_4$ and $H_2O$ vapor concentrations, in the enclosure 160 within which a food product, 102 is located, even after the peelable second flexible film (third) layer 150 of the RF 110 is peeled and resealed. When the layers and removable section 138 are in the position shown in FIG. 1B the opening is closed and as such the enclosure 160 is closed. In this configuration the atmospheric control attributes 190 promote the optimization of the interior atmosphere and provide the interaction between the interior atmosphere of enclosure 160 and an exterior atmosphere outside the closed resealable packaging device 100. When the layers and removable section 138 are peeled back the opening 139 and enclosure 160 is exposed or open to the exterior atmosphere. It is understood that atmospheric control attributes 190, when the removable section 138 and layers 140 and 150 are re-positioned over enclosure 160 after exposure to the exterior atmosphere, will interact with the interior atmosphere of the enclosure 160 and promote its optimization. It is contemplated that the atmospheric control attributes provide their synergistic interaction with any interior atmospheric conditions found, even after the exposure of an enclosure and any food product stored therein to an exterior atmosphere, and, thereby, promote the optimization of the interior atmosphere throughout the use of the RF and/or RPD.

Figure 1D:
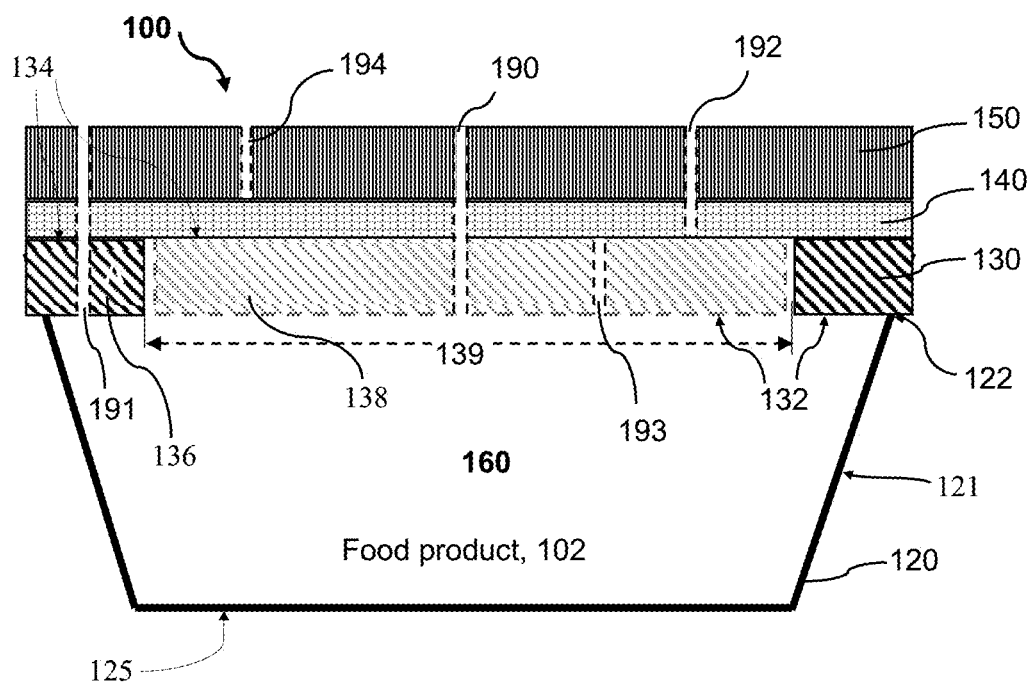
FIG. 1D is an illustration of a three-layer resealable film structure connected with a storage container forming a resealable packaging device including an enclosure within which food product can be located, wherein an interior environment is in communication with an exterior environment via a plurality of differently configured atmospheric control attribute(s) and can be accessed via an opening in accordance with an exemplary embodiment of the current invention.

The RPD 100, as shown in FIG. 1D, is similar to the RPD 100 of FIGS. 1A-1C, except for the addition of atmospheric control attributes 191, 192, 193 and 194 located in the RF 110. The plurality of atmospheric control attributes 191 to 194 are configured as micro-perforations. The atmospheric control attribute 191 provides an opening through all layers of RF 110, and more particularly through the sealable section 136 of first layer 130. Atmospheric control attribute 192 provides an opening completely through the second flexible film 150 and adhesive layer 140. Atmosphere control attribute 193 provides an opening completely through the removable section 138 of first flexible film 130 and atmospheric control attribute 194 provides an opening completely through the second flexible film 150. In the current embodiment atmospheric control attributes 190 and 191 can be similarly configured, including length as both extend entirely through RF 110, but established through different sections of the first layer 130. Atmospheric control attributes 192, 193 and 194 may have similar or different diameters when compared against one another and/or atmospheric control attributes 190 and 191. As shown, atmospheric control attribute 192 has a length dimension that extends it through layers 150 and 140, atmospheric control attribute 193 has a length dimension that extends it through the removable section 138 of first layer 130 and atmospheric control attribute 194 has a length dimension that extends it through layer 150. Thus, the atmospheric control attributes 192, 193 and 194 have distinct volumetric configurations based on the thickness of material(s) that each extends through. In the alternative or addition to, the one or plurality of atmospheric control attributes may be, at least partially, located in the RPD 100. The configuration, location, number, size, density, open area and the like of the atmospheric control attribute(s) located in an exemplary RPD and/or RF can vary to accommodate varying configurations of the RF 110 and/or container 120 and/or the use of the RPD 100 with various food products without departing from the scope and spirit of the current invention.

Various food products 102 can be located within the enclosure 160 of RPD 100. As described herein, these food products can include various perishable and/or non-perishable food products. The RF 110 connects with the storage container 120 and covers the enclosure 160. The peelable third layer 150 of the RF 110 can be peeled away from the first layer 130 thereby exposing opening 138 within the first layer 130 and exposing the enclosure 160. This allows access to the enclosure 160 and any items therein, such as food product 102.

In the preferred embodiments, the plurality of atmospheric control attributes 190 to 194 located in the RF 110 provides the breathable utility of the RF 110 and breathability for the interior atmosphere of enclosure 160 of RPD 100. As such, the atmospheric control attributes 190 or 190 in conjunction with 191 through 194 promotes the optimization of the interior atmosphere of the enclosure 160 and the quality protection of the food product 102 therein, by affecting the respiring and gas sensitive food product 102. The effects that may be provided by the current invention can promote the optimization of various internal atmospheric conditions, including one or combination of $O_2$, $CO_2$, $C_2H_4$ and $H_2O$ vapor concentrations, in the enclosure 160 within which a food product, 102 is located. As described herein, this optimization of enclosure atmospheric conditions for food product located therein can include, without limitation, the establishment, modulation and/or maintenance of various amounts, ranges of amounts, concentrations, ratios and the like, of the presence of various gases, moisture content, chemical and such other atmospheric factors as may be contemplated as present in the internal atmosphere of the enclosure.

It is contemplated that the first layer, peelable layer or any other layers as indicated for these and other embodiments, can be constructed of various materials and printed on and include various designs and/or include a label. In the preferred embodiment, the material used for the RF 110 and storage container 120 are polymeric that have at least one polymer common in their composition to aid in creating a weld seal. As described herein, alternative materials, including composite materials, may be used for and in the construction of the RF 110 and/or storage container 120 of the RPD 100. It is also contemplated that the materials used for the RF 110 can be different than that used for storage container 120. For instance, the storage container 120 can be formed from materials that are more rigid and less breathable than the materials used for the RF 110 and/or vice versa. Various alternatives as may be contemplated by those skilled in the art can be employed without departing from the scope and spirit of the current invention.

The printing techniques can include surface printing, reverse printing and such other techniques as may be contemplated by those skilled in the art. The printing may take place on either side of a layer, more preferably on the side of a layer that faces away from the enclosure or towards the environment outside the internal environment provided by the RF and/or RPD of the current invention. The printing can cover an amount of the surface area of a layer, such amount can vary from all to a small percentage (>0.1%) of the total surface area of the first layer. It is contemplated that the current invention may not include any printing or may include any amount of printing. The printing does or does not, may or may not impact upon any of the capabilities provided by the current invention.

The adhesive layer 140 comprises a pressure sensitive adhesive and provides a material thickness of 0.51 mil. Alternative adhesives and thicknesses are contemplated for use by the current invention. It is contemplated that the adhesive layer(s) of any exemplary RF and/or RPD embodiments can be constructed having a material thickness ranging from 0.01 to 3 mil, more preferably from 0.1 to 1 mil. The adhesive layer contemplated for use by embodiments of the current invention can be formed utilizing various adhesives and/or compounds including, without limitation, heat sensitive adhesive(s), pressure sensitive adhesive(s) and the like, as may be contemplated. Still further, the adhesive layer can be formed using adhesives with various properties and/or characteristics, such as strong and/or weak adhesive characteristics and the like. The structure of any of the exemplary embodiments may include one or more adhesive layers having various physical characteristics including, without limitation, the thickness of the adhesive materials used in constructing the layer(s).

The adhesive second layer 140 of the current embodiment has a total adhesive (TA), as measured in weight/unit area ($g/m^2$), of 34.42 $g/m^2$. Given the identified specifications above for the adhesive layers that may comprise various exemplary embodiments of the current invention, it is contemplated that the adhesive layers may have a total adhesive (TA), as measured in weight/unit ($g/m^2$), ranging from 1 to 100 $g/m^2$ and more preferably from 5 to 70 $g/m^2$. It is further contemplated that the adhesive layer can provide a moisture control feature and/or factor that impacts upon the water vapor content within the resealable packaging device. In the current embodiment, this comprises the use of water impermeable or partially water permeable PSAs in the adhesive layer 140 to provide a moisture control feature that promotes a decrease in the water vapor content present within the interior atmosphere provided for food product stored within the enclosure 160 of the resealable packaging device 100. The moisture control feature and/or factor can be established within the chemical composition of the adhesive for use in embodiments of the current invention. It is contemplated that the current invention can employ the use of one or more desiccants or other moisture adsorption technologies.

The use of atmospheric control attributes and inherent gas transmission properties of the materials can provide the resealable packaging device embodiment a total Moisture Vapor Transmission Rate (MVTR) of 0.1 to 165 g/100 sq. in/day. This total MVTR control provided by the current invention promotes desirable atmospheric conditions within the resealable packaging device and thereby provides all the advantages of the current invention. These advantages include the promotion of desirable marketable characteristics, significantly reduced deterioration for longer periods of time and prolonged shelf-life for the food product. Packaging devices that lack the MTVR controls of the current invention can fail to provide any of the advantages of the current invention and thereby the food product quality can be significantly deteriorated, the observation and/or presence of undesirable marketable characteristics can be seen earlier and may be more pronounced and shelf-life can be significantly reduced. All these failures can have a significantly negative impact upon the marketable characteristics and, therefore, potential commercial success for any packaged food product and, as such, may have a significant negative impact upon the choices and quality provided to consumers of food products.

The peelable third layer 150 is constructed having a material height or thickness of 1.02 mil. Various layers utilized in forming exemplary RF and/or RPD embodiments can be constructed having a material thickness ranging from 0.5 to 5.0 mil, more preferably between 0.5 and 2.5 mil. Alternative thicknesses for non-adhesive and/or peelable layers are contemplated for use by the current invention.

Given the identified specifications for RPD 100, the total thickness for the RF 110 is 2.65-2.75 mil. It is contemplated that the RF may have a total height or thickness ranging from 1 to 8 mil or other alternative ranges of height or thickness as contemplated by those skilled in the art. In other preferred embodiments, the RF total thickness ranges from 2.25 to 2.35 mil. In additional preferred embodiments, the RF total thickness ranges from 4.00 to 4.25 mil.

Figure 2A:
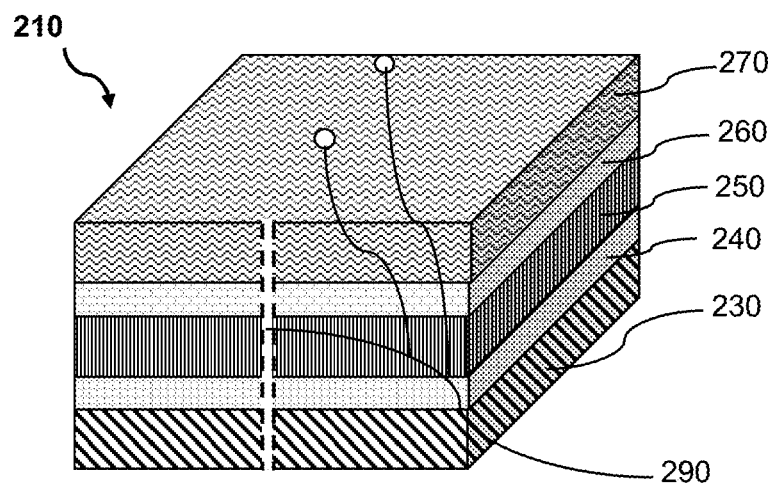
FIG. 2A is an illustration of a resealable film structure comprising a five-layer resealable film structure with a plurality of atmospheric control attributes in accordance with an exemplary embodiment of the present invention.
Figure 2B:
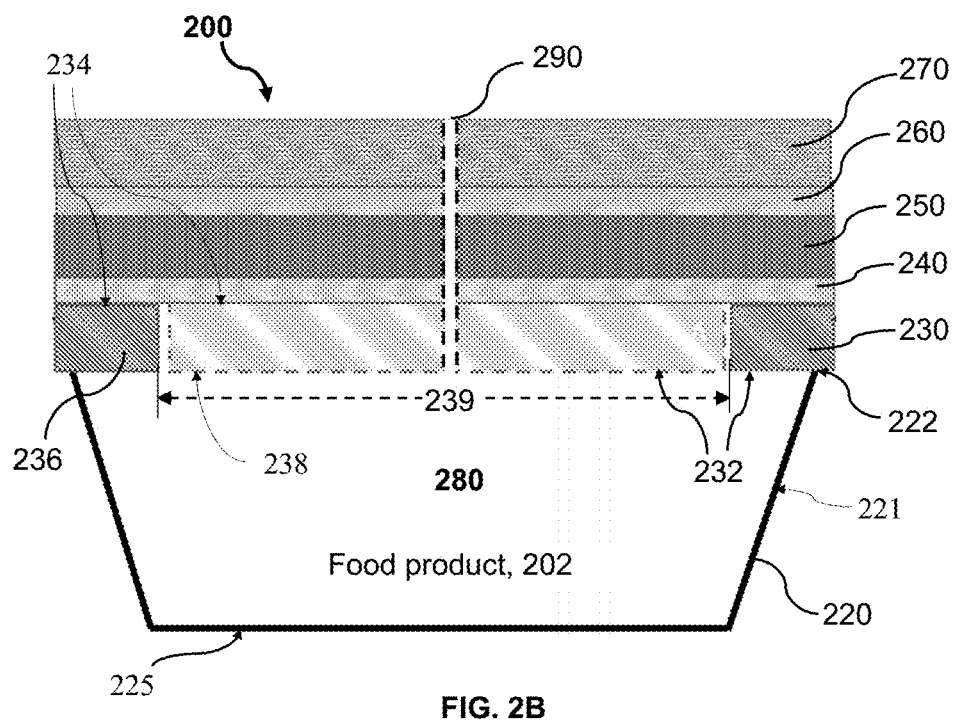
FIG. 2B is an illustration of the resealable film structure shown in FIG. 2A connected with a storage container forming a resealable packaging device including an enclosure within which food product can be located, wherein an interior environment is in communication with an exterior environment via the atmospheric control attribute(s) and can be accessed via the opening in accordance with an exemplary embodiment of the current invention.
Figure 2C:
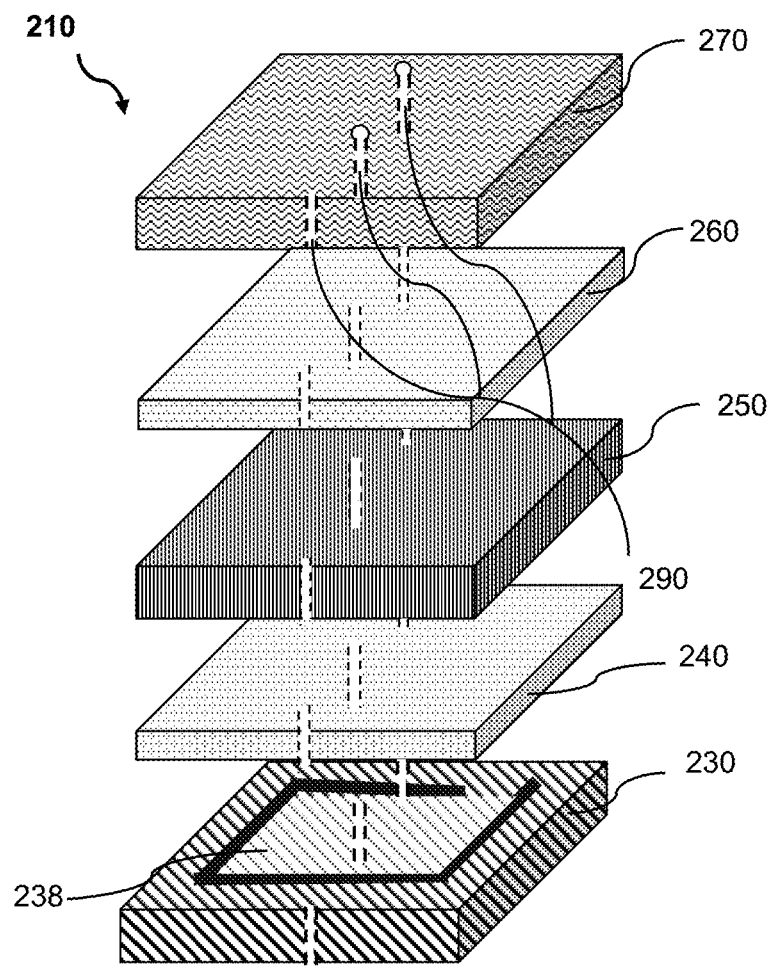
FIG. 2C is an exploded-view illustration of the five-layer resealable film structure shown in FIG. 2A.

In the preferred embodiments shown in FIGS. 2A, 2B and 2C, a resealable packaging device (RPD) 200 having a resealable film (RF) 210 connected to a storage container 220, thereby defining an enclosure 280, is provided. The storage container 220 is defined by a sidewall 221 with opposing sections continuously extending from its connection along a bottom edge 223 with a bottom wall 225. The sidewall 221 includes a continuous top edge 222 which defines an open perimeter that exposes the interior surfaces of the sidewall 221 and the bottom wall 225.

The resealable film 210 comprises five component layers, a first layer ("first flexible film" or "heat sealable layer") 230 that is designed to be heat sealable and may be surface printed, an adhesive second layer 240, a peelable third layer 250, which is bonded or laminated with lamination layer 260 to fifth layer 270. The first layer 230 has a bottom surface 232 and top surface 234 and is comprised of two connected sections, a sealing section 236 connected with a resealable or removable section 238. The first layer 230 is of a heat sealable design allowing at least a portion of the bottom surface 232 of the sealing section 236 of first layer 230 to be sealed and/or connected to the top edge 222 of the sidewall 221 of container 220. It is contemplated that the sealing of the first side 232 with edge 222 is accomplished using a tray sealing machine to create weld seal. Other techniques and/or technologies for connecting any layer of an RF with a storage container can be utilized as described herein and as may be contemplated by those skilled in the art. The first layer 230 has and is constructed with a material height or thickness of 1.2 mil. It is contemplated that the heat sealable layer of any exemplary RF and/or RPD embodiment can have and/or be formed with a material thickness ranging from 0.5 to 5.0 mil, more preferably from 0.5 to 2.5 mil. It is contemplated that the RF 210 can connect with various packaging devices and/or technologies to provide an enclosure capable of at least partially encompassing food product, 202 within.

With the first layer 230 sealed to the top edge 222 of container 220 the enclosure 280 is defined as the space that exists between opposing sidewall 221 sections and between the bottom surface 232 and the bottom wall 225. It is within enclosure 280 that various food products, as exemplified by food product 202 in the current embodiment, can be stored and located. The food products having various respiration characteristics, such as low, medium and/or high respiration rates.

When RF 210 is closed or sealed, as shown in the current embodiment, the enclosure 280 is understood as having an interior space that defines an interior atmosphere or environment. This environment comprising various environmental conditions as discussed previously herein. More particularly, when food product 202 is located in enclosure 280, the respiration characteristics impact upon the interior atmosphere and conditions, such as the concentrations of various gases, water vapor and/or agents present.

RF 210 includes atmospheric control attributes 290. The atmospheric control attributes being designed and included to provide a total open area for the RF and RPD that promotes the optimization of the interior atmosphere of enclosure 280, particularly when food product is encompassed therein. As discussed previously, the configuration, number, size and density of the atmospheric control attributes can vary to provide a desired per perforation open area and total open area. The atmospheric control attributes 290 are configured as three (3) micro-perforations and are open through all layers connecting the enclosure 280 and thereby the food product 202 to the external environment.

In the preferred embodiments of FIGS. 2A-2D, each of the atmospheric control attributes 290 are positioned and configured to provide an opening that extends through RF 210 and the removable section 238 of first layer 230. This provides a communication or synergistic interaction between the enclosure 260 and an exterior atmosphere outside the RPD 200 allowing and, at least in part, controlling transmission characteristics and properties. As described, the atmospheric control attributes are micro-perforations. The micro-perforations established can include one (1) to one hundred (100) micro-perforations, wherein each micro-perforation has a diameter of one hundred thirty microns (130 μm) providing a per perforation open area of $1 \times 10^{-8}$ m$^2$. The configuration of the atmospheric control attributes 290 for FIGS. 2A-2C provides a total open area of $4 \times 10^{-8}$ m$^2$. It is contemplated that a total open area of $1.33 \times 10^{-8}$ m$^2$ to $1.33 \times 10^{-6}$ m$^2$ or $7.85 \times 10^{-9}$ to $7.85 \times 10^{-7}$ m$^2$ can be established for the preferred embodiments of FIGS. 2A-2D.

It is contemplated for the current preferred embodiments of FIGS. 2A-2D that it include micro-perforations with diameter sizes of: (i) 75 microns (75 μm) providing a per perforation open area of $4.415625 \times 10^{-9}$ m$^2$; (ii) 90 microns (90 μm) providing a per perforation open area of $6.3585 \times 10^{-9}$ m$^2$; (iii) 100 microns (100 μm) providing a per perforation open area of $7.85 \times 10^{-9}$ m$^2$; (iv) 120 microns (120 μm) providing a per perforation open area of $1 \times 10^{-8}$ m$^2$; (v) 130 microns (130 μm) providing a per perforation open area of $1 \times 10^{-8}$ m$^2$; (vi) 150 microns (150 μm) providing a per perforation open area of $2 \times 10^{-8}$ m$^2$; (vii) 240 microns (240 μm) providing a per perforation open area of $5 \times 10^{-8}$ m$^2$; or (viii) such other sizes and per perforation open area as may provide the atmospheric promotional advantages. It is contemplated for exemplary embodiments, RF per unit package and/or RPD, of the current invention that the total open area provided by the atmospheric control attributes may range generally from $1.5 \times 10^{-11}$ m$^2$ to $1.5 \times 10^{-4}$ m$^2$.

In the preferred embodiments shown in FIGS. 2A-2C, wherein 2C shows the 5 layers are separated and shown as exploded view of FIG. 2A. The first layer (first flexible film) 230 is die-cut to form a desired shape for the removable section 238 and a desired shape of opening 239. It is further contemplated that the first layer may be cut using various technologies and techniques, such as being laser drilled or scored with mechanical or laser methods to any desired shape to allow forming of an opening 238 during peeling. The cut (die-cut) may be made once the layers of the RF and/or RPD are created, forming a continuous opening 239. With this configuration, when peeling back the peelable layer 250 connected to the removable section 238 via adhesive layer 240 it exposes the opening 239. This configuration is further designed to peel back completely and separate the removable section 238 and all other layers of RF 210 from the container 220. In an alternative embodiment, a cut (die-cut) can be made on the first layer forming an opening prior to the adhesion of the first layer to a peelable layer. In this example, exposing the opening on the first layer, by peeling back the peelable layer, does not remove portions of the first layer with the peelable layer. In a further alternative, the opening 239 can be formed using a registered technique, wherein the connection of the removable section 238 with the sealable section 236 is not fully compromised. For example, a length of the removable section 238 can be left fully connected and/or integrated with sealable section 236. Thus, when the layers and removable section 238 are peeled back at least a portion stays attached to the first flexible film 230 and cannot be separated completely from container 220. It is further contemplated that the first layer may be cut using various technologies and techniques, such as being laser drilled or scored with mechanical or laser methods to any desired shape to allow forming of an opening 239.

The technique(s) used to establish the resealable section 238, such as the die-cut and registered die-cut disclosed, are designed to help promote the optimization of various internal atmospheric conditions, including one or combination of $O_2$, $CO_2$, $C_2H_4$ and $H_2O$ vapor concentrations, in the enclosure 280 within which a food product, 202 is located, even after the peelable second flexible film (third) layer 250 of the RF 210 is peeled and resealed. When the layers and removable section 238 are in the position shown in FIG. 1B the opening is closed and as such the enclosure 280 is closed. In this configuration the atmospheric control attributes 290 promote the optimization of the interior atmosphere and provide the interaction between the interior atmosphere of enclosure 280 and an exterior atmosphere outside the closed resealable packaging device 200. When the layers and removable section 238 are peeled back the opening 239 and enclosure 280 is exposed or open to the exterior atmosphere. It is understood that atmospheric control attributes 290, when the removable section 238 and the other layers of RF 210 are resealed over enclosure 280 after exposure to the exterior atmosphere, will interact with the interior atmosphere of the enclosure 280 and promote its optimization. It is contemplated that the atmospheric control attributes provide their synergistic interaction with any interior atmospheric conditions found, even after the exposure of an enclosure and any food product stored therein to an exterior atmosphere, and, thereby, promote the optimization of the interior atmosphere throughout the use of the RF and/or RPD.

Figure 2D:
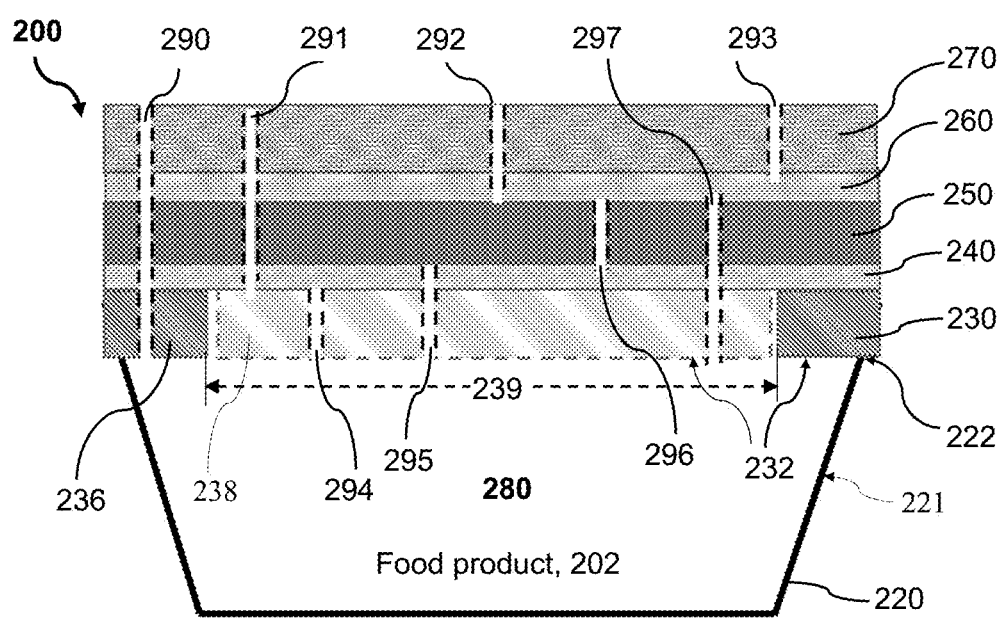
FIG. 2D is an illustration of a five-layer resealable film structure connected with a storage container forming a resealable packaging device including an enclosure within which food product can be located, wherein an interior environment is in communication with an exterior environment via a plurality of differently configured atmospheric control attribute(s) and can be accessed via the opening in accordance with an exemplary embodiment of the current invention.

The RPD 200, as shown in FIG. 2D, is similar to the RPD 100 of FIGS. 2A-2C, except for the addition of atmospheric control attributes 291, 292, 293, 294, 295, 296 and 297 located in the RF 210. The plurality of atmospheric control attributes 291 to 297 are configured as micro-perforations. The atmospheric control attribute 291 provides an opening through all layers of RF 110, and more particularly through the sealable section 136 of first layer 130. Atmospheric control attribute 291 provides an opening completely through layers 270, 260, 250 and 240 of the RF 210. Atmospheric control attribute 297 provides an opening completely through layers 250, 240 and 230 of the RF 210. Atmosphere control attribute 292 provides an opening completely through layers 270 and 260 and atmospheric control attribute 297 provides an opening completely through layers 240 and 230. Atmosphere control attribute 293 provides an opening completely through layer 270 and atmospheric control attribute 294 provides an opening completely through layers 230. In the current embodiment atmospheric control attributes 291 and 297 can be at least significantly, similarly configured, as both extend through three layers of RF 210, but establish different direct communication of the layers. Atmospheric control attributes 294, 295 and 297 may have similar or different configurations but each establishes a direct communication between the enclosure 280 and the different layers to which each extends. Atmospheric control attributes 291, 292 and 293 may have similar or different configurations but each establishes a direct communication between the exterior environment of the RF 201 and/or RPD 200 and the different layers to which each extends. The atmospheric control attributes 291, 292, 293, 294, 295, 296 and 297 have distinct volumetric configurations based on the thickness of material(s) that each extends through. In the alternative or addition to, the one or plurality of atmospheric control attributes may be, at least partially, located in the RPD 200. The configuration, location, number, size, density, open area and the like of the atmospheric control attribute(s) located in an exemplary RPD and/or RF can vary to accommodate varying configurations of the RF 210 and/or container 220 and/or the use of the RPD 200 with various food products without departing from the scope and spirit of the current invention.

Various food products 202 can be located within the enclosure 280 of RPD 200. As described herein, these food products can include various perishable and/or non-perishable food products. In the preferred embodiment, RPD 200 includes a respiring fresh produce located within the enclosure 280. The RF 210 connects with the storage container 220 and covers the enclosure 280. The peelable third layer 250 of the RF 210 can be peeled away from the first layer 230 thereby exposing opening 238 within the first layer 230 and exposing the enclosure 280. This allows access to the enclosure 280 and any items therein, such as food product 202.

In the preferred embodiments, the plurality of atmospheric control attributes 290 to 297 located in the RF 210 provides the breathable utility of the RF 210 and breathability for the interior atmosphere of enclosure 280 of RPD 200. As such, the atmospheric control attributes 290 or 290 in conjunction with 291 through 297 promotes the optimization of the interior atmosphere of the enclosure 280 and the quality protection of the food product 202 therein, by affecting the respiring and gas sensitive food product 202. The effects that may be provided by the current invention can promote the optimization of various internal atmospheric conditions, including one or combination of $O_2$, $CO_2$, $C_2H_4$ and $H_2O$ vapor concentrations, in the enclosure 280 within which a food product, 202 is located. As described herein, this optimization of enclosure atmospheric conditions for food product located therein can include, without limitation, the establishment, modulation and/or maintenance of various amounts, ranges of amounts, concentrations, ratios and the like, of the presence of various gases, moisture content, chemical and such other atmospheric factors as may be contemplated as present in the internal atmosphere of the enclosure.

It is contemplated that the first layer, peelable layer or any other layers as indicated for these and other embodiments, can be constructed of various materials and printed on and include various designs and/or include a label. In the preferred embodiment, the material used for the RF 210 and storage container 220 are polymeric that have at least one polymer common in their composition to aid in creating a weld seal. As described herein, alternative materials, including composite materials, may be used for and in the construction of the RF 210 and/or storage container 220 of the RPD 200. It is also contemplated that the materials used for the RF 210 can be different than that used for storage container 220. For instance, the storage container 220 can be formed from materials that are more rigid and less breathable than the materials used for the RF 210 and/or vice versa. Various alternatives as may be contemplated by those skilled in the art can be employed without departing from the scope and spirit of the current invention.

It is contemplated that the first layer 230, peelable layer 250 or any other layers 240 or 260 or 270 as indicated for these and other embodiments, can include/have, be formed with and/or be constructed of various materials and printed on and include various designs and/or include a label. In the preferred embodiment, the material used for the RF 210 and storage container 220 are polymeric materials that have at least one polymer common in their composition to aid in creating a weld seal. As described herein, alternative materials, including composite materials, may be used for and in the construction of the RF 210 and/or storage container 220 of the RPD 200. It is also contemplated that the materials used for the RF 210 can be different than that used for storage container 220. For instance, the storage container 220 can be formed from materials that are more rigid and less breathable than the materials used for the RF 210 and/or vice versa. Various alternatives as may be contemplated by those skilled in the art can be employed without departing from the scope and spirit of the current invention.

The printing techniques can include surface printing, reverse printing and such other techniques as may be contemplated by those skilled in the art. The printing may take place on either side of a layer, more preferably on the side of a layer that faces away from the enclosure or towards the environment outside the internal environment provided by the RF and/or RPD of the current invention. The printing can cover an amount of the surface area of a layer, such amount can vary from all to a small percentage (>0.1%) of the total surface area of the first layer. It is contemplated that the current invention may not include any printing or may include any amount of printing. The printing does or does not, may or may not impact upon any of the capabilities provided by the current invention.

The adhesive second layer 240 comprises a pressure sensitive adhesive and provides a material thickness of 0.11 mil. Alternative adhesives and thicknesses are contemplated for use by the current invention. It is contemplated that the adhesive layer(s) of any exemplary RF and/or RPD embodiments can be constructed having a material thickness ranging from 0.01 to 3 mil, more preferably from 0.1 to 1 mil. The adhesive layer contemplated for use by embodiments of the current invention can be formed utilizing various adhesives and/or compounds including, without limitation, heat sensitive adhesive(s), pressure sensitive adhesive(s) and the like, as may be contemplated. Still further, the adhesive layer can be formed using adhesives with various properties and/or characteristics, such as strong and/or weak adhesive characteristics and the like. The structure of any of the exemplary embodiments may include one or more adhesive layers having various physical characteristics including, without limitation, the thickness of the adhesive materials used in constructing the layer(s).

The adhesive second layer 240 of the current embodiment has a total adhesive (TA), as measured in weight/unit area ($g/m^2$), of 10.17 $g/m^2$. Given the identified specifications above for the adhesive layers that may comprise various exemplary embodiments of the current invention, it is contemplated that the adhesive layers may have a total adhesive content (TA), as measured in weight/unit ($g/m^2$), ranging from 1 to 100 $g/m^2$ and more preferably from 5 to 70 $g/m^2$. It is further contemplated that the adhesive layer can provide a moisture control feature and/or factor that impacts upon the water vapor content within the resealable packaging device. In the current embodiment, this comprises the use of water impermeable or partially water permeable PSAs to provide a moisture control feature that promotes a decrease in the water vapor content present within the interior atmosphere provided for food product stored within the enclosure of the resealable packaging devices of the current invention. The moisture control feature and/or factor can be established within the chemical composition of the adhesive e for use in embodiments of the current invention. It is contemplated that the current invention can employ the use of one or more desiccants or other moisture adsorption technologies.

The use of atmospheric control attributes and inherent gas transmission properties of the materials can provide the resealable packaging device embodiment a total Moisture Vapor Transmission Rate (MVTR) of 0.1 to 165 g/100 sq. in/day. This total MVTR control provided by the current invention promotes desirable atmospheric conditions within the resealable packaging device and thereby provides all the advantages of the current invention. These advantages include the promotion of desirable marketable characteristics, significantly reduced deterioration for longer periods of time and prolonged shelf-life for the food product. Packaging devices that lack the MTVR controls of the current invention can fail to provide any of the advantages of the current invention and thereby the food product quality can be significantly deteriorated, the observation and/or presence of undesirable marketable characteristics can be seen earlier and may be more pronounced and shelf-life can be significantly reduced. All these failures can have a significantly negative impact upon the marketable characteristics and, therefore, potential commercial success for any packaged food product and, as such, may have a significant negative impact upon the choices and quality provided to consumers of food products.

The peelable third layer 250 can include/have, be formed with and/or be constructed having a material height or thickness of 1.04 mil. Various layers utilized in forming exemplary RF and/or RPD embodiments can be constructed having a material thickness ranging from 0.5 to 5 mil, more preferably between 0.5 and 2.5 mil. Alternative thicknesses for non-adhesive and/or peelable layers are contemplated for use by the current invention.

Given the identified specifications for RPD 200, the total thickness for the RF 210 is 2.25-2.35 mil. It is contemplated that the RF may have a total height or thickness ranging from 1 to 8 mil or other alternative ranges of height or thickness as contemplated by those skilled in the art.

Figure 3A:
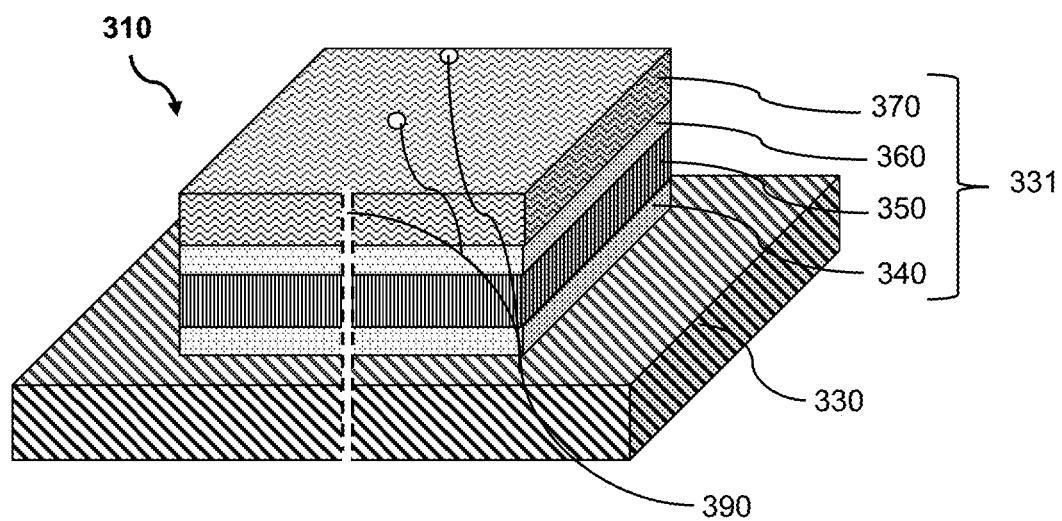
FIG. 3A is an isometric illustration of a resealable film structure comprising a five-layer resealable film structure having variously configured layers, a label and a plurality of atmospheric control attributes in accordance with an exemplary embodiment of the present invention.
Figure 3B:
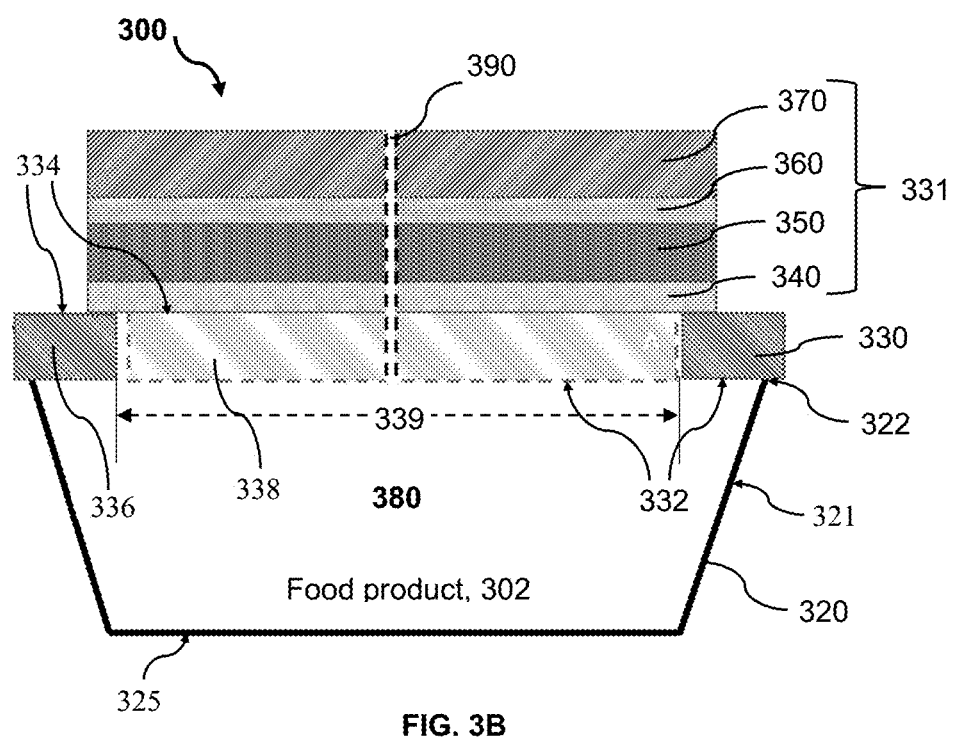
FIG. 3B is an illustration of the resealable film structure shown in FIG. 3A connected with a storage container forming a resealable packaging device including an enclosure within which food product can be located, wherein an interior environment is in communication with an exterior environment via the atmospheric control attribute(s) and can be accessed via the opening in accordance with an exemplary embodiment of the current invention.

In the preferred embodiments shown in FIGS. 3A and 3B, a resealable packaging device (RPD) 300 having a resealable film (RF) 310 connected to a storage container 320, thereby defining an enclosure 380, is provided. The RF 310 comprises five component layers, a first layer 330 designed to heat seal to the tray 320. The other layers are constructed as one construct 331 with an adhesive second layer 340, a peelable third layer 350, a lamination fourth layer 360 bonded strongly to fifth layer 370. The construct 331 may be formed in various shapes such as square, rectangle and alike but the surface size is always smaller than the surface layer of first layer 330. The construct 331 is then adhered via adhesive layer 340 to first layer 330. The tray 320 is defined by a sidewall 321 with opposing sections continuously extending from its connection along a bottom edge 323 with a bottom wall 325. The sidewall 321 includes a continuous top edge 322 which defines an open perimeter that exposes the interior surfaces of the sidewall 321 and the bottom wall 325.

The first layer 330 has a bottom surface 332 and top surface 334 and is comprised of two connected sections, a sealing section 336 connected with a resealable or removable section 338. The first layer 330 is of a heat sealable design allowing at least a portion of the bottom surface 332 of the sealing section 336 of first layer 330 to be sealed and/or connected to the top edge 322 of the sidewall 321 of container 320. It is contemplated that the sealing of the first side 332 with edge 322 is accomplished using a tray sealing machine to create weld seal. Other techniques and/or technologies for connecting any layer of an RF with a storage container can be utilized as described herein and as may be contemplated by those skilled in the art. The first layer 330 has and is constructed with a material height or thickness of 1.2 mil. It is contemplated that the heat sealable layer of any exemplary RF and/or RPD embodiment can have and/or be formed with a material thickness ranging from 0.5 to 5.0 mil, more preferably from 0.5 to 2.5 mil. It is contemplated that the RF 310 can connect with various packaging devices and/or technologies to provide an enclosure capable of at least partially encompassing food product, 302 within.

With the first layer 330 sealed to the top edge 322 of container 320 the enclosure 380 is defined as the space that exists between opposing sidewall 321 sections and between the bottom surface 332 and the bottom wall 325. It is within enclosure 380 that various food products, as exemplified by food product 302 in the current embodiment, can be stored and located. The food products having various respiration characteristics, such as low, medium and/or high respiration rates.

When RF 310 is closed or sealed, as shown in the current embodiment, the enclosure 380 is understood as having an interior space that defines an interior atmosphere or environment. This environment comprising various environmental conditions as discussed previously herein. More particularly, when food product 302 is located in enclosure 380, the respiration characteristics impact upon the interior atmosphere and conditions, such as the concentrations of various gases, water vapor and/or agents present.

RF 310 includes atmospheric control attributes 390. The atmospheric control attributes being designed and included to provide a total open area for the RF and RPD that promotes the optimization of the interior atmosphere of enclosure 380, particularly when food product is encompassed therein. As discussed previously, the configuration, number, size and density of the atmospheric control attributes can vary to provide a desired per perforation open area and total open area. The atmospheric control attributes 390 are configured as three (3) micro-perforations and are open through all layers connecting the enclosure 380 and thereby the food product 302 to the external environment.

In the preferred embodiments of FIGS. 3A-3D, each of the atmospheric control attributes 390 are positioned and configured to provide an opening that extends through RF 310 and the removable section 338 of first layer 330. This provides a communication or synergistic interaction between the enclosure 380 and an exterior atmosphere outside the RPD 300 allowing and, at least in part, controlling transmission characteristics and properties. As described, the atmospheric control attributes are micro-perforations. The micro-perforations established can include one (1) to one hundred fifty (150) micro-perforations, wherein each micro-perforation has a diameter of seventy-five microns (75 µm) providing a per perforation open area of $4.415625 \times 10^{-9}$ $m^2$. The configuration of the three (3) atmospheric control attributes 290 for FIGS. 2A-2C provides a total open area of $1 \times 10^{-8}$ $m^2$. It is contemplated that a total open area of $4.42 \times 10^{-9}$ $m^2$ to $6.62 \times 10^{-7}$ $m^2$; $1.33 \times 10^{-8}$ $m^2$ to $1.33 \times 10^{-6}$ $m^2$ or $7.85 \times 10^{-9}$ to $7.85 \times 10^{-7}$ $m^2$ can be established for the preferred embodiments of FIGS. 3A-3D.

It is contemplated for the current preferred embodiments of FIGS. 3A-3D that it include micro-perforations with diameter sizes of: (i) 75 microns (75 µm) providing a per perforation open area of $4.415625 \times 10^{-9}$ $m^2$; (ii) 90 microns (90 µm) providing a per perforation open area of $6.3585 \times 10^{-9}$ $m^2$; (iii) 100 microns (100 µm) providing a per perforation open area of $7.85 \times 10^{-9}$ $m^2$; (iv) 120 microns (120 µm) providing a per perforation open area of $1 \times 10^{-8}$ $m^2$; (v) 130 microns (130 µm) providing a per perforation open area of $1 \times 10^{-8}$ $m^2$; (vi) 150 microns (150 µm) providing a per perforation open area of $2 \times 10^{-8}$ $m^2$; (vii) 240 microns (240 µm) providing a per perforation open area of $5 \times 10^{-8}$ $m^2$; or (viii) such other sizes and per perforation open area as may provide the atmospheric promotional advantages. It is contemplated for exemplary embodiments, RF per unit package and/or RPD, of the current invention that the total open area provided by the atmospheric control attributes may range generally from $1.5 \times 10^{-11}$ $m^2$ to $1.5 \times 10^{-4}$ $m^2$.

Figure 3C:
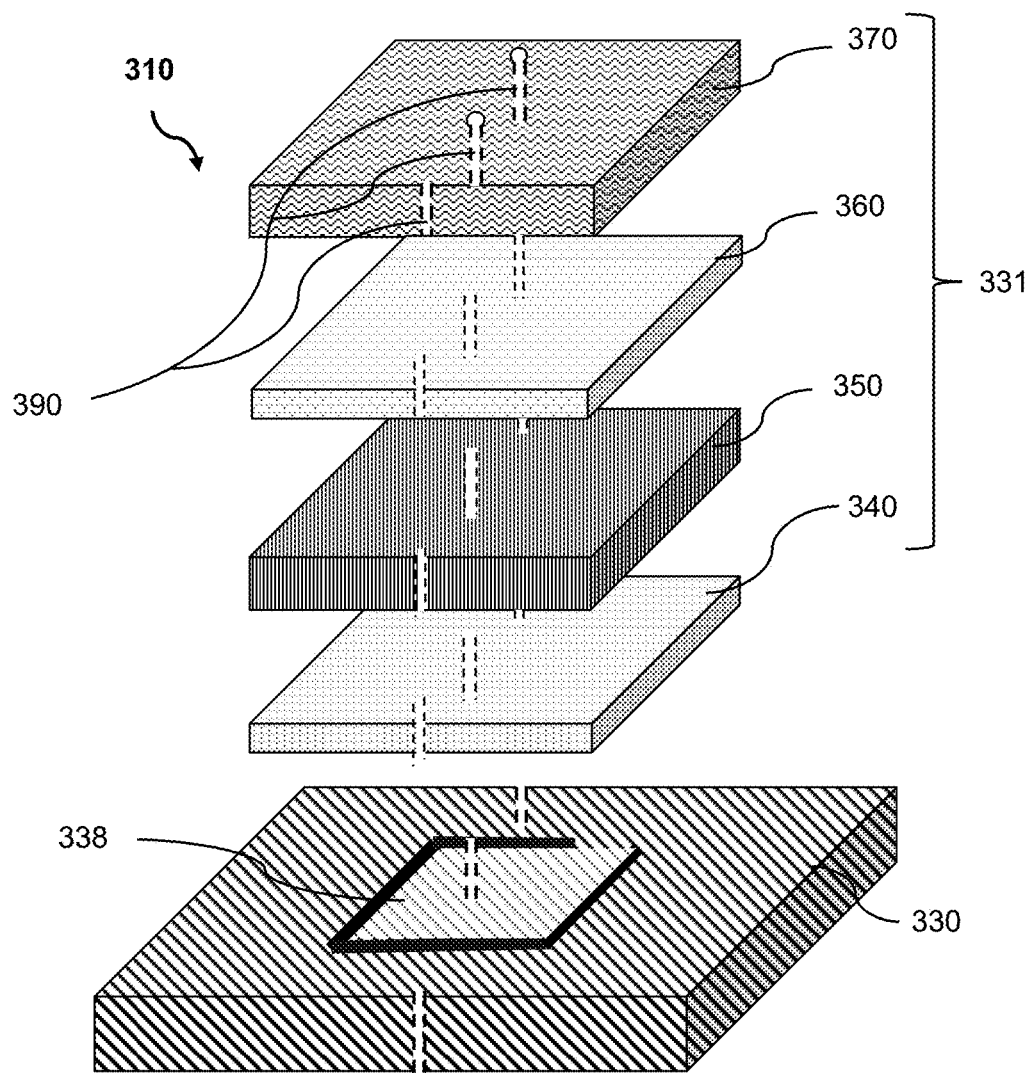
FIG. 3C is an exploded-view illustration of the three-layer resealable film structure as shown in FIG. 3A.

In the preferred embodiments shown in FIGS. 3A-3C, wherein 3C shows the 5 layers are separated and shown as exploded view of FIG. 3A. The first layer (first flexible film) 330 is die-cut to form a desired shape for the removable section 338 and a desired shape of opening 339. It is further contemplated that the first layer may be cut using various technologies and techniques, such as being laser drilled or scored with mechanical or laser methods to any desired shape to allow forming of an opening 338 during peeling. The cut (die-cut) may be made once the layers of the RF and/or RPD are created, forming a continuous opening 339. With this configuration, when peeling back the peelable layer 350 connected to the removable section 338 via adhesive layer 340 it exposes the opening 339. This configuration is further designed to peel back completely and separate the removable section 338 and all other layers of construct 331 from the container 320. In an alternative embodiment, a cut (die-cut) can be made on the first layer forming an opening prior to the adhesion of the first layer to a peelable layer. In this example, exposing the opening on the first layer, by peeling back the peelable layer, does not remove portions of the first layer with the peelable layer. In a further alternative, the opening 339 can be formed using a registered technique, wherein the connection of the removable section 338 with the sealable section 336 is not fully compromised. For example, a length of the removable section 338 can be left fully connected and/or integrated with sealable section 336. Thus, when the layers and removable section 338 are peeled back at least a portion stays attached to the first flexible film 330 and cannot be separated completely from container 320. It is further contemplated that the first layer may be cut using various technologies and techniques, such as being laser drilled or scored with mechanical or laser methods to any desired shape to allow forming of an opening 339.

The technique(s) used to establish the resealable section 338, such as the die-cut and registered die-cut disclosed, are designed to help promote the optimization of various internal atmospheric conditions, including one or combination of $O_2$, $CO_2$, $C_2H_4$ and $H_2O$ vapor concentrations, in the enclosure 380 within which a food product, 302 is located, even after the peelable second flexible film (third) layer 350 of the RF 310 is peeled and resealed. When the layers and removable section 338 are in the position shown in FIG. 3B the opening is closed and as such the enclosure 380 is closed. In this configuration the atmospheric control attributes 390 promote the optimization of the interior atmosphere and provide the interaction between the interior atmosphere of enclosure 380 and an exterior atmosphere outside the closed resealable packaging device 300. When the layers and removable section 338 are peeled back the opening 339 and enclosure 380 is exposed or open to the exterior atmosphere. It is understood that atmospheric control attributes 390, when the removable section 338 and the other layers of RF 310 are resealed over enclosure 380 after exposure to the exterior atmosphere, will interact with the interior atmosphere of the enclosure 380 and promote its optimization. It is contemplated that the atmospheric control attributes provide their synergistic interaction with any interior atmospheric conditions found, even after the exposure of an enclosure and any food product stored therein to an exterior atmosphere, and, thereby, promote the optimization of the interior atmosphere throughout the use of the RF and/or RPD.

Figure 3D:
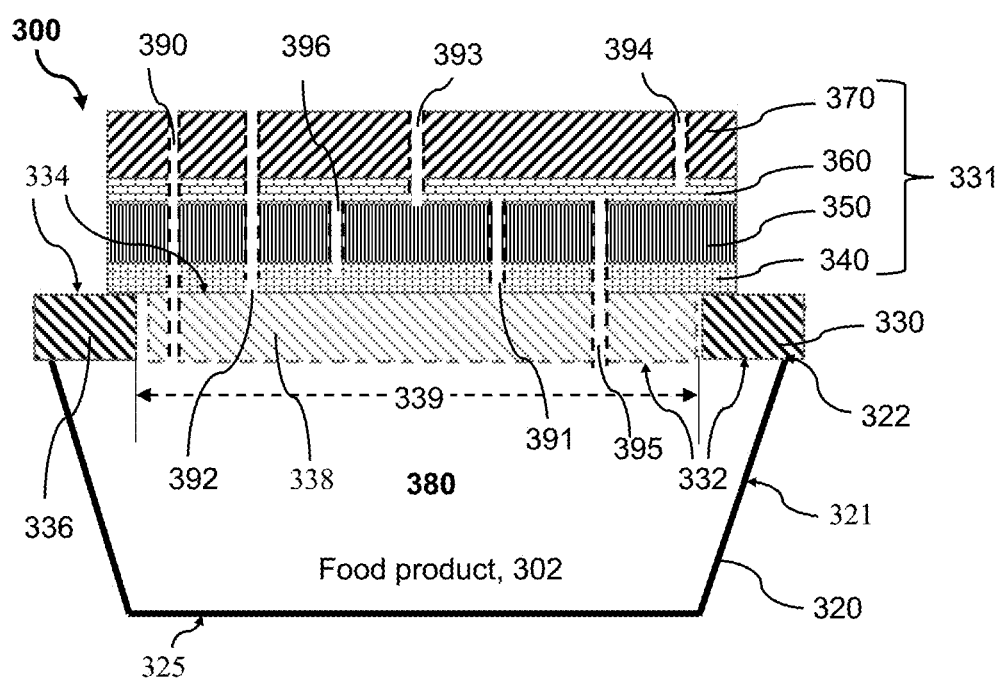
FIG. 3D is an illustration of a five-layer resealable film structure, with variously configured layers, connected with a storage container forming a resealable packaging device including an enclosure within which food product can be located, wherein an interior environment is in communication with an exterior environment via a plurality of differently configured atmospheric control attribute(s) and can be accessed via the opening in accordance with an exemplary embodiment of the current invention.

The RPD 300, as shown in FIG. 3D, is similar to the RPD 300 of FIGS. 3A-3C, except for the addition of atmospheric control attributes 391, 392, 393, 394, 395 and 396 located in the RF 310. The plurality of atmospheric control attributes 391 to 396 are configured as micro-perforations. Atmospheric control attribute 391 provides an opening completely through layers 350 and 340 of the RF 310. Atmosphere control attribute 392 provides an opening completely through layers 370, 360, 350 and 340 and atmospheric control attribute 395 provides an opening completely through layers 350, 340 and 330. Atmosphere control attribute 393 provides an opening completely through layers 370 and 360, atmospheric control attribute 394 provides an opening completely through layer 370 and atmospheric control attribute 396 provides an opening completely through layer 350. Atmospheric control attributes may have similar or different configurations, but each establishes a direct communication. Atmospheric control attributes 390, 392, 393 and 394 may have similar or different configurations but each establishes a direct communication between the exterior environment of the RF 310 and/or RPD 300 and the different layers to which each extends. The atmospheric control attributes can have distinct volumetric configurations based on the thickness of material(s) that each extends through. In the alternative or addition to, the one or plurality of atmospheric control attributes may be, at least partially, located in the RPD 300. The configuration, location, number, size, density, open area and the like of the atmospheric control attribute(s) located in an exemplary RPD and/or RF can vary to accommodate varying configurations of the RF 310 and/or tray 320 and/or the use of the RPD 300 with various food products without departing from the scope and spirit of the current invention.

Various food products 302 can be located within the enclosure 380 of RPD 300. As described herein, these food products can include various perishable and/or non-perishable food products. In the preferred embodiment, RPD 300 includes a respiring food located within the enclosure 380. The RF 310 connects with the storage container 320 and covers the enclosure 380. The peelable third layer 350 of the RF 310 can be peeled away from the first layer 330 thereby exposing opening 338 within the first layer 330 and exposing the enclosure 380. This allows access to the enclosure 380 and any items therein, such as food product 302.

In the preferred embodiments, the plurality of atmospheric control attributes 390 to 396 located in the RF 310 provides the breathable utility of the RF 310 and breathability for the interior atmosphere of enclosure 380 of RPD 300. As such, the atmospheric control attributes 390 or 390 in conjunction with 391 through 396 promotes the optimization of the interior atmosphere of the enclosure 380 and the quality protection of the food product 302 therein, by affecting the respiring and gas sensitive food product 302. The effects that may be provided by the current invention can promote the optimization of various internal atmospheric conditions, including one or combination of $O_2$, $CO_2$, $C_2H_4$ and $H_2O$ vapor concentrations, in the enclosure 380 within which a food product, 302 is located. As described herein, this optimization of enclosure atmospheric conditions for food product located therein can include, without limitation, the establishment, modulation and/or maintenance of various amounts, ranges of amounts, concentrations, ratios and the like, of the presence of various gases, moisture content, chemical and such other atmospheric factors as may be contemplated as present in the internal atmosphere of the enclosure.

It is contemplated that the first layer, peelable layer or any other layers as indicated for these and other embodiments, can be constructed of various materials and printed on and include various designs and/or include a label. In the preferred embodiment, the material used for the RF 310 and storage container 320 are polymeric that have at least one polymer common in their composition to aid in creating a weld seal. As described herein, alternative materials, including composite materials, may be used for and in the construction of the RF 310 and/or storage container 320 of the RPD 300. It is also contemplated that the materials used for the RF 310 can be different than that used for storage container 320. For instance, the storage container 320 can be formed from materials that are more rigid and less breathable than the materials used for the RF 310 and/or vice versa. Various alternatives as may be contemplated by those skilled in the art can be employed without departing from the scope and spirit of the current invention.

It is contemplated that the first layer 330, peelable layer 350 or any other layers 340 or 360 or 370 as indicated for these and other embodiments, can include/have, be formed with and/or be constructed of various materials and printed on and include various designs and/or include a label. In the preferred embodiment, the material used for the RF 310 and storage container 320 are polymeric materials that have at least one polymer common in their composition to aid in creating a weld seal. As described herein, alternative materials, including composite materials, may be used for and in the construction of the RF 310 and/or storage container 320 of the RPD 300. It is also contemplated that the materials used for the RF 310 can be different than that used for storage container 320. For instance, the storage container 320 can be formed from materials that are more rigid and less breathable than the materials used for the RF 310 and/or vice versa. Various alternatives as may be contemplated by those skilled in the art can be employed without departing from the scope and spirit of the current invention.

The printing techniques can include surface printing, reverse printing and such other techniques as may be contemplated by those skilled in the art. The printing may take place on either side of a layer, more preferably on the side of a layer that faces away from the enclosure or towards the environment outside the internal environment provided by the RF and/or RPD of the current invention. The printing can cover an amount of the surface area of a layer, such amount can vary from all to a small percentage (>0.1%) of the total surface area of the first layer. It is contemplated that the current invention may not include any printing or may include any amount of printing. The printing does or does not, may or may not impact upon any of the capabilities provided by the current invention.

The adhesive second layer 340 comprises a pressure sensitive adhesive and provides a material thickness of 0.57 mil. Alternative adhesives and thicknesses are contemplated for use by the current invention. It is contemplated that the adhesive layer(s) of any exemplary RF and/or RPD embodiments can be constructed having a material thickness ranging from 0.01 to 3 mil, more preferably from 0.1 to 1 mil. The adhesive layer contemplated for use by embodiments of the current invention can be formed utilizing various adhesives and/or compounds including, without limitation, heat sensitive adhesive(s), pressure sensitive adhesive(s) and the like, as may be contemplated. Still further, the adhesive layer can be formed using adhesives with various properties and/or characteristics, such as strong and/or weak adhesive characteristics and the like. The structure of any of the exemplary embodiments may include one or more adhesive layers having various physical characteristics including, without limitation, the thickness of the adhesive materials used in constructing the layer(s).

The adhesive second layer 340 of the current embodiment has a total adhesive content (TA), as measured in weight/unit area ($g/m^2$) of 65.5 $g/m^2$. Given the identified specifications above for the adhesive layers that may comprise various exemplary embodiments of the current invention, it is contemplated that the adhesive layers may have a total area (TA), as measured in weight/unit (g/m$^2$), ranging from 1 to 100 g/m$^2$ and more preferably from 5 to 70 g/m$^2$. It is further contemplated that the adhesive layer can provide a moisture control feature and/or factor that impacts upon the water vapor content within the resealable packaging device. In the current embodiment, this comprises the use of water impermeable or partially water permeable PSAs to provide a moisture control feature that promotes a decrease in the water vapor content present within the interior atmosphere provided for food product stored within the enclosure of the resealable packaging devices of the current invention. The moisture control feature and/or factor can be established within the chemical composition of the adhesive for use in embodiments of the current invention. It is contemplated that the current invention can employ the use of one or more desiccants or other moisture adsorption technologies.

The use of atmospheric control attributes and inherent gas transmission properties of the materials can provide the resealable packaging device embodiment a total Moisture Vapor Transmission Rate (MVTR) of 0.1 to 165 g/100 sq. in/day. This total MVTR control provided by the current invention promotes desirable atmospheric conditions within the resealable packaging device and thereby provides all the advantages of the current invention. These advantages include the promotion of desirable marketable characteristics, significantly reduced deterioration for longer periods of time and prolonged shelf-life for the food product. Packaging devices that lack the MTVR controls of the current invention can fail to provide any of the advantages of the current invention and thereby the food product quality can be significantly deteriorated, the observation and/or presence of undesirable marketable characteristics can be seen earlier and may be more pronounced and shelf-life can be significantly reduced. All these failures can have a significantly negative impact upon the marketable characteristics and, therefore, potential commercial success for any packaged food product and, as such, may have a significant negative impact upon the choices and quality provided to consumers of food products.

The peelable third layer 350 of RF 310 can include/have, be formed with and/or be constructed having a material height or thickness of 2.23 mil. Various layers utilized in forming exemplary RF and/or RPD embodiments can be constructed having a material thickness ranging from 0.5 to 5 mil, more preferably between 0.5 and 2.5 mil. Alternative thicknesses for non-adhesive and/or peelable layers are contemplated for use by the current invention.

Given the identified specifications for RPD 300, the total thickness for RF 310 is 4.00-4.25 mil. It is contemplated that the RF may have a total height or thickness ranging from 1 to 8 mil or other alternative ranges of height or thickness as contemplated by those skilled in the art.

Figure 4:
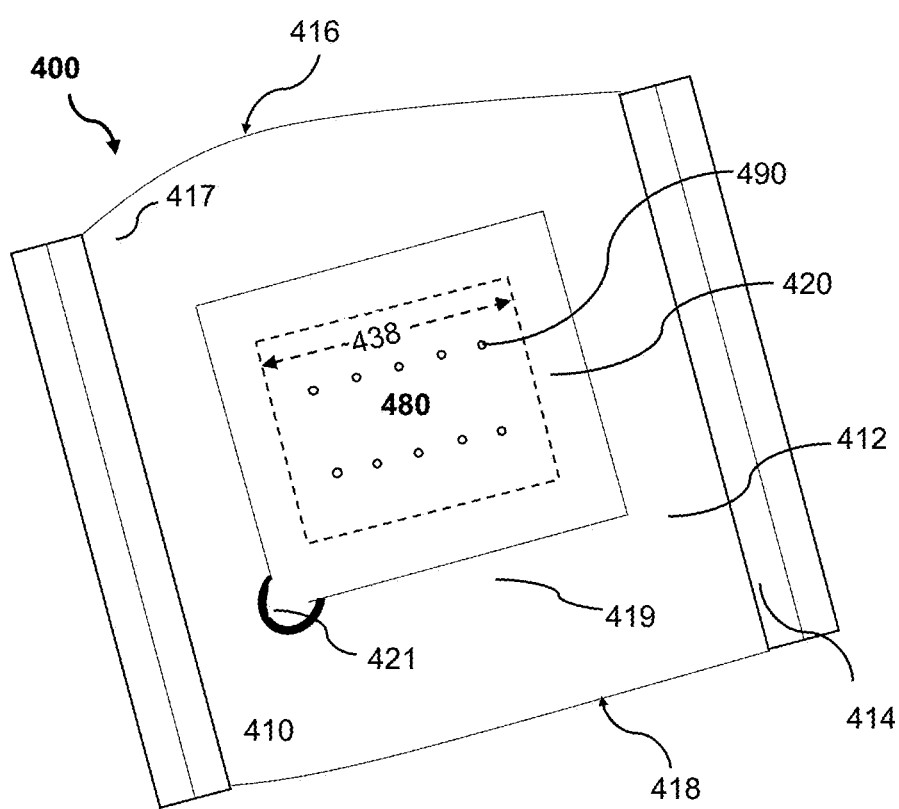
FIG. 4 is an illustration of a resealable packaging device configured as a bag including a resealable film structure including a plurality of atmospheric control attributes in accordance with an exemplary embodiment of the present invention.

In one embodiment shown in FIG. 4 a resealable packaging device 400 (RPD) is provided in a bag configuration. The RPD 400 comprises a base film 410 connected to a resealable film (RF) 420, thereby defining an enclosure 480. The resealable film 420 has pull tab 421 for opening. The RF 420 can be formed as a three or five-layer film structure in accordance with the exemplary embodiments as defined herein. In the exemplary embodiment, RF 420 of RPD 400 comprises five component layers, similar to the ones described in 210 or 310 or a 3-component layer as described in 110.

It is contemplated that the base film 410 and/or RF 420 can be formed from a flexible and breathable polymeric film(s). The base film 410 is of a heat sealable co-extruded and/or laminate design allowing it to be sealed and/or bonded to the RF 420. Other techniques and/or technologies for connecting the RF with the base film can be utilized as described herein and as may be contemplated by those skilled in the art. The base film 410 and RF 420 are formed and constructed from different materials, thereby, establishing the RPD 400 as a composite resealable packaging device in a manner similar to that as has been described previously herein.

Configured as a standard bag 412, the base film 410 forms and/or may be constructed generally to provide a web made by connecting ends of a sidewall 414, wherein the sidewall 414 is a continuous piece of material and connecting the ends forms opposing sidewalls of the bag. Further, the web 412 is formed by joining together a top edge 416 and bottom edge 418. In addition, the web may be formed to include gusset(s). The bag 412 can be a pillow pack, lap or fin seal bag, bottom or side gusseted bag, K-seal bag or other bag configurations may be employed as contemplated by those of ordinary skill in the art.

The enclosure (interior space) 480 is provided by the bag and allows for the storage of food product(s) within. The dimensional characteristics of the enclosure 480, and thusly, the storage capabilities of the bag, are defined by the volume inside the bag 412. The connection of the continuous piece of material and joining of the edge(s) that forms the bag provides it with an inner surface that defines enclosure 480 and an interior environment and an outer surface 419 exposed to an exterior (ambient) environment.

The dimensional characteristics of the RPD 400 can be two hundred millimeters (200 mm) long and two hundred fifty millimeters (250 mm) wide. It is further contemplated that one or more sides of the RPD 400 may comprises an additional gusset, each gusset having a width of up to approximately one hundred millimeters (100 mm) Other dimensional specifications for an exemplary RPD, configured as a bag, may be employed as contemplated by those of ordinary skill in the art.

The base film 410 has, can be formed with and/or be constructed having a material height or thickness of 1.5 mil (38.1 μm). It is contemplated that the base film layer of any exemplary RF and/or RPD embodiment can be formed and/or constructed having a material thickness ranging from 0.1 to 5 mil, more preferably from 1.0 to 3.5 mil.

The base film 410 is die-cut to the desired shape for forming an opening 438 when the RF 410 is sealed over opening 438 it forms a closed enclosure 480 and then peeled by pulling away the pull tab 421. It is contemplated that the opening may be established in the base film using various technologies and techniques as have been described previously herein. It is further contemplated that the base film may be cut in registration using various technologies and techniques, such as being laser drilled or scored with mechanical or laser methods to any desired shape to allow forming of an opening 438 during peeling. Preferably, the cut (die-cut) may be made once the layers of the RF are created, prior to forming wherein RPD 400.

In the preferred embodiment, a plurality of atmospheric control attribute(s) 490 are provided in RF 420. It is contemplated that the atmospheric control attributes can be provided in base film 410. The atmospheric control attributes 490 provide the breathable utility of the RF 410 and breathability for the interior atmosphere of enclosure 480 of RPD 400. As such, the atmospheric control attribute(s) 490 promotes the optimization of the interior atmosphere of the enclosure 480 and the quality protection of the food product packaged therein, by affecting the respiring and gas sensitive food product packaged therein. It is contemplated that additional atmospheric control attributes can be provided in RPD 400 in base film 410 and/or RF 410. The affects that may be provided by the current invention can promote the optimization of the various internal atmospheric conditions, including one or combination of $O_2$, $CO_2$, $N_2$, $C_2H_4$ and $H_2O$ vapor concentrations, in the enclosure within which a food product is located. As described herein, this optimization of enclosure atmospheric conditions for food product located therein can include, without limitation, the establishment, modulation and/or maintenance of various amounts, ranges of amounts, concentrations, ratios and the like, of the presence of various gases, moisture content, chemical and such other atmospheric factors as may be contemplated as present in the internal atmosphere of the enclosure.

In the preferred embodiment, the atmospheric control attributes 490 include ten (10) micro-perforations, wherein each micro-perforation has a diameter of one hundred microns (100 μm) to two hundred and forty microns (240 μm). This configuration of the atmospheric control attributes provides an open area of $7.85 \times 10^{-8}$ to $4.52 \times 10^{-7}$ $m^2$ for the preferred embodiment. The configuration, location, number, size, density, open area and the like of the atmospheric control attribute(s) located in an exemplary RPD and/or RF can vary to accommodate varying configurations of the base film 410, RF 420 and/or the use of the RPD 400 with various food products without departing from the scope and spirit of the current invention. It is contemplated that one or more of the atmospheric control attributes can be differently configured from the others. Still further, it is contemplated that any additional atmospheric control attributes may be similarly or differently configured in comparison with the atmospheric control attributes 490.

Various food products can be located within the enclosure 480 of RPD 400. As described herein, these food products can include various perishable and/or non-perishable food products. The RF 420 is attached to base film 410 and covers the enclosure 480. The peelable layer of the RF 420 can be peeled away exposing opening 438 and exposing the enclosure 480. This allows access to the enclosure 480 and any items therein, such as a food product.

It is contemplated that the first layer, peelable layer or any other layers as indicated for these and other embodiments, can be printed on and include various designs and/or include a label. The printing techniques employed for the current invention can include surface printing, reverse printing and such other techniques as may be contemplated by those skilled in the art. The printing may take place on or a label may be placed on either the base film 410 and/or RF 420. It is also contemplated that the printing and/or affixing of the label may take place on a particular surface or side of the base film 410 and/or RF 420, more preferably on the surface or side that faces away from the enclosure and/or towards the environment outside the internal environment provided by the enclosure of the RF and/or RPD of the current invention. The printing or label can cover an amount of the surface area of the base film and/or RF, such amount can vary from all to a small percentage (>0.1%) of the total surface area of either the base film and/or RF. It is contemplated that the current invention may not include any printing or label or may include any amount of printing or labels. The printing and/or labeling does or does not, may or may not impact upon any of the capabilities provided by the current invention.

Figure 5A:
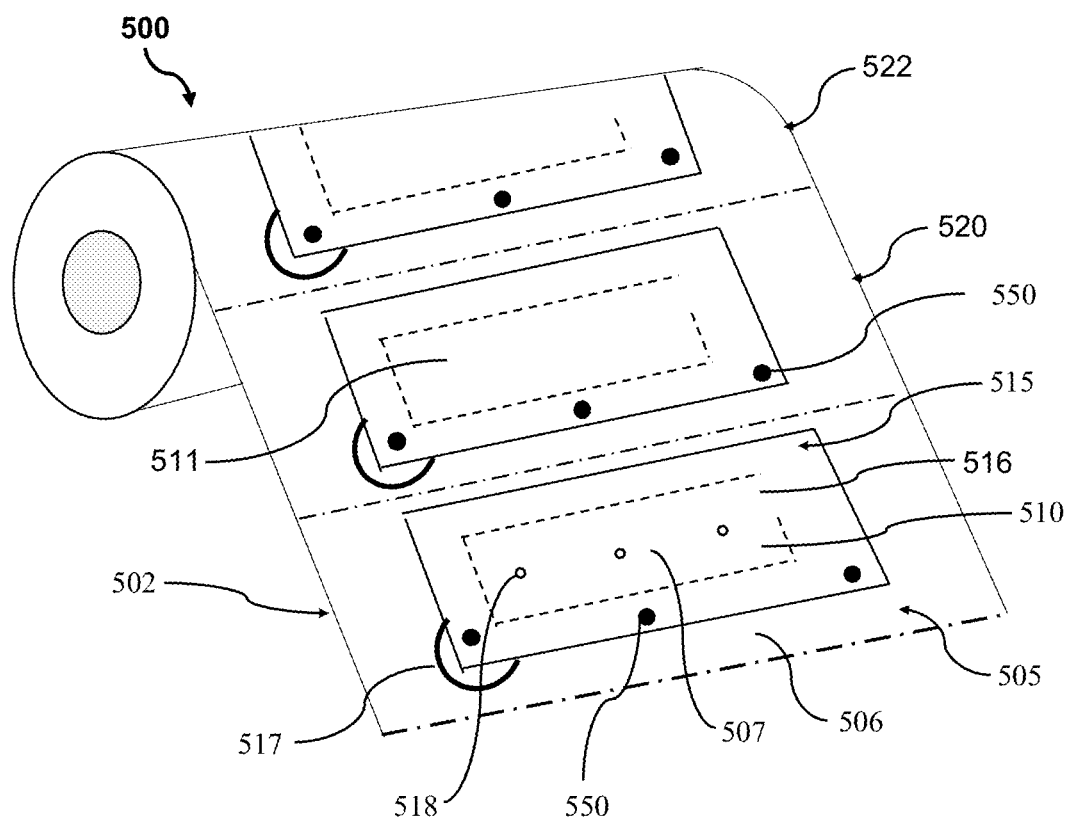
FIG. 5A is an illustration of a resealable film structure configured as a lid stock, the resealable film structure comprising a resealable film with a plurality of atmospheric control attributes in accordance with an exemplary embodiment of the present invention.

As shown in FIG. 5A, a plurality of resealable packaging films, identified and shown as RFs 502, 520 and 522, is formed/constructed as a roll or lid stock 500. The RFs 502, 520 and/or 522 may be similarly or differently configured as described for RF 110, RF 210, RF 310 and RF 420 employed with the various exemplary embodiments for forming RPD 100, 200, 300 and 400. In preferred embodiments, the composition and construction of lid or roll stock 500 is similar to RF 110, 210, 310 and 420 and as described previously. The lid stock 500 may be provided as a three-layer configuration such as that described for RF 110 or a five-layer configuration such as that described for RF 210 or RF 310. By way of example, and as may be similar for RF 520 and 522, RF 502 of lid stock or roll stock 500, comprises a first flexible base film 505, designed for heat sealing and printing, which includes a sealable segment 506 connected with a removable section 507. The removable section 507 defines an opening 510. A second flexible base film (peelable layer) 515 is connected to the first base film 505 via an adhesive, similar in configuration to that described for the exemplary embodiments of FIGS. 1A through 4. As such, the peelable layer 515 can be peeled from and resealed to the base film 505. The second flexible base film 515 includes a tab 517 to help with peeling and opening of the peelable layer 515 from the base film 505. RF 502 includes primary atmospheric control attribute 518 or a plurality of primary atmospheric control attributes 518. The primary atmospheric control attributes 518 are provided in and through peelable layer 515 and removable section 507. As shown, RF 502 also includes secondary atmospheric control attribute 550 or a plurality of secondary atmospheric control attributes 550. The secondary atmospheric control attributes 550 are provided in and through base film 507. The primary and secondary atmospheric control attributes provide a direct, and potentially an indirect, interaction between the interior atmosphere of an enclosure established for an exemplary resealable packaging device that includes an RF of the current invention connected with a storage container as described herein. These primary and/or secondary atmospheric control attributes can provide the breathable utility of the RF 502 and other RF embodiments as shown and described and may be contemplated.

The removable section 507 and opening 510 can be provided using various technologies and/or techniques, such as a registered die-cut, as has been described previously. The removable section 507 is registered with an area 516 that is not die-cut and the layers, whether 3 or 5, are adhered together. The non-die-cut area 516 keeps the base film layer 505 attached to the peelable layer 515 of RF 502 when the peelable layer 515 is peeled away from the base film 505. When RF 502 is connected (sealed) to a container, such as container 520 shown in FIG. 5B, the area 516 prevents the complete separation of the peelable layer 515 from RF 502 when it is peeled back.

Figure 5B:
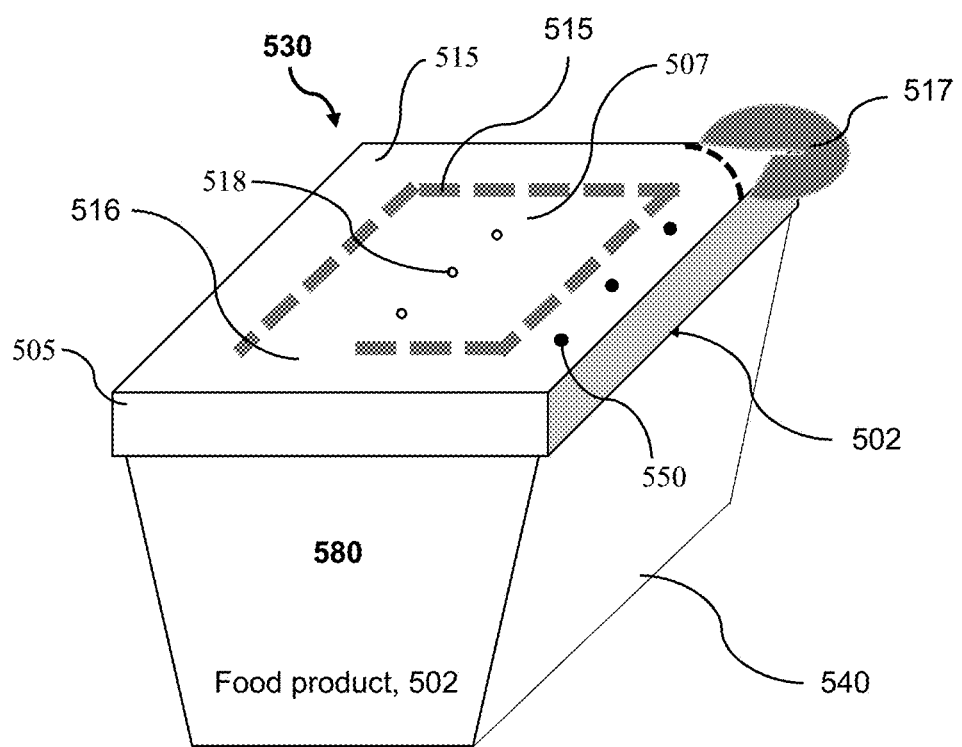
FIG. 5B is an illustration of the resealable film structure shown in FIG. 5A connected with a storage container forming a resealable packaging device including an enclosure within which food product can be located, wherein an interior environment is in communication with an exterior environment via the atmospheric control attribute(s) and can be accessed via an opening in accordance with an exemplary embodiment of the current invention.

In the preferred embodiment shown in FIG. 5B, an RPD 530 having a RF 502 connected to a storage container 540, thereby defining an enclosure 580, is provided. The composition and construction of RF 502 is similar to 3 layered structure as RF 110 or a 5 layered structure as RF 210 or 310 as described previously. The base film (sealant) layer 505 of RF 502 is die-cut to form removable section 507 in a desired shape for forming the opening 510 when the RF 502 is sealed and then peeled. It is further contemplated that the sealant layer 505 may be cut using various technologies and techniques, such as being laser drilled or scored with mechanical or laser methods to any desired shape to allow forming of an opening during peeling. Further, the preferred die-cut is rotary, and the die-cut is registered with a non-die-cut area 516. Further to aid with the peeling of the peelable layer 515 to expose the opening 510 and the enclosure 580, RF 502 includes the small tab or flap 517 that extends out from the container 540. The tab or flap 517 is generally positioned opposite to the non-die-cut area 516. The sealant layer of RF 502 near the tab or flap 517 is die-cut in such a way that the die-cut is on the edge of the container 540, while the flap extends out of the container. On pulling the tab or flap 517 towards the non-die-cut area 516, the die-cut promotes the separation of the peelable layer 515 via a weak adhesive layer. When the peelable layer 515 is peeled away the die-cut promotes the removable section 507 being removed and creating the opening 510 to the enclosure 580 containing the food product 502 and the peeling stops at the non-die-cut area 516. The area within the removable section 507 and peelable layer 515 and non-die-cut area 516 will have all the layers together similar to RF 110, if it is a three-layered structure or RF 210 or RF 310, if it is a five-layered structure.

The roll or lid stock 500 in one embodiment is one impression across (approximately up to 20 inches wide), or 2 impressions across (approximately up to 40 inches wide) or multiple impressions across (higher than 40 inches wide). The roll or lid stock length is generally 500 to 2000 feet long.

The primary atmospheric control attribute(s) 518 promotes the optimization of the interior atmosphere of the enclosure 580 and the quality protection of the food product packaged therein, by affecting the respiring and gas sensitive food product packaged therein. The affects that may be provided by the current invention can promote the optimization of the various internal atmospheric conditions, including one or combination of $O_2$, $CO_2$, $C_2H_4$ and $H_2O$ vapor concentrations, in the enclosure within which a food product is located. As described herein, this optimization of enclosure atmospheric conditions for food product located therein can include, without limitation, the establishment, modulation and/or maintenance of various amounts, ranges of amounts, concentrations, ratios and the like, of the presence of various gases, moisture content, chemical and such other atmospheric factors as may be contemplated as present in the internal atmosphere of the enclosure.

In the preferred embodiments 518 and 530, the RF 502, includes a plurality of primary atmospheric attributes 550. The plurality of primary atmospheric attributes is provided as three perforations per unit package, wherein each perforation has a diameter of six hundred microns (600 µm) to 800 microns (800 µm). This configuration of the atmospheric control attributes provides an open area of $8.45 \times 10^{-7}$ to $1.51 \times 10^{-6}$ m$^2$ for the preferred embodiment. The configuration, location, number, size, density, open area and the like of the primary atmospheric control attribute(s) located in an exemplary RF 502 can vary to accommodate varying configurations for various food products without departing from the scope and spirit of the current invention. It is contemplated that any of the various configurations for the perforation technology that has been described herein may be employed for the current embodiment.

In the exemplary embodiments of RF 502 and RPD 530, a plurality of secondary atmospheric attributes 550 are included. Each of the secondary atmospheric attributes can be provided as a macro-perforation having a size of 1 to 12 millimeters in diameter (mm), preferably, 3 to 6.5 mm in diameter. It is to be understood that the exemplary embodiment(s), including the plurality of secondary atmospheric attributes 550, is suited for respiring moisture sensitive products such as tomato, blueberry, strawberry, grapes, cherry and alike wherein, the removal of moisture through macro-perforations is key to preventing an undesirable color change in the pressure sensitive adhesive layer of RPD (PSA turns white in color with moisture and oxygen exposure). In the current embodiments, the RF 502 and RPD 530 is shown including both the plurality of primary and secondary atmospheric attributes.

As shown in RF 520, from roll/lid-stock 500, it is contemplated in alternative embodiments that the RF 520 include a plurality of the secondary atmospheric control attributes 550 through the base film. The second flexible film (peelable layer) 511 of RF 520 does not include atmospheric control attributes in this embodiment. It is further contemplated that either or both of the RF 502, 520 and 522 or RPD 530 may include either the primary or secondary atmospheric attributes, but not both. Such configurations may provide similar promotional capabilities as has been described herein for the current invention.

Figure 6:
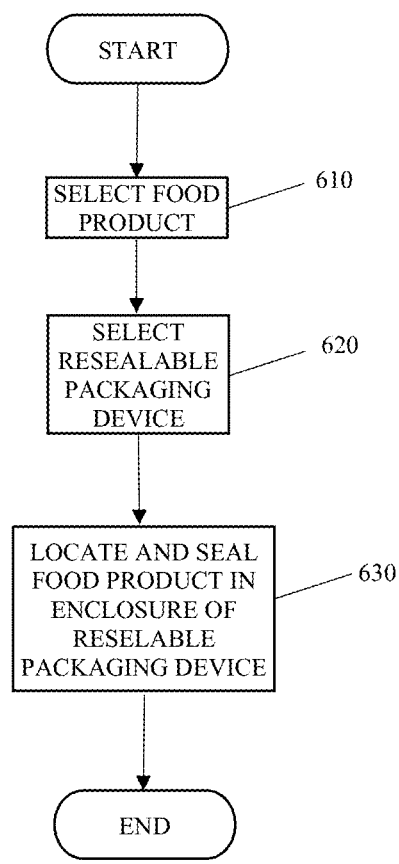
FIG. 6 is a block diagram illustrating a method for prolonging the shelf-life of a food product within a resealable packaging device in accordance with an exemplary embodiment of the current invention.

Referring now to FIG. 6 a method 600 of prolonging the shelf-life of a perishable food product is shown. In a first step 610 a perishable food product is selected. The perishable food product may be fresh produce, such as fruit(s) and/or vegetables. After selecting the food product, a resealable packaging device including an atmospheric control attribute configuration providing a total open area is selected in step 620. The resealable packaging device and total open area may be selected based on the gas transmission properties of the material used to construct the resealable packaging device and/or the ability of the atmospheric control attributes to provide a desired transmission rate for $O_2$ and/or $CO_2$ and thereby promote the optimization of the interior atmosphere within which the food product will be stored. Additionally, the respiration rate, size, weight, and dimensions of the food product may be a factor in selecting a resealable packaging device of the current invention. The optimized internal atmosphere promoted by the current invention provides a quality preservation functionality promoting the maintenance of the quality of the food product and extends the shelf-life of the food product during the life-cycle of the food product within the resealable packaging device. After selecting the resealable packaging device, in step 630, the perishable food product is placed within the enclosure of the resealable packaging device and is sealed about the food product. The seal is provided by the exemplary embodiment of the RF employed with the resealable packaging device and provides a releasable and resealable connection.

Additional steps contemplated for the current invention include selecting the resealable packaging device and the total open area based at least in part on the ability of the materials, including adhesive(s), and/or atmospheric control attributes to provide a desired transmission rate for water vapor. The method further contemplates the step of selecting a resealable packaging device based on a combination of various atmospheric control attributes that provides a cumulative total open area.

Additional method embodiments for the current invention can comprise methods of manufacturing RFs and/or resealable packaging devices. These methods can include a step of selecting one or more materials to be used in constructing the films, components or layers of the exemplary construct. The material selection can further include the step of determining a desired permeability characteristic for the material. The method can further include the step of determining the total open area to be provided by the construct. The method further includes the step(s) of determining the type, number and location of atmospheric control attribute or combination of such attributes to be included in providing the total open area.

In additional contemplated and exemplary embodiments, such as those shown in FIGS. 7-10 and described herein below, of the current invention, a breathable, flexible, reclosable and sealable (resealable) film (also referred to herein as "film", "base film", "flexible base film", "resealable film", "BSR", "BSR film" and the like) can be configured and/or constructed to provide a film, composed of a single layer or multiple layers of materials, for operationally connecting with a container (aka, storage device, tray, bag, pouch and the like), for the storage of food product. It shall be understood that it is contemplated that the BSR film shown and described in reference to FIGS. 7-9 can comprise characteristics and features similar to and/or different from those described above for the exemplary and contemplated embodiments shown and described in reference to FIGS. 1-6. For instance, similar to FIGS. 1-6, a resealable base film used in the embodiments of FIGS. 7-9 can be configured and constructed having one, two, three, four, five or more layers of materials, the layers may be similar or vary in composition and other characteristics, and may be manufactured using techniques and technologies known to those skilled in the art. FIGS. 7-9 include exemplary embodiments where the BSR film is in operational connection with a container providing a resealable packaging device (also referred to herein as an "RPD", "resealable device", "packaging device", "perforated packaging device", "atmospheric modulating device", and the like). It is contemplated that the RPD embodiments shown and described in reference to FIGS. 7-9 can comprise characteristics and features similar to and/or different from those certain embodiments shown and described in reference to FIGS. 1-6.

The exemplary embodiments shown and described in reference to FIGS. 7-9 provide an operational connection of a film with a container. This operational connection is preferably a direct operational connection. This direct operational connection provides a sealability that promotes and provides a peelable, re-closable and/or re-sealable operational connection directly between any exemplary BSR film and a container. The capabilities provided by the operational connection that promotes the sealability (peelable) functionality can be enabled in various manners and configurations. For example, without limitation, a film may be enabled to and/or promotes a peelable connection that allows the film to be completely removable and removed from its operational connection with a container and then fully re-sealed to the container, wherein the re-sealing promotes or provides the functional capabilities that have been described herein throughout for the current invention. The peeling away functionality of a film from a container can be provided through an operational connection that promotes and/or provides a peelable/removable section for either or both the film or container, wherein the section is less than the full surface area(s) of the film and/or container between which the connection of these two features is made. For instance, a film may be operationally (peelable or removably) connected to a container, where the container can be generally configured in a rectangular tray shape and has a top-edge comprising a first, second, third and fourth edge feature. The film may be removably connected along one, two or three of the top-edge features of the container and then affixed, in a more permanent manner such as through a heat sealing or other technique(s) and technologies, along one, two or three of the top-edge features of the container. In another example, if the container is generally configured as a pouch or bag, it can comprise an operational connection to a film defined by an amount or percentage of a surface area of a bottom surface of the film that is in direct contact with the container. For instance, the operational connection can comprise 10% to 100%, preferably 25% to 100% and more preferably 40% to 100% of the total surface area of the bottom surface of the film that is in direct contact with the container. The features, configuration, capabilities and characteristics of the film and the operational (peelable) connection enabled for and by the film is in some aspects different from and is some aspects similar to those described herein above for the various exemplary resealable film(s) embodiments. The sealability capabilities, comprising the characteristics and features that enable the BSR film to be sealed to, peel away (open) from and then be re-sealed (reclosed) to a container, may be achieved by the use of various materials and/or substances within the various materials employed in and for the one or more layers that comprise any of the exemplary BSR films described herein. For instance, by varying the ratio of copolymers of ethylene with one or more polar monomers (vinyl acetate, methyl acrylate, ethyl acrylate, butyl acrylate, acrylic acid, methacrylic acid, and mixtures thereof) found within the material(s) of the BSR film. It is contemplated that the sealability capability, including the varying compositional and/or physical (dimensional) characteristics, can be added to any BSR film or found within, integrated with and/or throughout the entirety of the material(s) used for any BSR film. It is also contemplated that the sealability capabilities, whether added to, found within and/or integrated with any BSR film, can be present as part of the material(s) in an amount that is less than the entirety of the material(s) used for any BSR film. For instance, as will be described further herein below, a BSR film can comprise a resealing section that is less than the entirety or only a portion of the BSR film and within this resealing section is found the sealability capabilities.

The BSR film (also referred to herein as "BSR") further comprises one or more atmospheric control attribute(s) which may be similar to or different from those described above for the various exemplary embodiments, such as micro-perforation(s), macro-perforation(s) and the like as has been previously described herein. Thus, it is understood that this resealable film promotes, contributes to and/or controls the creation and maintenance of an interior atmosphere within a container to modulate the life-cycle of the food product stored in the container employing such exemplary film(s) during at least a portion of the food product life-cycle. The use of atmospheric control attributes and inherent gas transmission properties of the materials can provide the resealable packaging device embodiments of the current invention with a total Moisture Vapor Transmission Rate (MVTR) that may range from 0.1 to 165 g/100 sq. in/day, more preferably 0.60 g/100 sq. in/day; 0.50 g/100 sq. in/day; 0.42 g/100 sq. in/day. This total MVTR control provided by the current invention promotes desirable atmospheric conditions within the resealable packaging device and thereby provides all the advantages of the current invention. These advantages include the promotion of desirable marketable characteristics, significantly reduced deterioration for longer periods of time and prolonged shelf-life for the food product. Packaging devices that lack the MTVR controls of the current invention can fail to provide any of the advantages of the current invention and thereby the food product quality can be significantly deteriorated, the observation and/or presence of undesirable marketable characteristics can be seen earlier and may be more pronounced and shelf-life can be significantly reduced. All these failures can have a significantly negative impact upon the marketable characteristics and, therefore, potential commercial success for any packaged food product and, as such, may have a significant negative impact upon the choices and quality provided to consumers of food products.

It is contemplated that the base film may be comprised of one or more various layers comprising one or more various materials. The material(s) employed may and can comprise one or any number of polymer groups such as polyalkenes (e.g., polyethylene-low and ultralow density, linear low density, high density, etc.), polyvinyls (e.g., polypropylene, oriented polypropylene), polystyrenes (e.g., polyvinyl chloride), polyester (polyethylene terephthalate), polysiloxanes (e.g., silicone rubber), polydiens (e.g., natural rubber), polyamides (nylon), and laminates of the foregoing, as well as metallocene films and coextruded films, all with or without antifog agents. Sealing of the layers comprising a base film of the current invention may be achieved by and through the use of one or more adhesive materials, as has been described herein for various exemplary embodiments, and/or varying the compositional characteristics of the materials being used, such as by varying the ratio of copolymers of ethylene with one or more polar monomers (vinyl acetate, methyl acrylate, ethyl acrylate, butyl acrylate, acrylic acid, methacrylic acid, and mixtures thereof).

The base film can be formed in various manners, have varying characteristics and properties and be manufactured, constructed and/or configured employing various techniques and technologies including without limitation extrusion (co-extrusion) and/or lamination processes as have been previously described herein. It is contemplated that the base film can comprise a single layer of material or multiple layers of materials. An exemplary multi-layer base film can comprise between one (1) to nine (9) layers, preferably one (1) to five (5) layers and more preferably one (1) to three (3) layers. It is further contemplated that the material composition of a base film can range from a single material to a blend of one or more various materials, wherein the material(s) employed can be as has been described herein or contemplated by those skilled in the art. The compositional characteristics of the materials used for single layer or multi-layer embodiments can vary as may be contemplated by those skilled in the art to achieve specific properties and/or product requirements. For instance, where the base film comprises two or more materials it may be established as a blend of materials wherein the compositional percentage of the individual materials used can range from one (1%) percent to ninety-nine (99%) percent, preferably twenty-five (25%) percent to seventy-five (75%) percent and more preferably thirty-five (35%) percent to sixty-five (65%) percent of the base film. Still further, for base films comprising blends of various materials, such as various polymers, it is contemplated that an individual material may be employed based on and perform a specific function, such as contributing strength, transparency, adhesiveness, sealability, recloseability or machineability, to meet specific product requirements. By way of example, a co-extrusion process may be employed to construct a multi-layer base film that can comprise and include, but is not necessarily limited to, a pressure sensitive adhesive (PSA) layer and a printable layer. In another example, a base film may be formed through a lamination process wherein multiple layers, that may each be comprised of one or more materials, can be used and bonded together via an adhesive layer. The adhesive layer may be a weak or strong adhesive layer as has been previously described herein above. The weak adhesive layer may include various pressure sensitive adhesives that promote and/or provide the resealable capabilities/properties of the base film. A strong adhesive layer(s) may be used to promote and/or ensure a more permanent affixation or bond between the layers or to trap and affix ink or other indicators.

For any of the contemplated and exemplary embodiments the film may be configured and produced, without limitation, as a multi-layer film. For multi-layer film constructs and configurations it is contemplated that the plurality of film layers can be manufactured employing various techniques and technologies, such as through co-extrusion whereby the multiple layers can be coextruded together for forming the film. The base film configuration for the exemplary embodiments contemplate sealability, also referenced herein as recloseability, of the base film may be achieved by employing a PSA coating to an amount of a surface area of a particular surface of a base film, as has been described herein.

Similar to exemplary embodiments described previously herein, various construction processes, technologies and techniques can be used in producing any of the films, components and/or layers of the current invention. For example, construction of a single layer base film can employ extrusion processes, technologies and techniques whereby the film construct is an extruded single layer. Further, construction of a multiple layer base film can be accomplished through co-extrusion processes, technologies and techniques. In a co-extrusion process multiple layers of materials can be bonded together and extruded as a flexible film construct. It is understood that any one layer of material for the multi-layer base film construct can be similar to or different from another layer of material and any layer may comprise one or more various materials (such as polymers) or grades of materials and promote or provide one or more specific characteristics and properties. It is further contemplated for the construction of multiple layer base film configurations that it can employ processes, technologies and techniques whereby the multiple layers are produced and then are laminated and/or adhered together to form a flexible film construct.

The dimensional characteristics, described through use of any units of measurement, for any BSR film construct can vary in its physical dimensions, such as its length, width, height and/or thickness dimensions. Thus, for any exemplary BSR film of the current invention, it shall be understood that it can have various physical dimensional (length, width, height and/or thickness) characteristics and that each characteristic can range from one one-thousandth (0.001 mil) millimeter to one thousand (1,000 mil) millimeters, one (1) inch to six hundred (600) inches, one (1) foot to twenty (20) feet, one (1) meter to fifteen (15) meters or such other dimensional characteristics as may be contemplated and preferred by those skilled in the art. A BSR film of exemplary embodiments can be constructed having a total material thickness ranging from 0.5 to 5 mil, preferably from 0.5 to 4 mil, more preferably between 0.5 and 3.5 mil. Each individual layer of the multilayer base film of the current invention (coextruded or laminated together after extrusion or coated film) can be constructed having a material thickness ranging from 0.01 to 3 mil, more preferably from 0.01 to 2 mil, more preferably 0.01 to 1 mil.

Similar to that described above herein, the configuration of the container (aka, storage device and the like) which may be employed for any of the contemplated and exemplary embodiments may vary in any characteristic(s), configuration(s), feature(s) and/or aspect(s). By way of example and for clarity purposes, and in accordance with all embodiments of the current invention, the dimensional characteristics may range from the variously sized standard APET trays to any such dimensions as are and may be known and contemplated by those skilled in the field(s) of the current invention. In exemplary contemplated embodiments, APET tray sizes comprise dimensions ranging from (A) 205 mm wide, 305 mm length and 120 mm depth to (B) 177.8 mm wide, 177.8 mm length aid 106.6 mm depth. As such, the physical dimensional characteristics, that may be described through use of any units of measurement, for any container or any aspect or feature of such can range in any of its physical dimensions, such as its length, width, height and/or thickness dimension(s). Thus, for any container, it shall be understood that it can have various physical dimensional (length, width, height, depth and/or thickness) characteristics and that each characteristic can range from one one-thousandth (0.001 mil) millimeter to one thousand (1,000 mil) millimeters, to one (1) inch to six hundred (600) inches, to one (1) foot to twenty (20) feet, to one (1) meter to fifteen (15) meters or such other dimensional characteristics as may be contemplated and preferred by those skilled in the art. As described herein, it is contemplated that the physical dimensional characteristics for the BSR film can similarly vary and range in any manner to work in conjunction and operationally connect with any containers.

The container of exemplary embodiments herein can be a rigid structure configured and constructed with a base surface/section connected to one or more wall (side) sections, forming a storage construct having or defining an inner enclosure (within which food product can be stored) and an open top edge for operationally connecting with a resealable and flexible base film. The open top edge can also be understood or referred to herein as a flange or rim of the container. In previous exemplary embodiments of the current invention it is understood that at least a portion of a resealable base film may be more permanently affixed or bonded to the top edge, such as through heat sealing processes and the like. For the exemplary embodiments described herein below, in reference to FIGS. 7-10, it is understood that the BSR film can be sealed to the top edge, peeled away from the top edge and then resealed to the top edge. This sealability (resealing) capability can be promoted and/or provided through various techniques and technologies as are known, such as heat and/or pressure sealing techniques and technologies.

It is contemplated that any exemplary and contemplated embodiments of the base film can comprise a top surface and a bottom surface. The top and bottom surfaces oppose one another in orientation and can be significantly similar in both their physical (dimensional) and compositional characteristics. It is contemplated that these surfaces may be less than significantly similar in their physical and/or compositional characteristics and still provide an exemplary BSR film of the current invention. Both surfaces are defined by a physical perimeter that establish an outer-edge for each surface, wherein these physical (dimensional) characteristics are generally defined by the base film.

To provide, promote and/or contribute to the operational connection (sealability) of a BSR film with a container a BSR film can further comprise a resealing section. The resealing section, in contemplated exemplary embodiments, can comprise significantly all or less than all of one or both surfaces of any BSR film. A resealing section can be established on either or both the top or bottom surfaces, preferably the bottom surface. The resealing section promotes and/or enables, often in conjunction with the application of a force, a base film of the current invention to be anchored to or closed with the top edge, flange or rim of a container thereby establishing a sealed container providing a closed inner enclosure within which food product can be stored and an interior atmosphere established. It can be understood that a force, such as a heat sealing, pressure sealing force or other force as may be contemplated by those skilled in the art, may be applied to a BSR film and/or the resealing section of a BSR film to promote the operational connection between the base film and the container.

The resealing section of a base film can be understood as a section, portion or percentage of the total surface area of a top or bottom surface of a base film. The resealing section can be significantly the entire surface area of a top or bottom surface of a base film or less than the entirety (<100%) of the total surface area. The resealing or sealability characteristic or properties of any exemplary base film may be achieved by establishing a resealing section that comprises a varying ratio of materials that establish a tackiness factor for the resealing section. For instance, a varying ratio of copolymers of ethylene with one or more polar monomers (vinyl acetate, methyl acrylate, ethyl acrylate, butyl acrylate, acrylic acid, methacrylic acid, and mixtures thereof) can provide a resealing section with a tackiness factor that promotes, contributes to and/or provides the sealing and/or resealing capability for a base film of the current invention.

In preferred embodiments, the resealing section of a base film can be configured as a complimentary feature established about an outer edge of the base film on a bottom surface, wherein the bottom surface is the surface of a base film that directly contacts a top edge of a container. As such, the physical (dimensional) characteristics of a complimentary resealing section can be significantly similar to and/or less than significantly similar to the physical characteristics of a top edge of a container. The physical (dimensional) characteristics of a top edge of any of the exemplary containers or storage devices described herein for the current invention can promote and/or, at least in part, contribute to or provide for the operational (resealable) connection between a container's top edge and any BSR film. The width of an exemplary top edge, referred to herein as a flange or rim, of a container can range from one-tenth (0.1") inch to five (5") inches, preferably, one-tenth (0.1") inch to two and half (2.5") inches, more preferably one-tenth (0.1") inch to one (1") inch. Thus, it is contemplated that an exemplary resealing section, as may be established about an outer edge of a bottom (or top) surface of an exemplary base film, can be configured with similar, complimentary physical characteristics or various different characteristics as may be contemplated by those skilled in the art. In operation, it is therefore contemplated that a complimentary resealing section can be peeled away from a top edge of a container and then resealed to the top edge by re-establishing the connection between the resealing section and the top edge. This can promote, contribute to and/or provide for the modulation of an interior atmosphere within a container over the life-cycle of a food product stored within the container.

For the exemplary embodiments of the current invention, it is understood that the atmospheric control attributes that are in a BSR film, including any material(s) used in constructing the base film, and the characteristics of the materials used in providing a resealable packaging device (RPD) can promote, contribute and/or control the creation and maintenance of an interior atmosphere to modulate the life-cycle of the food product. Any of the atmospheric control attribute technology may be utilized in conjunction with existing container/storage (bag, storage device, lid/roll stock, pouch) technologies or with newly constructed container/storage technologies. The configuration, type, number and size of atmospheric control attributes can vary and can be located within varying and various components, film(s), layers or features of any material that may be configured as and form any part of the current invention. Thus, it is contemplated that the atmospheric control attributes may and can be provided in a container that can operationally connect with a BSR film, thereby providing an RPD for containing food in accordance with the current invention. The atmospheric control attributes including without limitation any of the perforations (micro- and/or macro-), slits, slots, micropores, and the like, as have been described herein can be provided on the one or more walls of a container or can be on the top edge, rim or flange of a container.

Figure 7A:
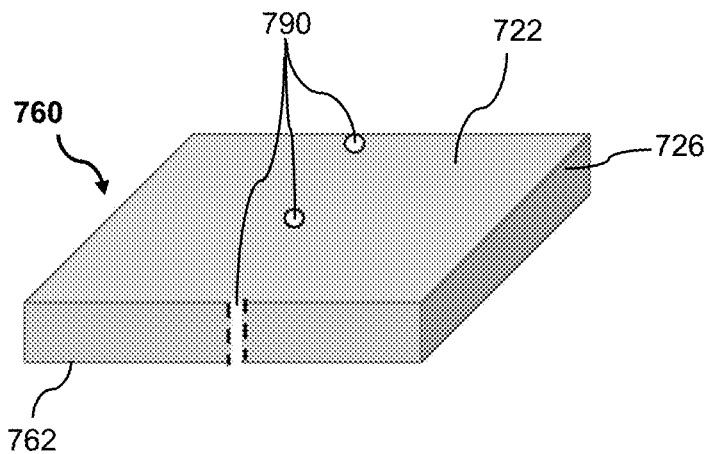
FIG. 7A is an illustration of a resealable film comprising a single-layer resealable film structure with a plurality of atmospheric control attributes in accordance with an exemplary embodiment of the present invention.
Figure 7B:
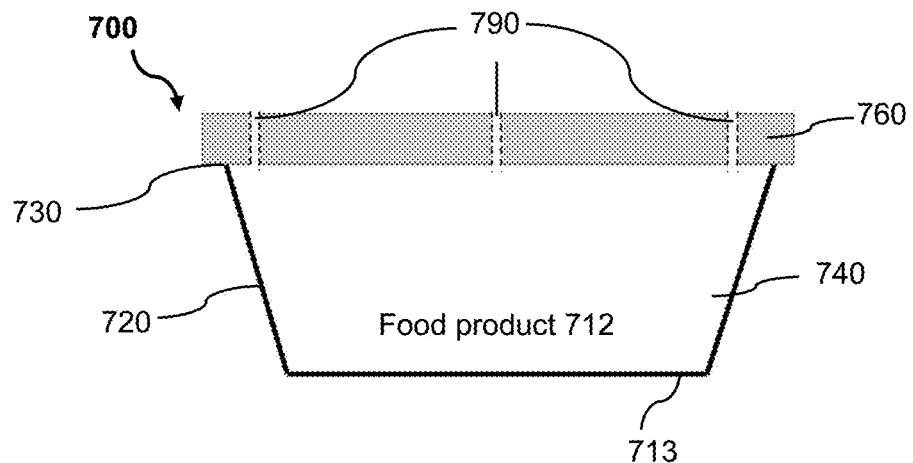
FIG. 7B is an illustration of the resealable film structure shown in FIG. 7A connected with a storage container forming a resealable packaging device including an enclosure within which food product can be located, wherein an interior environment is in communication with an exterior environment via the atmospheric control attribute(s) and can be accessed via the opening in accordance with an exemplary embodiment of the current invention.
Figure 7C:
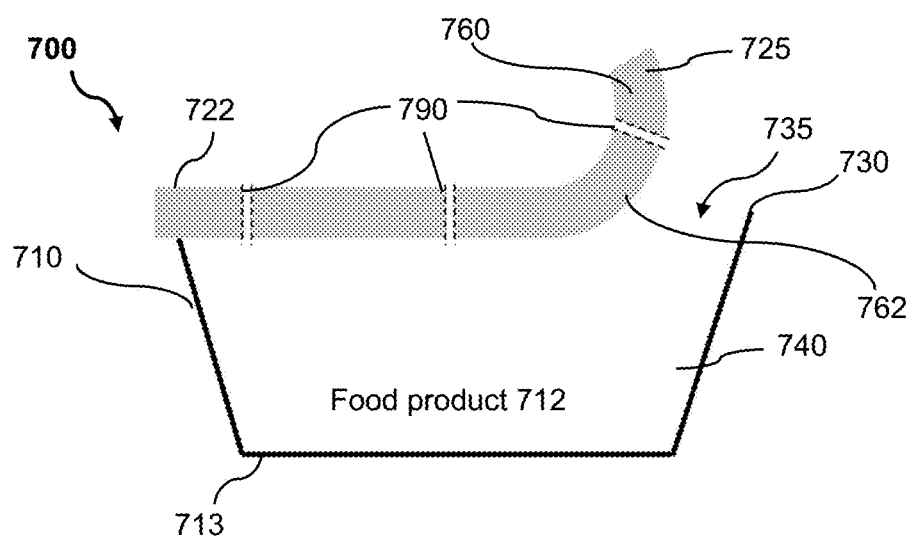
FIG. 7C is an illustration of the resealable film structure shown in FIGS. 7A and 7B partially peeled away from its connection with the storage container forming the resealable packaging device thereby exposing an opening and providing access to the enclosure in accordance with an exemplary embodiment of the current invention.

A resealable packaging device (RPD) 700, as shown in FIGS. 7A-7C, comprises a container 710 operationally connected with a single layer, breathable and resealable base (BSR) film 760. In an alternative contemplated embodiment, a resealable packaging device (RPD) can comprise a container operationally connected with a three-layer, breathable and resealable base (BSR) film. While there can be distinctions between a single layer and three-layer, breathable and resealable base film, it may be reasonably understood that the description provided herein for any feature(s), aspect(s), use(s) and/or capability(ies) of the single layer embodiment may be understood as applicable to the three-layer contemplated embodiment.

Container 710 includes a container bottom wall or surface 713 that is integrally or connectably formed or connected about its entire outer-edge with a container wall 720. The container wall 720 defined by opposing side walls 722 and 723 and opposing side walls 726 and 727. As shown in FIGS. 7B and 7C, the opposing side walls of container wall 720 are integrally formed with one another. It is contemplated that the opposing side walls may be connected with one another using various techniques and technologies. A top-edge 730 of wall 720, opposite bottom-edge 721 of wall 720 that is integrally connected with the bottom surface 713, defines the perimeter of an opening 735 into an inner enclosure 740 (interior space) for container 710. The inner enclosure 740 can be understood as the space that exists and is defined between the interior surfaces of the opposing sidewalls 722 and 723 and 726 and 727 of container wall 720 and the interior surface of the bottom surface 713 of container 710 and the top-edge 730. When BSR film 760 is closed or sealed to top-edge 730, it is understood that the inner enclosure 740 includes the space defined between the opposing side walls of container wall 720 and that between the container bottom surface 713 and bottom surface 762 of the BSR film 760. It is within an interior space provided by the inner enclosure 740 that various food products, as exemplified by food product 712 in the current embodiment, can be stored, maintained, positioned and/or located. The food products having various respiration characteristics, such as low, medium and/or high respiration rates.

In the preferred embodiment shown in FIG. 7A, the BSR film 760 is configured and comprises a single layer of material, wherein the material employed can be any one of those described herein or may comprise two or more various materials blended together to form the single layer construct. This single layer construct providing all features, characteristics and properties in accordance with the current invention. It is contemplated that the BSR film may be configured and comprise two component layers, constructed from one or more of the various materials, either alone or in blended combination, as described herein. The single layer has and is constructed with a material height or thickness of 1.2 mil. It is contemplated that a layer of any exemplary embodiment can have and/or be formed with a material thickness ranging from 0.5 to 5.0 mil, more preferably from 0.5 to 2.5 mil. It is contemplated that the BSR film 760 can connect with various containers, packaging devices and/or storage technologies to provide an enclosure capable of at least partially encompassing various food product within.

The BSR 760 comprises a bottom surface 762, opposite a top surface 722, and includes a resealing section 725 configured, at least in part, about a perimeter of the resealable base film 760 wherein the perimeter is defined by an outer-edge 726 of the resealable base film 760. Resealing section 725 is established as a percentage of the surface area of the bottom surface 762 of base film 760 and enables the peelable functionality of the resealable packaging device 700. The resealing section 725 promotes and/or provides for the operational connection between the container 710 and resealable base film 760, whereby in operation the resealing section 725 can be placed in direct, physical contact with the top-edge 730 of the container 710, thereby enabling the sealing and resealing of the resealing section 725 with container 710. This direct, physical contact between the resealable base film 760 and top-edge 730 promotes and/or provides for the closing and opening of the container 710. A closed resealable packaging device 700, including a closed container 710, as is shown in FIG. 7B, is defined by the establishment of a closed inner enclosure 740, wherein the resealable base film 760 is sealed about top-edge 730 of container 710.

With the resealable packaging device 700 closed or sealed, as shown in FIG. 7B, the inner enclosure 740 is understood as defining an interior space within which can be established an interior atmosphere or environment. This interior environment can comprise various environmental conditions as discussed previously herein. More particularly, when a food product is located in the interior space of a closed or sealed inner enclosure 740, the respiration characteristics of the food product impact upon the interior atmospheric conditions within the inner enclosure 740, such as the concentrations of various gases, water vapor and/or agents that can be present. The food products that may be stored within RPD 700 and/or other exemplary embodiments herein can have various respiration characteristics, such as low, medium and/or high respiration rates.

Resealable packaging device 700 includes atmospheric control attributes 790. The atmospheric control attributes being designed and included to provide a total open area for the resealable packaging device 700 that promotes the optimization of the interior atmosphere of enclosure 740, particularly when food product is encompassed therein. As discussed previously, the configuration, number, size and density of the atmospheric control attributes can vary to provide a desired per perforation open area and total open area. The atmospheric control attributes 790 are configured as three (3) micro-perforations positioned within the resealable base film 760 and are open through all layers of the BSR film 760. By providing these atmospheric control attributes 790 in the exemplary BSR film 760 the resealable packaging device 700 is operationally connecting the inner enclosure 740, and thereby the food product 712, to an external environment. Thus, when the resealable base film 760 is sealed to the top-edge 730 of container 710 the atmospheric control attributes 790 promote and/or provide the operational connection of the interior atmosphere defined within inner enclosure 740 with an external environment outside of the container 710.

In the preferred embodiments of FIGS. 7A-7C, each of the atmospheric control attributes 790 are positioned and configured to provide an opening that extends through resealable base film 760. This provides a communication and/or synergistic interaction between the inner enclosure 740 and an exterior atmosphere outside the resealable packaging device 700 allowing and, at least in part, controlling transmission (gaseous and water vapor) characteristics between the interior environment of the sealed inner enclosure 740 and the exterior environment, and properties (i.e., gaseous concentrations) within the interior environment of the inner enclosure 740. As described, the atmospheric control attributes are micro-perforations. The micro-perforations established can include one (1) to one hundred fifty (150) micro-perforations, wherein each micro-perforation has a diameter of seventy-five microns (75 μm) providing a per perforation open area of $4.415625 \times 10^{-9}$ m$^2$. In the alternative it is contemplated that each micro-perforation can be configured to have a diameter of one hundred microns (100 μm), thereby providing a per perforation open area of $7.85 \times 10^{-9}$ m$^2$ and, where three (3) such micro-perforations are established they provide a total open area of $2 \times 10^{-8}$ m$^2$. It is contemplated that a total open area ranging from $4.42 \times 10^{-9}$ m$^2$ to $6.62 \times 10^{-7}$ m$^2$; $1.33 \times 10^{-8}$ m$^2$ to $1.33 \times 10^{-6}$ m$^2$ and $7.85 \times 10^{-9}$ m$^2$ to $7.85 \times 10^{-7}$ m$^2$ can be established for the preferred embodiments of FIGS. 7A-7C.

It is contemplated for the current preferred embodiments of FIGS. 7A-7C that it include micro-perforations with diameter sizes of: (i) 75 microns (75 μm) providing a per perforation open area of $4.415625 \times 10^{-9}$ m$^2$; (ii) 90 microns (90 μm) providing a per perforation open area of $6.3585 \times 10^{-9}$ m$^2$; (iii) 100 microns (100 μm) providing a per perforation open area of $7.85 \times 10^{-9}$ m$^2$; (iv) 120 microns (120 μm) providing a per perforation open area of $1 \times 10^{-8}$ m$^2$; (v) 130 microns (130 μm) providing a per perforation open area of $1 \times 10^{-8}$ m$^2$; (vi) 150 microns (150 μm) providing a per perforation open area of $2 \times 10^{-8}$ m$^2$; (vii) 240 microns (240 μm) providing a per perforation open area of $5 \times 10^{-8}$ m$^2$; or (viii) such other sizes and per perforation open area as may provide the atmospheric promotional advantages. It is contemplated for exemplary embodiments, RF per unit package and/or RPD, of the current invention that the total open area provided by the atmospheric control attributes may range generally from $1.5 \times 10^{-11}$ m$^2$ to $1.5 \times 10^{4}$ m$^2$.

In the preferred embodiments, the plurality of atmospheric control attributes 790 provides the breathable utility of the resealable base film 760 and resealable packaging device 700, and as a result the breathability for the interior atmosphere of inner enclosure 740. As such, the atmospheric control attributes 790 promotes the optimization of the interior atmosphere of the inner enclosure 740 and the quality protection of the food product 712 therein, by affecting the respiring and gas sensitive food product 712. The effects that may be provided by the current invention can promote the optimization of various internal atmospheric conditions, including one or combination of $O_2$, $CO_2$, $C_2H_4$ and $H_2O$ vapor concentrations, in the inner enclosure 740 within which food product, 712 is located. As described herein, this optimization of enclosure atmospheric conditions for food product located therein can include, without limitation, the establishment, modulation and/or maintenance of various amounts, ranges of amounts, concentrations, ratios and the like, of various gases, moisture content, chemical and such other atmospheric factors as may be and may be contemplated as present in the internal atmosphere of the inner enclosure.

Each of the plurality of atmospheric control attribute 790 provides an opening through resealable base film 760. In the current embodiment each of the plurality of atmospheric control attributes 790 can be similarly configured, including length and width, but can be positioned and established in different locations of the resealable base film 760. The position or location within an exemplary base film and/or a resealable packaging device that one or more of the atmospheric control attributes can be established may vary significantly without departing from the scope and spirit of the present invention. For instance, it is contemplated that the one or plurality of atmospheric control attributes may be located in various positions in the container wall 720. It is contemplated that each of the plurality of atmospheric control attributes 790 may have similar or different diameters when compared against one another. The atmospheric control attributes 790 can have distinct volumetric configurations based on various characteristics, such as the number of layers and/or thickness of material(s) that it extends through. The configuration, location, number, size, density, open area and the like of the atmospheric control attribute(s) located in any exemplary resealable packaging device, as shown in FIGS. 7-9 and as may be contemplated, can vary to accommodate varying configurations of any exemplary or contemplated resealable base film and/or container and/or the use of such exemplary or contemplated resealable packaging devices with various food products without departing from the scope and spirit of the current invention.

Various food products 712 can be located within the inner enclosure 740 of resealable packaging device 700. As described herein, these food products can include various perishable and/or non-perishable food products with varying respiration rates. With the configuration shown in FIG. 7B, the resealable base film 760, as connected to the top-edge 730 of container 710, has an original or first position, that is substantially closed or sealed over the opening 735 and inner enclosure 740. When peeling back the base film 760, it peels away and separates from the top-edge 730 and exposes the opening 735 and, thereby, enclosure 740, as shown in FIG. 7C. This allows access to the inner enclosure 740 and any items therein, such as food product 712. The peeled back and separated BSR film 760 (as shown in FIG. 7C) can be re-positioned, re-sealed and/or re-closed back into its original "closed" position (as shown in FIG. 7B) that it was prior to being peeled away and separated from the container 710. As described, the re-connection may be accomplished in conjunction with the application of a force to promote a secure seal between the BSR film 760 and container 710. In this manner, the current invention promotes the re-sealing and/or re-closing of the opening 735 and, thereby, enclosure 740. This re-sealing and/or re-closing capability provided allows a food product 712 to be re-closed within the inner enclosure 740 and for the re-establishment of an interior atmosphere within enclosure 740 after having been exposed to the exterior atmosphere outside the container 710. As such, the atmospheric control attributes 790 can provide to the re-closed RPD 700 the advantages of promoting an optimization of the interior atmosphere for the food product.

The current configuration of the base film 760 is designed to peel back completely and separate from the container 710. It is contemplated that base film 760 can be designed, constructed and/or implemented in a manner that enables a portion, but less than all, of the base film 760 to be peeled away from top-edge 730. For the exemplary configuration shown in FIGS. 7B & 7C and the contemplated embodiments described herein the base film 760 can be resealed to the container 710.

It shall be understood that the use of the terms "resealable", "removable" and/or "re-closable" herein, including in the claims, are non-limiting, non-restrictive and are intended to provide an indication of a capability being provided by any of the exemplary embodiments described and claims for the current invention. This re-sealing and/or re-closing capability provided allows a food product, stored in an enclosure, to be re-closed within an interior atmosphere of the enclosure after having been exposed to the exterior atmosphere outside of a container. In this context, it is understood that the peeling away of any exemplary resealable base film and/or resealable packaging device embodiment described herein results in at least a partial loss of connection between it and the container to which it is and can be removably connected. Thus, when the BSR film 760 in the current embodiment is re-closed into a closed position, it may or may not form the same or a similar connection with the top-edge 730 and/or container 710 as it originally had. However, it shall be understood that with a re-closing of the resealable base film, such as BSR film 760 to the container 710, the atmospheric control attributes are once again enabled to provide to the advantages of promoting an optimization of an interior atmosphere for a food product in an enclosure.

The resealable packaging device 700 is designed to help promote the optimization of various internal atmospheric conditions, including one or combination of $O_2$, $CO_2$, $C_2H_4$ and $H_2O$ vapor concentrations, in the enclosure 740 within which a food product 712 is located even after the peelable BSR film 760 is peeled and resealed to container 710. In the closed configuration the atmospheric control attributes 790 promote the optimization of the interior atmosphere and provide the interaction between the interior atmosphere of inner enclosure 740 and an exterior atmosphere outside the closed resealable packaging device 700. When the BSR film 760 is peeled back the opening 735 and inner enclosure 740 is exposed or open to the exterior atmosphere. It is understood that atmospheric control attributes 790, when the BSR film 760 is re-positioned over enclosure 740 after exposure to the exterior atmosphere, will interact with the interior atmosphere of the enclosure 740 and promote its optimization. It is contemplated that the atmospheric control attributes provide their synergistic interaction with any interior atmospheric conditions found, even after the exposure of an enclosure and any food product stored therein to an exterior atmosphere, and, thereby, promote the optimization of the interior atmosphere throughout the use of the BSR film 760 and/or resealable packaging device 700.

It is contemplated that the base film and/or container as indicated for FIGS. 7A-7C and any other exemplary or contemplated embodiments, can be constructed of various materials and printed on and include various indicators, designs and/or include a label. In the preferred embodiment, the material used for the base film 760 and container 710 are polymeric that have at least one polymer common in their composition. As described herein, alternative materials, including composite materials, may be used for and in the construction of the base film 760 and/or container 710 of the resealable packaging device 700. It is also contemplated that the materials used for the base film 760 can be different than that used for container 710. For instance, the container 710 can be formed from materials that are more rigid and less breathable than the materials used for the base film 760 and/or vice versa. Various alternatives as may be contemplated by those skilled in the art can be employed without departing from the scope and spirit of the current invention.

The printing techniques can include surface printing, reverse printing and such other techniques as may be contemplated by those skilled in the art. The printing may take place on either side of a layer, more preferably on the side of a layer that faces away from the enclosure or towards the environment outside the internal environment provided by the resealable packaging device 700 of the current embodiment. The printing can cover an amount of the surface area of a layer, such amount can vary from all to a small percentage (>0.1%) of the total surface area of the first layer. It is contemplated that the current invention may not include any printing or may include any amount of printing. The printing does or does not, may or may not impact upon any of the capabilities provided by the current invention.

An adhesive, that may be included as part of the compositional characteristics of a layer and/or as an adhesive layer included with another layer of any exemplary or contemplated configurations, can comprise a pressure sensitive adhesive. The adhesive can be configured within a material thickness for a layer and/or provide a material thickness, for example of 0.51 mil. Alternative adhesives and thicknesses are contemplated for use by the current invention. It is contemplated that adhesive layer(s) of any exemplary RF and/or RPD embodiments can be constructed having a material thickness ranging from 0.01 to 3 mil, more preferably from 0.1 to 1 mil. The adhesive and/or adhesive layer contemplated for use by embodiments of the current invention can be composed or and/or formed utilizing various adhesives and/or compounds including, without limitation, heat sensitive adhesive(s), pressure sensitive adhesive(s) and the like, as may be contemplated. Still further, the adhesive and/or adhesive layer can be formed using adhesives with various properties and/or characteristics, such as strong and/or weak adhesive characteristics and the like. The structure of any of the exemplary embodiments may include one or more adhesives and/or adhesive layers having various physical characteristics including, without limitation, the thickness of the adhesive materials used in constructing the layer(s).

The BSR 760, bottom surface 762 and/or resealing section 725 of the base film 760 can have a total adhesive (TA), as measured in weight/unit area ($g/m^2$), of 34.42 $g/m^2$. Given the identified specifications above for adhesive characteristics that may comprise various exemplary embodiments of the current invention, it is contemplated that the adhesive(s) and/or adhesive(s) layers may have a total adhesive (TA), as measured in weight/unit ($g/m^2$), ranging from 1 to 100 $g/m^2$ and more preferably from 5 to 70 $g/m^2$. It is further contemplated that the adhesiveness of the base film and resealing section can provide a moisture control feature and/or factor that impacts upon the water vapor content within the resealable packaging device 700. In the current embodiment, this comprises the use of water impermeable or partially water permeable pressure sensitive adhesive (PSAs) as the adhesive in resealing section 725 to provide a moisture control feature, particularly when BSR 760 is closed (sealed) with container 710, that promotes a decrease in the water vapor content present within the interior atmosphere provided for food product stored within the enclosure 740 of the resealable packaging device 700. The moisture control feature and/or factor can be established within the chemical composition of the adhesive for use in any of the exemplary and contemplated embodiments of the current invention. It is contemplated that the current invention can employ the use of one or more desiccants or other moisture adsorption technologies.

The use of atmospheric control attributes and inherent gas transmission properties of the materials can provide the resealable packaging device 700 a total Moisture Vapor Transmission Rate (MVTR) of 0.1 to 165 g/100 sq. in/day. This total MVTR control provided by the current invention promotes desirable atmospheric conditions within the resealable packaging device and thereby provides all the advantages of the current invention. These advantages include the promotion of desirable marketable characteristics, significantly reduced deterioration for longer periods of time and prolonged shelf-life for the food product. Packaging devices that lack the MTVR controls of the current invention can fail to provide any of the advantages of the current invention and thereby the food product quality can be significantly deteriorated, the observation and/or presence of undesirable marketable characteristics can be seen earlier and may be more pronounced and shelf-life can be significantly reduced. All these failures can have a significantly negative impact upon the marketable characteristics and, therefore, potential commercial success for any packaged food product and, as such, may have a significant negative impact upon the choices and quality provided to consumers of food products.

Given the identified specifications for resealable packaging device 700, the total thickness for the resealable base film 760 is 2.65-2.75 mil. It is contemplated that the base film 760 may have a total height or thickness ranging from one (1 mil) to eight (8 mil) or other alternative ranges of height or thickness as contemplated by those skilled in the art. In contemplated and/or alternative embodiments, the resealable base film can have a total thickness ranging from 2.25 mil to 2.35 mil. In additional contemplated embodiments, the resealable base film total thickness can range from 4.00 mil to 4.25 mil. In contemplated embodiments where various layers are utilized in forming exemplary resealable base films and/or containers these layers can be constructed having a material thickness ranging from 0.5 to 5.0 mil, more preferably between 0.5 and 2.5 mil. Alternative thicknesses for layers are contemplated for use by the current invention. In the preferred embodiments shown in FIGS. 8A, 8B and 8C, a resealable packaging device (RPD) 800 having a breathable and resealable base (BSR) film 802 connected to a storage container 820, thereby defining an inner enclosure 840, is provided. The storage container 820 is defined by a sidewall 821 with opposing sections continuously extending from its connection along a bottom edge 823 with a bottom surface or wall 825. The sidewall 821 includes a continuous top edge 822 which defines an open perimeter that exposes the interior surfaces of the sidewall 821 and the bottom wall 825.

The resealable film 802 comprises five component layers, a first layer ("first flexible film" or "sealable layer") 804 that is designed to be sealable and may be surface printed, an adhesive second layer 830, a third layer 832, which is bonded or laminated with a fourth (lamination) layer 834 to fifth layer 836. The first layer 804 comprises a bottom surface 805, that is opposite a top surface, and includes a resealing section 806 configured, at least in part, about a perimeter of the first layer 830. The perimeter is defined by an outer-edge 838 of the bottom surface 805 of the BSR film 802. Resealing section 806 is established as a percentage of the surface area of the bottom surface 805 of BSR film 802 and enables the peelable functionality of the RPD 800. The percentage amount of surface area comprising the resealing section can range as has been described herein above. The positioning or location of the resealing section within the bottom surface of an exemplary BSR film can vary significantly, such as proximal to the outer-edge 838 and significantly circumscribing the perimeter of the BSR film 802 as shown in FIG. 8C. The resealing section 806 promotes and/or provides for the operational connection between the container 820 and BSR film 802, whereby in operation the resealing section 806 can be placed in direct, physical contact with the top-edge 822 of the container 820, thereby sealing the resealing section 806 with container 820. This direct, physical contact between the BSR film 802 and top-edge 822 promotes and/or provides for the closing of the container 820. A closed container 820 is defined by the establishment of a closed inner enclosure 880, wherein the resealable base film 802 is sealed about top-edge 822 of container 820. Other techniques and/or technologies for connecting any layer of an RF with a storage container can be utilized as described herein and as may be contemplated by those skilled in the art. The first layer 830 has and is constructed with a material height or thickness of 1.2 mil. It is contemplated that the sealable layer of any exemplary embodiment can have and/or be formed with a material thickness ranging from 0.5 to 5.0 mil, more preferably from 0.5 to 2.5 mil. It is contemplated that the BSR 802 can connect with various packaging devices and/or technologies to provide an enclosure capable of at least partially encompassing food product 802 within.

With the first layer 804 of BSR 802 sealed to the top edge 822 of container 820 the enclosure 840 is defined as the space that exists between the opposing sections of sidewall 821 and between the bottom surface 805 and the bottom wall 825. It is within enclosure 840 that various food products, as exemplified by food product 812 in the current embodiment, can be stored and located. The food products having various respiration characteristics, such as low, medium and/or high respiration rates. When 802 BSR 802 is closed or sealed, as shown in the current embodiment, the enclosure 840 is understood as having an interior space that defines an interior atmosphere or environment. This environment comprising various environmental conditions as discussed previously herein. More particularly, when food product 802 is located in enclosure 840, the respiration characteristics of the food product impact upon the interior atmosphere and conditions, such as the concentrations of various gases, water vapor and/or agents present.

802 BSR 802 includes atmospheric control attributes 850. The atmospheric control attributes being designed and included to provide a total open area for the BSR and RPD that promotes the optimization of the interior atmosphere of enclosure 840, particularly when food product is encompassed therein. As discussed previously, the configuration, number, size and density of the atmospheric control attributes can vary to provide a desired per perforation open area and total open area. The atmospheric control attributes 850 are configured as three (3) micro-perforations, as shown in FIGS. 8A-8C, and are open through all layers connecting the enclosure 840 and thereby the food product 812 to the external environment.

Figure 8A:
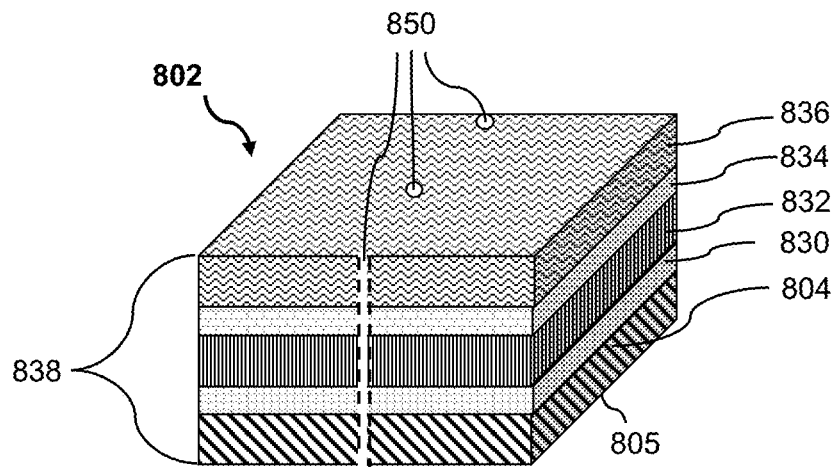
FIG. 8A is an illustration of a resealable film structure comprising a five-layer resealable film structure with a plurality of atmospheric control attributes in accordance with an exemplary embodiment of the present invention.
Figure 8B:
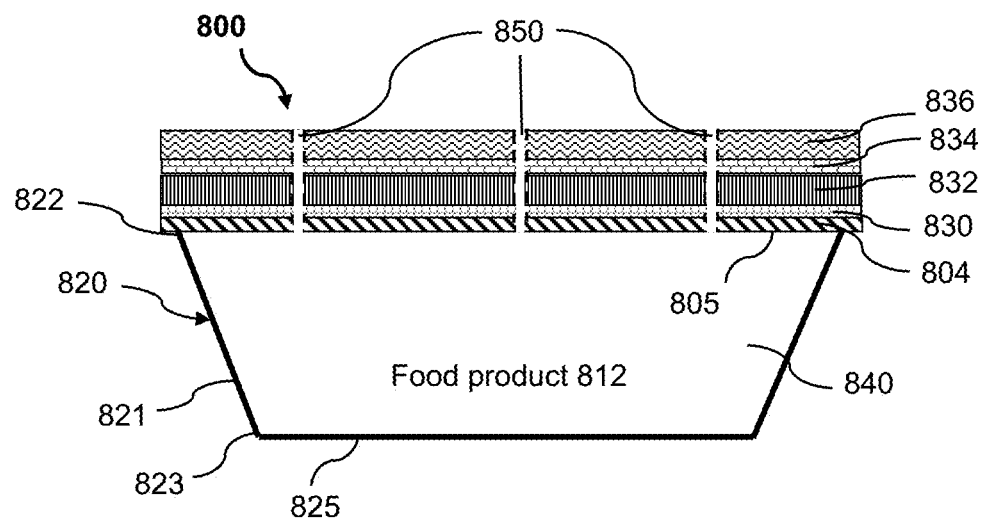
FIG. 8B is an illustration of the resealable film structure shown in FIG. 8A connected with a storage container forming a resealable packaging device including an enclosure within which food product can be located, wherein an interior environment is in communication with an exterior environment via the atmospheric control attribute(s) and can be accessed via the opening in accordance with an exemplary embodiment of the current invention.
Figure 8C:
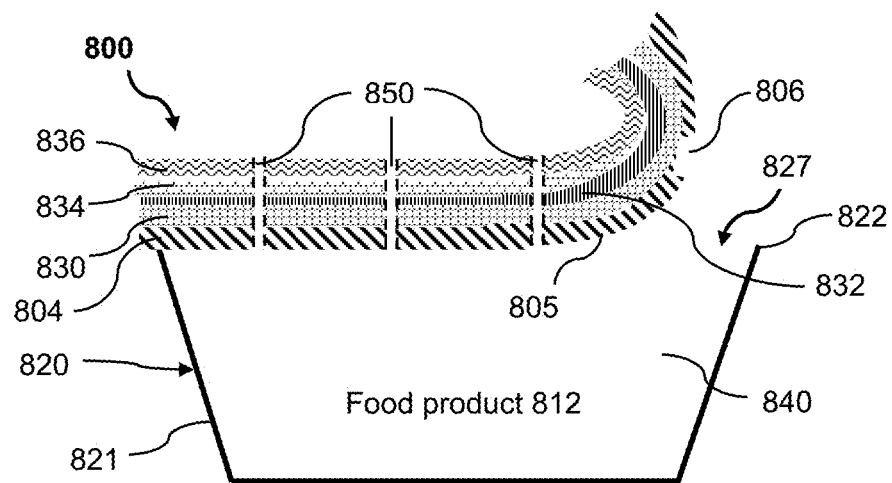
FIG. 8C is an illustration of the resealable film structure shown in FIGS. 8A and 8B partially peeled away from its connection with the storage container forming the resealable packaging device thereby exposing an opening and providing access to the enclosure in accordance with an exemplary embodiment of the current invention.

In the preferred embodiments of FIGS. 8A-8C, each of the atmospheric control attributes 850 are positioned and configured to provide an opening that extends through BSR 802. This provides a communication or synergistic interaction between the enclosure 840 and an exterior atmosphere outside the RPD 800 allowing and, at least in part, controlling transmission characteristics and properties between the interior environment of the enclosure 840 and the exterior atmosphere. As described, the atmospheric control attributes are micro-perforations. The micro-perforations established can include one (1) to one hundred (100) micro-perforations, wherein each micro-perforation has a diameter of one hundred thirty microns (130 μm) providing a per perforation open area of $1 \times 10^{-8}$ $m^2$. The configuration of the atmospheric control attributes 890 for FIGS. 8A-8C provides a total open area of $4 \times 10^{-8}$ $m^2$. It is contemplated that a total open area of $1.33\times10^{-8}$ m$^2$ to $1.33\times10^{-6}$ m$^2$ or $7.85\times10^{-6}$ m$^2$ to $7.85\times10^{-7}$ m$^2$ can be established for the preferred embodiments of FIGS. 8A-8D.

It is contemplated for the current preferred embodiments of FIGS. 8A-8D that it include micro-perforations with diameter sizes of: (i) 75 microns (75 μm) providing a per perforation open area of $4.415625\times10^{-9}$ m$^2$; (ii) 90 microns (90 μm) providing a per perforation open area of $6.3585\times10^{-9}$ m$^2$; (iii) 100 microns (100 μm) providing a per perforation open area of $7.85\times10^{-9}$ m$^2$; (iv) 120 microns (120 μm) providing a per perforation open area of $1\times10^{-8}$ m$^2$; (v) 130 microns (130 μm) providing a per perforation open area of $1\times10^{-8}$ m$^2$; (vi) 150 microns (150 μm) providing a per perforation open area of $2\times10^{-8}$ m$^2$; (vii) 240 microns (240 μm) providing a per perforation open area of $5\times10^{-8}$ m$^2$; or (viii) such other sizes and per perforation open area as may provide the atmospheric promotional advantages. It is contemplated for exemplary embodiments, RF per unit package and/or RPD, of the current invention that the total open area provided by the atmospheric control attributes may range generally from $1.5\times10^{-11}$ m$^2$ to $1.5\times10^{-4}$ m$^2$.

In the preferred embodiments shown in FIGS. 8A-8C, wherein 8C shows the 5 layer base film 802 in a configuration that exemplies its peelable functionality and shows that it is designed to peel back completely and separate all layers of BSR 802 from the container 820. In alternative embodiments, where a multi-layer base film of the current invention is provided, it is contemplated that one or more layers may be peelable, removable and/or re-closeable with one or more of the other layers. For instance, in a five layer construct for a base film of the current invention, layers two through five may be removably adhered to the first layer, which operationally connects with a container, and therefore be peelable from the first layer. In this example, exposing the first layer, by peeling back or away the other layers, does not necessarily remove the first layer from its operational connection with the container. As described throughout, in reference to previously described FIGS. 1-6, the first layer may be cut (die-cut) forming a section that peels away and exposes an opening through the first layer when layers two through five are peeled away from the first layer. In further alternative embodiments, less than all layers that are in addition to a first layer that operationally connects with a storage container can be peelable from and recloseable with the first layer. For any of the alternative contemplated embodiments, the atmospheric control attributes of the current invention, as has been described herein throughout, can be variously configured and constructed within the alternative base film construct(s) for providing the capabilities described herein for the current invention.

The resealable capabilities of BSR 802 are designed to help promote the optimization of various internal atmospheric conditions, including one or combination of $O_2$, $CO_2$, $C_2H_4$ and $H_2O$ vapor concentrations, in the enclosure 880 within which a food product, 802 is located, even after the peelable BSR 802 is peeled and resealed. When the BSR 802 is in the position shown in FIG. 8B the opening 827 is closed and as such the inner enclosure 840 is closed. In this configuration the atmospheric control attributes 850 promote the optimization of the interior atmosphere and provide the interaction between the interior atmosphere of enclosure 840 and an exterior atmosphere outside the closed RPD 800. When the BSR 802 is peeled back the opening 827 and enclosure 840 is exposed or open to the exterior atmosphere. It is understood that atmospheric control attributes 890, when the 802 BSR 802 is resealed over enclosure 880 after exposure to the exterior atmosphere, will interact with the interior atmosphere of the enclosure 880 and promote its optimization. It is contemplated that the atmospheric control attributes provide their synergistic interaction with any interior atmospheric conditions found, even after the exposure of the enclosure and any food product stored therein to an exterior atmosphere, and, thereby, promote the optimization of the interior atmosphere throughout the use of the RPD 800 and BSR 802.

Figure 8D:
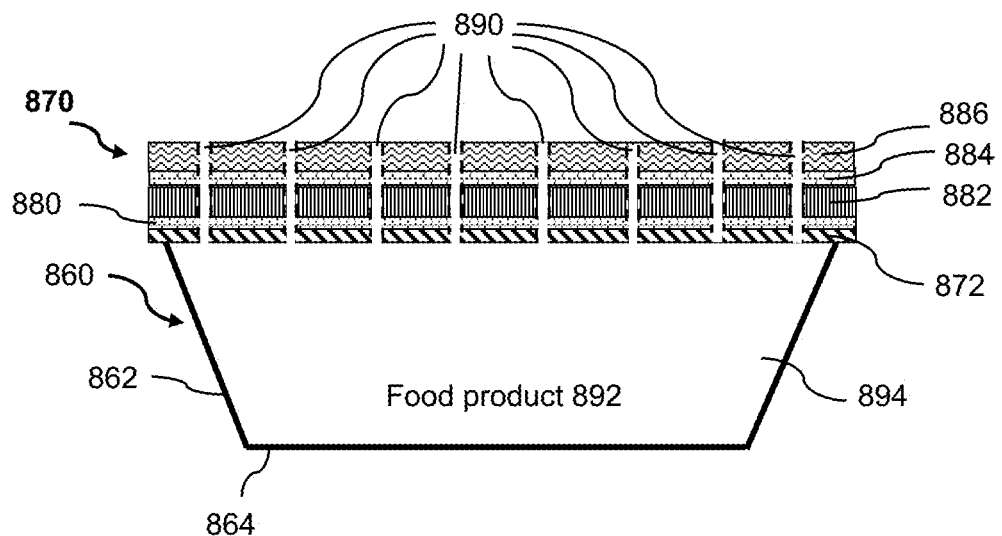
FIG. 8D is an illustration of a second exemplary embodiment of a five-layer resealable film structure connected with a storage container forming a resealable packaging device including an enclosure within which food product can be located, wherein an interior environment is in communication with an exterior environment via a plurality of atmospheric control attribute(s) and can be accessed via an opening in accordance with an exemplary embodiment of the current invention.

In an alternative embodiment, as shown in FIG. 8D, a resealable packaging device 855 can be configured to include a plurality of atmospheric control attributes 890 located in BSR 870. The plurality of atmospheric control attributes 890 are configured as micro-perforations. Each of the atmospheric control attributes 890 are similarly configured and provides an opening through all layers of BSR 870 thereby establishing a direct operational (communication) connection between the interior environment within enclosure 894 and the external atmosphere. It is contemplated that the atmospheric control attributes 890, or any one or combination of individual atmospheric control attributes, may have similar or different configurations and any one or multiple attributes can establish a direct or indirect operational (communication) connection between the inner enclosure 894 and an atmosphere external to container 860. By way of example, an indirect operational connection can be provided by any one or multiple atmospheric control attributes where the attribute(s) penetrate and/or extend through any one or combination of the different layers that form an exemplary BSR but do not penetrate or extend all layers of an exemplary BSR. The atmospheric control attributes 894 can have distinct volumetric configurations that can be similar or different to one another. This can be based on the thickness of all or any one or plurality of layers and their material(s) that each extends through. In the alternative or addition to, the one or plurality of atmospheric control attributes may be, at least partially, located in the container 860 of RPD 855. The configuration, location, number, size, density, open area and the like of the atmospheric control attribute(s) located in an exemplary RPD and/or BSR can vary to accommodate varying configurations of the BSR, container and/or the use of an RPD with various food products without departing from the scope and spirit of the current invention.

Various food products 802 or 892 can be located within the enclosure 840 or 894 of RPD 800 or 855. As described herein, these food products can include various perishable and/or non-perishable food products. In the preferred embodiments, as shown in FIGS. 8A-8D, various respiring fresh produce can be located within the enclosures. The BSR 802 or 870 connects with the storage containers 820 and 860 and covers the enclosure 840 and 894. The BSR 802 or 870 can be peeled away from the container 820 or 860 thereby exposing enclosure 840 or 894. This allows access to the enclosure 840 or 894 and any items therein, such as food product 802 or 892.

In the preferred embodiments, the plurality of atmospheric control attributes 850 and 890 provides the breathable utility of the exemplary resealable packaging devices, including the breathable, resealable base films, and breathability for the interior atmosphere of the enclosures, such as enclosures 840 and 894. As such, the atmospheric control attributes promote the optimization of the interior atmosphere of the enclosure and the quality protection of the food product therein, by affecting the respiring and gas sensitive food product that can be stored therein. The effects that may be provided by the current invention can promote the optimization of various internal atmospheric conditions, including one or combination of $O_2$, $CO_2$, $C_2H_4$ and $H_2O$ vapor concentrations, in the enclosures within which a food product can be located. As described herein, this optimization of enclosure atmospheric conditions for food product located therein can include, without limitation, the establishment, modulation and/or maintenance of various amounts, ranges of amounts, concentrations, ratios and the like, of the presence of various gases, moisture content, chemical and such other atmospheric factors as may be contemplated as present in the internal atmosphere of the enclosure.

It is contemplated that any one or combination of the layers of exemplary BSR 802 and 870, or for any other exemplary embodiments of the current invention, can be constructed of various materials and printed on and include various indicators, designs and/or include a label. In the preferred embodiments, the material used for the BSR 802 and 870 and storage container 820 and 860 are polymeric that have at least one polymer common in their composition to aid in creating a weld seal. As described herein, alternative materials, including composite materials, may be used for and in the construction of the BSR and/or storage container of an RPD. It is also contemplated that the materials used for the BSR film can be different than that used for a storage container. For instance, container 820 or 860 can be formed from materials that are more rigid and less breathable than the materials used for the BSR 802 or 870 and/or vice versa. Various alternatives as may be contemplated by those skilled in the art can be employed without departing from the scope and spirit of the current invention.

The printing techniques can include surface printing, reverse printing and such other techniques as may be contemplated by those skilled in the art. The printing may take place on either side of a layer, more preferably on the side of a layer that faces away from the enclosure or towards the environment outside the internal environment provided by the BSR film and/or RPD of the current invention. The printing can cover an amount of the surface area of a layer, such amount can vary from all to a small percentage (>0.1%) of the total surface area of the first layer. It is contemplated that the current invention may not include any printing or may include any amount of printing. The printing does or does not, may or may not impact upon any of the capabilities provided by the current invention.

The exemplary BSR 802 and 870 can include an adhesive second layer 830 and 880 that comprises a pressure sensitive adhesive and provides a material thickness of 0.11 mil. Alternative adhesives and thicknesses are contemplated for use by the current invention. It is contemplated that the adhesive layer(s) of any exemplary BSR film and/or RPD embodiments can be constructed having a material thickness ranging from 0.01 to 3 mil, more preferably from 0.1 to 1 mil. The adhesive layer contemplated for use by embodiments of the current invention can be formed utilizing various adhesives and/or compounds including, without limitation, heat sensitive adhesive(s), pressure sensitive adhesive(s) and the like, as may be contemplated. Still further, the adhesive layer can be formed using adhesives with various properties and/or characteristics, such as strong and/or weak adhesive characteristics and the like. The structure of any of the exemplary embodiments may include one or more adhesive layers having various physical characteristics including, without limitation, the thickness of the adhesive materials used in constructing the layer(s).

The adhesive second layers of the current RPD embodiments can have a total adhesive (TA), as measured in weight/unit area ($g/m^2$), of 10.17 $g/m^2$. Given the identified specifications above for the adhesive layers that may comprise various exemplary embodiments of the current invention, it is contemplated that the adhesive layers may have a total adhesive content (TA), as measured in weight/unit ($g/m^2$), ranging from 1 to 100 $g/m^2$ and more preferably from 5 to 70 $g/m^2$. It is further contemplated that the adhesive layer can provide a moisture control feature and/or factor that impacts upon the water vapor content within the resealable packaging device. In the current embodiment, this comprises the use of water impermeable or partially water permeable PSAs to provide a moisture control feature that promotes a decrease in the water vapor content present within the interior atmosphere provided for food product stored within the enclosure of the resealable packaging devices of the current invention. The moisture control feature and/or factor can be established within the chemical composition of the adhesive e for use in embodiments of the current invention. It is contemplated that the current invention can employ the use of one or more desiccants or other moisture adsorption technologies.

The use of atmospheric control attributes and inherent gas transmission properties of the materials can provide the resealable packaging device embodiment a total Moisture Vapor Transmission Rate (MVTR) of 0.1 to 165 g/100 sq. in/day. This total MVTR control provided by the current invention promotes desirable atmospheric conditions within the resealable packaging device and thereby provides all the advantages of the current invention. These advantages include the promotion of desirable marketable characteristics, significantly reduced deterioration for longer periods of time and prolonged shelf-life for the food product. Packaging devices that lack the MTVR controls of the current invention can fail to provide any of the advantages of the current invention and thereby the food product quality can be significantly deteriorated, the observation and/or presence of undesirable marketable characteristics can be seen earlier and may be more pronounced and shelf-life can be significantly reduced. All these failures can have a significantly negative impact upon the marketable characteristics and, therefore, potential commercial success for any packaged food product and, as such, may have a significant negative impact upon the choices and quality provided to consumers of food products.

The various layers utilized in forming exemplary BSR and/or RPD embodiments can be constructed having a material thickness ranging from 0.5 to 5 mil, more preferably between 0.5 and 2.5 mil. Alternative thicknesses for non-adhesive and/or peelable layers are contemplated for use by the current invention. Given the identified specifications for RPD 800 and 855, the total thickness for the BSR 802 and 870 can be 2.25-2.35 mil. It is contemplated that the RF may have a total height or thickness ranging from 1 to 8 mil or other alternative ranges of height or thickness as contemplated by those skilled in the art.

Figure 9A:
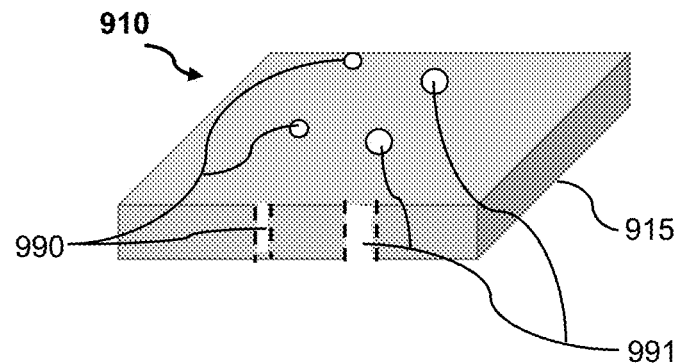
FIG. 9A is an illustration of a resealable film structure comprising a single-layer resealable film structure with a plurality of primary atmospheric control attributes and a plurality of secondary atmospheric control attributes in accordance with an exemplary embodiment of the present invention.
Figure 9B:
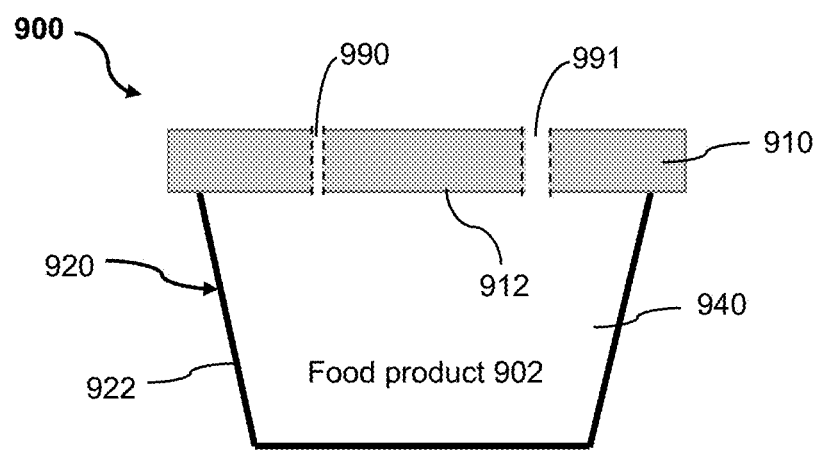
FIG. 9B is an illustration of the resealable film structure shown in FIG. 9A connected with a storage container forming a resealable packaging device including an enclosure within which food product can be located, wherein an interior environment is in communication with an exterior environment via the atmospheric control attribute(s) and can be accessed via the opening in accordance with an exemplary embodiment of the current invention.
Figure 9C:
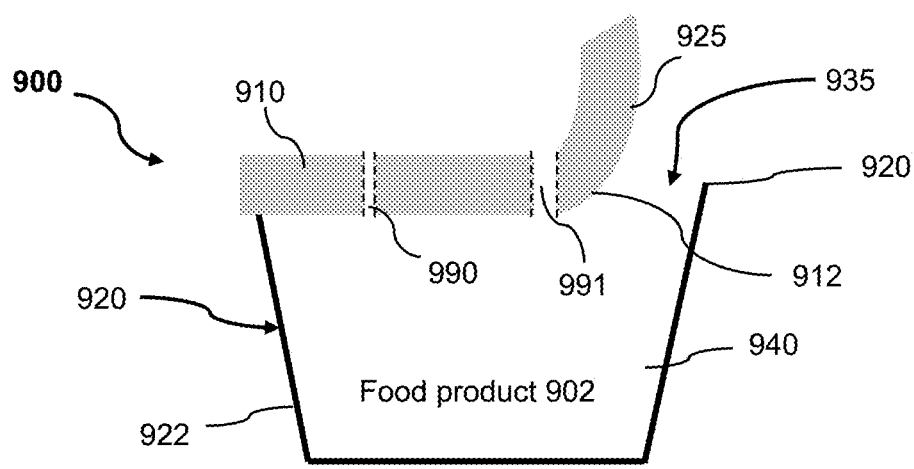
FIG. 9C is an illustration of the resealable film structure shown in FIGS. 9A and 9B partially peeled away from its connection with the storage container forming the resealable packaging device thereby exposing an opening and providing access to the enclosure in accordance with an exemplary embodiment of the current invention.

In the preferred embodiment shown in FIG. 9A-9C, an RPD 900 having a resealable base film (BSR) 910 connected to a storage container 920, thereby defining an enclosure 940, is provided. The composition, construction, characteristics and/or functional capabilities of BSR 910 can be similar to the single layer structure of BSR 760 or a 5 layered structure as BSR 802 as described previously. Thus, it is understood that description provided for BSR 760 and/or 802 can be applicable to BSR 910 as contemplated by those skilled in the art without departing from the scope and spirit of the current invention. BSR 910 is formed in a desired shape for operationally connecting with variously configured containers to provide various resealable packaging devices. Further to aid with the peeling of the peelable BSR 910 and to expose an opening and enclosure of a container, BSR 910 can include a small tab or flap that extends out from the container 920. The tab or flap is generally located in a position about the perimeter of BSR 910. Pulling on BSR 910, including without limitation, pulling the tab or flap, can result in the separation of the BSR 910 from container 920 can be promoted and/or provided. When BSR 910 is peeled away it exposes the opening 935 and enclosure 940 containing the food product 902 and grants access to the inner enclosure 940.

The primary atmospheric control attribute(s) 990 and secondary atmospheric control attribute(s) 991 promotes the optimization of the interior atmosphere of the enclosure 940 and the quality protection of the food product packaged therein, by affecting the respiring and gas sensitive food product packaged therein. The affects that may be provided by the current invention can promote the optimization of the various internal atmospheric conditions, including one or combination of $O_2$, $CO_2$, $C_2H_4$ and $H_2O$ vapor concentrations, in the enclosure within which a food product is located. As described herein, this optimization of enclosure atmospheric conditions for food product located therein can include, without limitation, the establishment, modulation and/or maintenance of various amounts, ranges of amounts, concentrations, ratios and the like, of the presence of various gases, moisture content, chemical and such other atmospheric factors as may be contemplated as present in the internal atmosphere of the enclosure.

In the preferred embodiment the BSR 910, includes a plurality of primary atmospheric attributes 990. The plurality of primary atmospheric attributes is provided as three perforations per unit package, wherein each perforation has a diameter of six hundred microns (600 μm) to 800 microns (800 μm). This configuration of the atmospheric control attributes provides an open area of $8.49 \times 10^{-7}$ to $1.91 \times 10^{-6}$ $m^2$ for the preferred embodiment. The configuration, location, number, size, density, open area and the like of the primary atmospheric control attribute(s) located in an exemplary BSR 910 can vary to accommodate varying configurations for various food products without departing from the scope and spirit of the current invention. It is contemplated that any of the various configurations for the perforation technology that has been described herein may be employed for the current embodiment.

It is contemplated for the current preferred embodiment that it include micro-perforations with diameter sizes of: (i) 75 microns (75 μm) providing a per perforation open area of $4.415625 \times 10^{-9}$ $m^2$; (ii) 90 microns (90 μm) providing a per perforation open area of $6.3585 \times 10^{-9}$ $m^2$; (iii) 100 microns (100 μm) providing a per perforation open area of $7.85 \times 10^{-9}$ $m^2$; (iv) 120 microns (120 μm) providing a per perforation open area of $1 \times 10^{-8}$ $m^2$; (v) 130 microns (130 μm) providing a per perforation open area of $1 \times 10^{-8}$ $m^2$; (vi) 150 microns (150 μm) providing a per perforation open area of $2 \times 10^{-8}$ $m^2$; (vii) 240 microns (240 μm) providing a per perforation open area of $5 \times 10^{-8}$ $m^2$; or (viii) such other sizes and per perforation open area as may provide the atmospheric promotional advantages. It is contemplated for exemplary embodiments, BSR per unit package and/or RPD, of the current invention that the total open area provided by the atmospheric control attributes may range generally from $1.5 \times 10^{-11}$ $m^2$ to $1.5 \times 10^{-4}$ $m^2$.

In the exemplary embodiment the BSR 910 includes a plurality of secondary atmospheric attributes 991. Each of the secondary atmospheric attributes can be provided as a macro-perforation having a size of 1 to 12 millimeters in diameter (mm), preferably, 3 to 6.9 mm in diameter. It is to be understood that the exemplary embodiment(s), including the plurality of secondary atmospheric attributes 991, is suited for respiring moisture sensitive products such as tomato, blueberry, strawberry, grapes, cherry and alike wherein, the removal of moisture through macro-perforations is key to preventing an undesirable color change in the pressure sensitive adhesive layer of RPD (PSA turns white in color with moisture and oxygen exposure).

In the preferred embodiments, the plurality of primary and secondary atmospheric control attributes provides the breathable utility of the resealable base film and resealable packaging device, and as a result the breathability for the interior atmosphere of inner enclosure. As such, the atmospheric control attributes promotes the optimization of the interior atmosphere of the inner enclosure and the quality protection of the food product herein, by affecting the respiring and gas sensitive food product. The effects that may be provided by the current invention can promote the optimization of various internal atmospheric conditions, including one or combination of $O_2$, $CO_2$, $C_2H_4$ and $H_2O$ vapor concentrations, in the inner enclosure within which food product is located. As described herein, this optimization of enclosure atmospheric conditions for food product located therein can include, without limitation, the establishment, modulation and/or maintenance of various amounts, ranges of amounts, concentrations, ratios and the like, of various gases, moisture content, chemical and such other atmospheric factors as may be and may be contemplated as present in the internal atmosphere of the inner enclosure. In the preferred embodiments, the plurality of atmospheric control attributes provides the breathable utility of the resealable base film and resealable packaging device and as a result the breathability for the interior atmosphere of inner enclosure. As such, the atmospheric control attributes promotes the optimization of the interior atmosphere of the inner enclosure and the quality protection of the food product therein, by affecting the respiring and gas sensitive food product. The effects that may be provided by the current invention can promote the optimization of various internal atmospheric conditions, including one or combination of $O_2$, $CO_2$, $C_2H_4$ and $H_2O$ vapor concentrations, in the inner enclosure within which food product is located. As described herein, this optimization of enclosure atmospheric conditions for food product located therein can include, without limitation, the establishment, modulation and/or maintenance of various amounts, ranges of amounts, concentrations, ratios and the like, of various gases, moisture content, chemical and such other atmospheric factors as may be and may be contemplated as present in the internal atmosphere of the inner enclosure.

In the current embodiment, the BSR 910 and RPD 900 is shown including both the plurality of primary and secondary atmospheric attributes. It is contemplated that, in accordance with what has been described for the current invention, the number of primary and/or secondary atmospheric control attributes can vary significantly, wherein the number of primary atmospheric control attributes can range from one (1) to one hundred (100) or more, and the number of second atmospheric control attributes can range from one (1) to fifty (50) or more. The volumetric and/or dimensional configurations for any of the individual primary and/or secondary atmospheric control attributes can be similar or may vary significantly in accordance with what has been described for the current invention. The dimensional characteristics for the BSR 910 can range from approximately up to 20 inches wide, up to 40 inches wide or higher than 40 inches wide as may be contemplated or necessary to employ with various dimensional characteristics of a storage container. The roll or lid stock length is generally 900 to 2000 feet long. Such various configurations contemplated for the current embodiment can provide similar functional capabilities as have been described herein throughout for the current invention.

Given the identified specifications for resealable packaging device 900, the total thickness for the resealable base film 910 is 2.65-2.75 mil. It is contemplated that the base film 910 may have a total height or thickness ranging from one (1 mil) to eight (8 mil) or other alternative ranges of height or thickness as contemplated by those skilled in the art. In contemplated and/or alternative embodiments, the resealable base film can have a total thickness ranging from 2.25 mil to 2.35 mil. In additional contemplated embodiments, the resealable base film total thickness can range from 4.00 mil to 4.25 mil. In contemplated embodiments where various layers are utilized in forming exemplary resealable base films and/or containers these layers can be constructed having a material thickness ranging from 0.5 to 5.0 mil, more preferably between 0.5 and 2.5 mil. Alternative thicknesses for layers are contemplated for use by the current invention. It is contemplated that the base film and/or container as indicated for FIGS. 9A-9C and any other exemplary or contemplated embodiments, can be constructed of various materials and printed on and include various indicators, designs and/or include a label. In the preferred embodiment, the material used for the BSR 910 and container 920 are polymeric that have at least one polymer common in their composition. As described herein, alternative materials, including composite materials, may be used for and in the construction of the BSR film 910 and/or container 920 of the resealable packaging device 900. It is also contemplated that the materials used for the BSR 910 can be different than that used for container 920. For instance, the container 920 can be formed from materials that are more rigid and less breathable than the materials used for the BSR 910 and/or vice versa. Various alternatives as may be contemplated by those skilled in the art can be employed without departing from the scope and spirit of the current invention.

The resealable packaging device 900 is designed to help promote the optimization of various internal atmospheric conditions, including one or combination of $O_2$, $CO_2$, $C_2H_4$ and $H_2O$ vapor concentrations, in the enclosure 940 within which a food product 902 is located even after the peelable BSR film 910 is peeled and resealed to container 920. In the closed configuration the atmospheric control attributes 990 and 991 promote the optimization of the interior atmosphere and provide the interaction between the interior atmosphere of inner enclosure 940 and an exterior atmosphere outside the closed resealable packaging device 900. When the BSR film 910 is peeled back the opening 935 and inner enclosure 940 is exposed or open to the exterior atmosphere. It is understood that atmospheric control attributes 990 and 991, when the BSR film 910 is re-positioned over enclosure 940 after exposure to the exterior atmosphere, will interact with the interior atmosphere of the enclosure 940 and promote its optimization. It is contemplated that the atmospheric control attributes provide their synergistic interaction with any interior atmospheric conditions found, even after the exposure of an enclosure and any food product stored therein to an exterior atmosphere, and, thereby, promote the optimization of the interior atmosphere throughout the use of the BSR film 910 and/or resealable packaging device 900.

The use of atmospheric control attributes and inherent gas transmission properties of the materials can provide the resealable packaging device 900 a total Moisture Vapor Transmission Rate (MVTR) of 0.1 to 165 g/100 sq. in/day. This total MVTR control provided by the current invention promotes desirable atmospheric conditions within the resealable packaging device and thereby provides all the advantages of the current invention. These advantages include the promotion of desirable marketable characteristics, significantly reduced deterioration for longer periods of time and prolonged shelf-life for the food product. Packaging devices that lack the MTVR controls of the current invention can fail to provide any of the advantages of the current invention and thereby the food product quality can be significantly deteriorated, the observation and/or presence of undesirable marketable characteristics can be seen earlier and may be more pronounced and shelf-life can be significantly reduced. All these failures can have a significantly negative impact upon the marketable characteristics and, therefore, potential commercial success for any packaged food product and, as such, may have a significant negative impact upon the choices and quality provided to consumers of food products.

Figure 14:
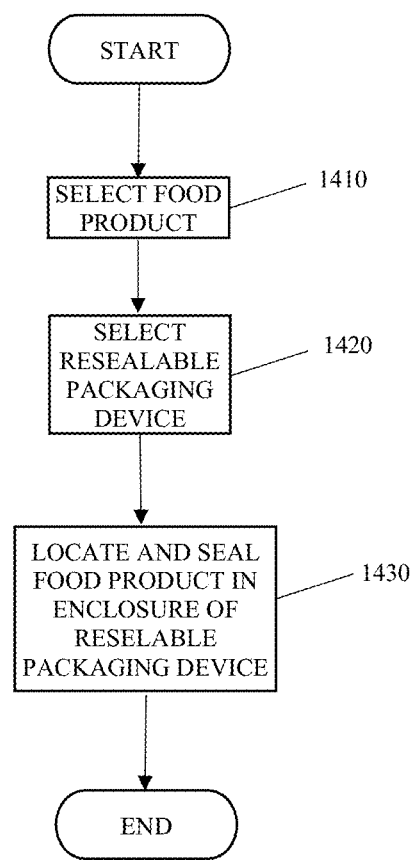
FIG. 14 is a block diagram illustrating a method for prolonging the shelf-life of a food product within a resealable packaging device in accordance with an exemplary embodiment of the current invention.

Referring now to FIG. 14 a method 1400 of prolonging the shelf-life of a perishable food product is shown. In a first step 1410 a perishable food product is selected. The perishable food product may be fresh produce, such as fruit(s) and/or vegetables. After selecting the food product, a resealable packaging device including an atmospheric control attribute configuration providing a total open area as described in reference to the resealable packaging device (RPD) and base film (BSR/RF) embodiments shown in FIGS. 7-9 is selected in step 1420. The resealable packaging device and total open area may be selected based on the gas transmission properties of the material used to construct the resealable packaging device and/or the ability of the atmospheric control attributes to provide a desired transmission rate for $O_2$ and/or $CO_2$ and thereby promote the optimization of the interior atmosphere within which the food product will be stored. Additionally, the respiration rate, size, weight, and dimensions of the food product may be a factor in selecting a resealable packaging device of the current invention. The optimized internal atmosphere promoted by the current invention provides a quality preservation functionality promoting the maintenance of the quality of the food product and extends the shelf-life of the food product during the life-cycle of the food product within the resealable packaging device. After selecting the resealable packaging device, in step 1430, the perishable food product is placed within the enclosure of the resealable packaging device and is sealed about the food product. The seal is provided by the exemplary embodiment of the Base film/BSR/RF employed with the resealable packaging device and provides a releasable and resealable connection.

Additional steps contemplated for the current invention include selecting the resealable packaging device and the total open area based at least in part on the ability of the materials, including adhesive(s), and/or atmospheric control attributes to provide a desired transmission rate for water vapor. The method further contemplates the step of selecting a resealable packaging device based on a combination of various atmospheric control attributes that provides a cumulative total open area.

Additional method embodiments for the current invention can comprise methods of manufacturing RFs and/or resealable packaging devices. These methods can include a step of selecting one or more materials to be used in constructing the films, components or layers of the exemplary construct. The material selection can further include the step of determining a desired permeability characteristic for the material. The method can further include the step of determining the total open area to be provided by the construct. The method further includes the step(s) of determining the type, number and location of atmospheric control attribute or combination of such attributes to be included in providing the total open area.

EXAMPLES

The following examples provide a comparison of the micro-perforation packaging devices of the present invention and conventional (non-perforated) packaging devices. Comparison of performance characteristics of the packaging devices and the food products contained within are detailed for quality and shelf-life.

While broccoli, various leafy greens, carrots, pineapple and riced-cauliflower have been used as test models for this invention, the teachings of this invention may easily be extended to other food product offerings that have perishable/fresh food products, such as fresh produce and/or meats, in their ingredient mixes.

The examples below are used to illustrate the benefit of exemplary embodiments of the current invention providing breathable peel reseal structures (e.g., resealable packaging devices) over non breathable peel reseal structure (control) in maintaining quality and shelf life. Further, examples also show the ability of invention to continue maintain quality even when the lid is peeled and resealed. Standard amorphous polyethylene terephthalate (APET) and poly-propylene (PP) trays with 5 or 16-ounce (oz) food product were used for the tests. Table top tray sealing machine ER-900 with appropriate collar was used to seal 5 oz, while hot iron press was used to seal the 16 oz trays. In both cases sealing was done airtight to ensure no leak from the seal.

Example 1a compares the shelf life of broccoli florets that were packed in APET trays and sealed with non-breathable peel reseal and breathable peel reseal. One pound of broccoli was packed in control and in a resealable packaging device of the current invention and the samples were held at 5° C. and 22° C. Standard APET tray sizes were used for the test. The resealable packaging device included twenty-five (25) micro-perforations of one hundred twenty microns (120 μm) in diameter. Assuming the opening of the micro-perforation is circular, the surface area for each opening is equal to $\pi r^2$, where $\pi$ is equal to 3.14 and r is equal to $(60\times10^{-6}$ m) and therefore $r^2$ is equal to $3.6\times10^{-9}$ m$^2$. Thus, each opening provides $3.14\times(3.6\times10^{-9}$ m$^2)$ which is equal to $1\times10^{-8}$ m$^2$ of open area. Therefore, the open area provided by the twenty-five micro-perforations may be substantially equal to $25\times(1\times10^{-8}$ m$^2)$ which equals $2.8\times10^{-7}$ m$^2$. The position of the micro-perforations was designed to allow continued functionality even when the resealable packaging device is opened and resealed.

The use of atmospheric control attributes and inherent gas transmission properties of the materials can provide the resealable packaging device embodiment a total Moisture Vapor Transmission Rate (MVTR) of 0.68 g/100 sq. in/day. This MVTR control provided by the current invention, as shown in the table below, promotes desirable atmospheric conditions within the resealable packaging device and thereby provides all the advantages of the current invention. These advantages include the promotion of desirable marketable characteristics, significantly reduced deterioration for longer periods of time and prolonged shelf-life for the food product. The control device, with the non-breathable peel reseal film provides a Moisture Vapor Transmission Rate (MTVR) of 0.52 g/100 sq. in/day. As shown in the table below, this lack of MTVR control fails to provide any of the advantages of the current invention and thereby the food product quality is significantly deteriorated, the observation and/or presence of undesirable marketable characteristics is seen earlier and may be more pronounced and shelf-life is significantly reduced.

The results are shown in table below:

|  | Storage at 5° C. | Storage at 22° C. |
| --- | --- | --- |
| Control | Bloating was observed after 2 days. On opening strong off-flavor noticed indicating fermentation. | Bloating was observed within 24 hours. On opening strong off-flavor noticed indicating fermentation. |
| Invention | Florets remained green and quality maintained for 21 days | Florets remained green and quality maintained for 6 days |

Example 1b compares the shelf life of broccoli florets that were packed in APET trays and sealed with invention. One pound of broccoli was packed in control and in a resealable packaging device of the current invention and the samples were held at 5° C. The set-up was same as example 1a. In this example, the resealable packaging device was opened on day 7 and resealed. The process was repeated every 3 days, until day 21. The control package bloated and had a strong off-odor on day 3. The resealable packaging device with broccoli maintained quality inside the package and the opening and resealing did not affect the quality of the product packed.

Example 2 compares the shelf lift.; of pineapple spears that were packed in APET trays and sealed with non-breathable peel reseal and breathable peel reseal. One pound of pineapple spears was packed in control and in a resealable packaging device of the current invention and the samples were held at 5° C. Standard APET tray sizes were used for the test. The resealable packaging device included four (4) micro-perforations of one hundred microns (100 μm) in diameter. Assuming the opening of the micro-perforation is circular, the surface area for each opening is equal to $\pi r^e$, where r is equal to $(50\times10^{-6}$ m$)^2$ and therefore $r^2$ is equal to $2.5\times10^{-9}$ m$^2$. Thus, each opening provides $3.14\times(2.5\times10^{-9}$ m$^2)$ which is equal to $7.85\times10^{-9}$ m$^2$ of open area. Therefore, the open area provided by the four micro-perforations may be substantially equal to $4\times(7.85\times10^{-9}$ m$^2)$ which equals $3\times10^{-8}$ m$^2$. The position of the micro-perforations was designed to allow continued functionality even when the resealable packaging device is opened and resealed.

The use of atmospheric control attributes and inherent gas transmission properties of the materials can provide the resealable packaging device embodiment a total Moisture Vapor Transmission Rate (MVTR) of 0.70 g/100 sq. in/day. This MVTR control provided by the current invention, as shown in the table below, promotes desirable atmospheric conditions within the resealable packaging device and thereby provides all the advantages of the current invention. These advantages include the promotion of desirable marketable characteristics, significantly reduced deterioration for longer periods of time and prolonged shelf-life for the food product. The control device, with the non-breathable peel reseal film provides a Moisture Vapor Transmission Rate (MTVR) of 0.52 g/100 sq. in/day. As shown in the table below, this lack of MTVR control fails to provide any of the advantages of the current invention and thereby the food product quality is significantly deteriorated, the observation and/or presence of undesirable marketable characteristics is seen earlier and may be more pronounced and shelf-life is significantly reduced.

The results are shown in table below:

| | Storage at 5° C. |
|---|---|
| Control | Bloating was observed after 3 days. On opening strong off-flavor and tissue breakdown noticed indicating fermentation. |
| Invention | Color was maintained and the pineapple spears had an acceptable texture for 14 days |

Opening and resealing of the resealable packaging device on days 7, 10 and 13 did not affect the quality of the product.

Example 3a compares the shelf life of spinach that ware packed in APET trays and sealed with non-breathable peel reseal and breathable peel reseal. 5 oz of spinach was packed in control and m a resealable packaging device of the current invention and the samples were held at 5° C. and 22° C. Standard APET tray sizes were used for the test. The reseal able packaging device included twelve (12) micro-perforations of one hundred fifty microns (150 μm) in diameter. Assuming the opening of the micro-perforation is circular, the surface area for each opening is equal to $\pi r^2$, where r is equal to $(75 \times 10^{-6} \text{ m})^2$ and therefore $r^2$ is equal to $5.625 \times 10^{-9}$ $m^2$. Thus, each opening provides $3.14 \times (5.625 \times 10^{-9} \text{ m}^2)$ which is equal to $2 \times 10^{-8}$ $m^2$ of open area. Therefore, the open area provided by the twelve micro-perforations may be substantially equal to $12 \times (2 \times 10^{-8} \text{ m}^2)$ which equals $2.1 \times 10^{-7}$ $m^2$. The position of the micro-perforations was designed to allow continued functionality even when the resealable packaging device is opened and resealed.

The use of atmospheric control attributes and inherent gas transmission properties of the materials can provide the resealable packaging device embodiment a total Moisture Vapor Transmission Rate (MVTR) of 0.64 g/100 sq. in/day. This MVTR control provided by the current invention, as shown in the table below, promotes desirable atmospheric conditions within the resealable packaging device and thereby provides all the advantages of the current invention. These advantages include the promotion of desirable marketable characteristics, significantly reduced deterioration for longer periods of time and prolonged shelf-life for the food product. The control device, with the non-breathable peel reseal film provides a Moisture Vapor Transmission Rate (MTVR) of 0.52 g/100 sq. in/day. As shown in the table below, this lack of MTVR control fails to provide any of the advantages of the current invention and thereby the food product quality is significantly deteriorated, the observation and/or presence of undesirable marketable characteristics is seen earlier and may be more pronounced and shelf-life is significantly reduced.

The results are shown in table below:

| | Storage at 5° C. | Storage at 22° C. |
|---|---|---|
| Control | Bloating was observed after 2 days. On opening strong off-flavor noticed indicating fermentation. Leaves softened and leak observed. | Bloating was observed within 18 hours. On opening strong off-flavor noticed indicating fermentation. Leaves softened and turned mushy. |
| Invention | Leaves remained green and quality maintained for 21 days. | Leaves remained green and quality maintained for 6 days |

Example 3b compares the shelf life of spinach that were packed in APET trays and sealed with invention. 5 oz of spinach was packed in control and within a resealable packaging device of the current invention and the samples were held at 5° C. The set-up was same as example 1a. In this example, the resealable packaging device was opened on day 7 and resealed. The process was repeated every 3 days, until day 21. The control package bloated and had a strong off-odor by the end of day 2. The spinach M the exemplary embodiment maintained quality inside the package and the opening, and resealing did not affect the quality of the product packed.

Example 4 compares the shelf life of strawberries that were packed in APET trays and sealed with lion-breathable peel reseal and breathable peel reseal. 5 oz of strawberries was packed in control and within a resealable packaging device of the current invention and the samples were held at 5° C. Standard APET tray sizes were used fix the test. The resealable packaging device included four (4) micro-perforations of one hundred microns (100 μm) in diameter. Assuming the opening of the micro-perforation is circular, the surface area for each opening is equal to $\pi r^2$, where r is equal to $(50 \times 10^{-6} \text{ m})^2$ and therefore $r^2$ is equal to $2.5 \times 10^{-9}$ $m^2$. Thus, each opening provides $3.14 \times (2.5 \times 10^{-9} \text{ m}^2)$ which is equal to $7.85 \times 10^{-9}$ $m^2$ of open area. Therefore, the open area provided by the four micro-perforations may be substantially equal to $4 \times (7.85 \times 10^{-9} \text{ m}^2)$ which equals $3 \times 10^{-8}$ $m^2$. The position of the micro-perforations was designed to allow continued functionality even when the resealable packaging device is opened and resealed.

The use of atmospheric control attributes and inherent gas transmission properties of the materials can provide the resealable packaging device embodiment a total Moisture Vapor Transmission Rate (MVTR) of 0.70 g/100 sq. in/day. This MVTR control provided by the current invention, as shown in the table below, promotes desirable atmospheric conditions within the resealable packaging device and thereby provides all the advantages of the current invention. These advantages include the promotion of desirable marketable characteristics, significantly reduced deterioration for longer periods of time and prolonged shelf-life for the food product. The control device, with the non-breathable peel reseal film provides a Moisture Vapor Transmission Rate (MTVR) of 0.52 g/100 sq. in/day. As shown in the table below, this lack of MTVR control fails to provide any of the advantages of the current invention and thereby the food product quality is significantly deteriorated, the observation and/or presence of undesirable marketable characteristics is seen earlier and may be more pronounced and shelf-life is significantly reduced.

The results are shown in table below:

| | Storage at 5° C. |
|---|---|
| Control | Bloating was observed after 4 days. On opening the fruit was soft and started to leak juice |
| Invention | Color was maintained and the strawberries had an acceptable texture for 14 days |

Opening and resealing of the resealable packaging device on days 7, 10 and 13 did not affect the quality of the product.

Example 5a compares the shelf life of riced veggie mix, containing; cauliflower, broccoli and carrot, that were packed in APET trays and sealed with non-breathable peel reseal and breathable peel reseal. 5 oz of the raced mix was packed in control and within a resealable packaging device of the current invention and the samples were held at 5° C. and 22° C. Standard. APET tray sites were used for the test. The resealable packaging device included eight (8) micro-perforations of one hundred microns (100 µm) in diameter. Assuming the opening of the micro-perforation is circular, the surface area for each opening is equal to $\pi r^2$, where r is equal to $(50\times10^{-6} \text{ m})^2$ and therefore $r^2$ is equal to $2.5\times10^{-9}$ m$^2$. Thus, each opening provides $3.14\times(2.5\times10^{-9} \text{ m}^2)$ which is equal to $7.85\times10^{-9}$ m$^2$ of open area. Therefore, the open area provided by the eight micro-perforations may be substantially equal to $8\times(7.85\times10^{-9} \text{ m}^2)$ which equals $6\times10^{-8}$ m$^2$. The position of the micro-perforations was designed to allow continued functionality even when the resealable packaging device is opened and resealed.

The use of atmospheric control attributes and inherent gas transmission properties of the materials can provide the resealable packaging device embodiment a total Moisture Vapor Transmission Rate (MVTR) of 0.56 g/100 sq. in/day. This MVTR control provided by the current invention, as shown in the table below, promotes desirable atmospheric conditions within the resealable packaging device and thereby provides all the advantages of the current invention. These advantages include the promotion of desirable marketable characteristics, significantly reduced deterioration for longer periods of time and prolonged shelf-life for the food product. The control device, with the non-breathable peel reseal film provides a Moisture Vapor Transmission Rate (MTVR) of 0.52 g/100 sq. in/day. As shown in the table below, this lack of MTVR control fails to provide any of the advantages of the current invention and thereby the food product quality is significantly deteriorated, the observation and/or presence of undesirable marketable characteristics is seen earlier and may be more pronounced and shelf-life is significantly reduced.

The results are shown in table below:

|  | Storage at 5° C. | Storage at 22° C. |
| --- | --- | --- |
| Control | Bloating was observed after 2 days. On opening strong off-flavor noticed indicating fermentation | Bloating was observed in 24 hours. On opening strong off-flavor noticed indicating fermentation. |
| Invention | Quality maintained for 21 days | Quality was acceptable for 6 days |

Example 5b compares the shelf life of riced veggie mix that were packed in APET trays and sealed with invention. 5 oz of riced veggie mix was packed in control and within the resealable packaging device of the current invention and the samples were held at 5° C. The set-up was same as example 1a. In this example, the peelable structure was opened on day 7 and resealed. The process was repeated every 3 days, until day 21. The control package bloated and had a strong off-odor by the end of day 2. The riced veggies within the resealable packaging device maintained quality inside the package and the opening and resealing did not affect the quality of the product packed.

Example 6a compares the shelf life of carrot spirals that were packed in APET trays and sealed with non-breathable peel reseal and breathable peel reseal. 5 oz of the carrot spirals was packed in control and within a resealable packaging device of the current invention and the samples were held at 5° C. and 22° C. Standard APET tray sizes were used for the test. The resealable packaging device included nine (9) micro-perforations of one hundred microns (100 µm) in diameter. Assuming the opening of the micro-perforation is circular, the surface area for each opening is equal to $\pi r^e$, where r is equal to $(50\times10^{-6} \text{ m})^2$ therefore $r^2$ is equal to $2.5\times10^{-9}$ m$^2$. Thus, each opening provides $3.14\times2.5\times10^{-9}$ m$^2$ which is equal to $7.85\times10^{-9}$ m$^2$ of open area. Therefore, the open area provided by the nine micro-perforations may be substantially equal to $9\times(7.85\times10^{-9} \text{ m}^2)$ which equals $7\times10^{-8}$ m$^2$. The position of the micro-perforations was designed to allow continued functionality even when the resealable packaging device is opened and resealed.

The use of atmospheric control attributes and inherent gas transmission properties of the materials can provide the resealable packaging device embodiment a total Moisture Vapor Transmission Rate (MVTR) of 0.56 g/100 sq. in/day. This MVTR control provided by the current invention, as shown in the table below, promotes desirable atmospheric conditions within the resealable packaging device and thereby provides all the advantages of the current invention. These advantages include the promotion of desirable marketable characteristics, significantly reduced deterioration for longer periods of time and prolonged shelf-life for the food product. The control device, with the non-breathable peel reseal film provides a Moisture Vapor Transmission Rate (MTVR) of 0.52 g/100 sq. in/day. As shown in the table below, this lack of MTVR control fails to provide any of the advantages of the current invention and thereby the food product quality is significantly deteriorated, the observation and/or presence of undesirable marketable characteristics is seen earlier and may be more pronounced and shelf-life is significantly reduced.

The results are shown in table below:

|  | Storage at 5° C. | Storage at 22° C. |
| --- | --- | --- |
| Control | Bloating was observed after 2 days. On opening strong off-flavor noticed indicating fermentation | Bloating was observed in 24 hours. On opening strong off-flavor noticed indicating fermentation. |
| Invention | Quality maintained for 21 days | Quality was acceptable for 6 days |

Example 6b compares the shelf life of carrot spirals that were packed in APET trays and sealed within a resealable packaging device of the current invention. 5 oz of carrot spirals was packed in control and the resealable packaging device and the samples were held at 5° C. The set-up was same as example 1a. In this example, the resealable packaging device was opened on day 7 and resealed. The process was repeated every 3 days, until day 21. The control package bloated and had a strong off-odor by day 3. The carrot spirals m the resealable packaging device maintained quality inside the package and the opening and resealing did not affect the quality of the product packed.

Example 7a compares the shelf life of red kale that were packed in APET trays and sealed with non-breathable peel reseal and breathable peel reseal. 5 oz of red kale was packed in control and in the resealable packaging device of the current invention and the samples were held at 5° C. and 22° C. Standard APET tray sizes were used for the test. The resealable packaging device included fifteen (15) micro-perforations of one hundred microns (100 µm) in diameter. Assuming the opening of the micro-perforation is circular, the surface area for each opening is equal to $\pi r^2$, where r is equal to $(50\times10^{-6} \text{ m})^2$ therefore $r^2$ is equal to $2.5\times10^{-9}$ m$^2$. Thus, each opening provides $3.14\times(2.5\times10^{-9} \text{ m}^2)$ which is equal to $7.85\times10^{-9}$ m$^2$ of open area. Therefore, the open area provided by the fifteen micro-perforations may be substantially equal to $15\times(7.85\times10^{-9} \text{ m}^2)$ which equals $1.2\times10^{-7}$ m$^2$. The position of the micro-perforations was designed to allow continued functionality even when the resealable packaging device is opened and resealed.

The use of atmospheric control attributes and inherent gas transmission properties of the materials can provide the resealable packaging device embodiment a total Moisture Vapor Transmission Rate (MVTR) of 0.59 g/100 sq. in/day. This MVTR control provided by the current invention, as shown in the table below, promotes desirable atmospheric conditions within the resealable packaging device and thereby provides all the advantages of the current invention. These advantages include the promotion of desirable marketable characteristics, significantly reduced deterioration for longer periods of time and prolonged shelf-life for the food product. The control device, with the non-breathable peel reseal film provides a Moisture Vapor Transmission Rate (MTVR) of 0.52 g/100 sq. in/day. As shown in the table below, this lack of MTVR control fails to provide any of the advantages of the current invention and thereby the food product quality is significantly deteriorated, the observation and/or presence of undesirable marketable characteristics is seen earlier and may be more pronounced and shelf-life is significantly reduced.

The results are shown in table below:

|  | Storage at 5° C. | Storage at 22° C. |
| --- | --- | --- |
| Control | Bloating was observed after 3 days. On opening strong off-flavor noticed indicating fermentation. | Bloating was observed after 24 hours. On opening strong off-flavor noticed indicating fermentation. Leaves softened and turned mushy. |
| Invention | Leaves remained green and quality maintained for 21 days. | Leaves remained green/red hue and quality maintained for 10 days |

Example 7b compares the shelf life of red kale that were packed in APET trays and sealed within a resealable packaging device of the current invention. 5 oz of red kale was packed in control and the resealable packaging device and the samples were held at 5° C. The set-up was same as example 1a. In this example, the resealable packaging device was opened on day 7 and resealed. The process was repeated every 3 days, until day 21. The control package bloated and had a strong off-odor by the end of day 3. The red kale in the resealable packaging device maintained quality inside the package and the opening and resealing did not affect the quality of the product packed.

Example 8 compares the shelf life of Romaine heart lettuce that were packed in APET trays and sealed with non-breathable peel reseal and breathable peel reseal. 5 oz of Romaine heart lettuce was packed in control and a resealable packaging device and the samples were held at 5° C. Standard. APET tray sizes were used for the test. The resealable packaging device included one (1) micro-perforations of ninety microns (90μ) in diameter. Assuming the opening of the micro-perforation is circular, the surface area for each opening is equal to $\pi r^2$, where r is equal to $(45 \times 10^{-6}$ m$)^2$ therefore $r^2$ is equal to $2.025 \times 10^{-9}$ m$^2$. Thus, each opening provides $3.14 \times (2.025 \times 10^{-9}$ m$^2)$ which is equal to $6.3585 \times 10^{-9}$ m$^2$ of open area. Therefore, the open area provided by the one micro-perforation may be substantially equal to $1 \times (6.3585 \times 10^{-9}$ m$^2)$ which equals $6.3585 \times 10^{-9}$ m$^2$. The position of the micro-perforations was designed to allow continued functionality even when the resealable packaging device is opened and resealed.

The use of atmospheric control attributes and inherent gas transmission properties of the materials can provide the resealable packaging device embodiment a total Moisture Vapor Transmission Rate (MVTR) of 0.52 g/100 sq. in/day. This MVTR control provided by the current invention, as shown in the table below, promotes desirable atmospheric conditions within the resealable packaging device and thereby provides all the advantages of the current invention. These advantages include the promotion of desirable marketable characteristics, significantly reduced deterioration for longer periods of time and prolonged shelf-life for the food product. The control device, with the non-breathable peel reseal film provides a Moisture Vapor Transmission Rate (MTVR) of 0.52 g/100 sq. in/day. As shown in the table below, this lack of MTVR control fails to provide any of the advantages of the current invention and thereby the food product quality is significantly deteriorated, the observation and/or presence of undesirable marketable characteristics is seen earlier and may be more pronounced and shelf-life is significantly reduced.

The results are shown in table below:

|  | Storage at 5° C. |
| --- | --- |
| Control | Bloating was observed after 6 days. On opening the leaves had a strong off odor showing anaerobiosis |
| Invention | The lettuce had a crunchy texture and good color. No issues were found for 21 days |

Opening and resealing of the resealable packaging device on days 7, 10, 13, 16, and 19 did not affect the quality of the product. The control however showed bloating on day 6 and opening and resealing of the resealable packaging device on day 7 caused severe pinking on the cut end of the lettuce hearts.

Example 9 compares the shelf life of salad mix, containing baby arugula, baby spinach, frisee and radicchio that were packed in APET trays and sealed with non-breathable peel reseal and breathable peel reseal. 5 oz of salad mix was packed in control and a resealable packaging device and the samples were held at 5° C. Standard APET tray sizes were used for the test. The resealable packaging device included ten (10) micro-perforations of one hundred and twenty microns (120 μm) in diameter. Assuming the opening of the micro-perforation is circular, the surface area for each opening is equal to $\pi r^2$, where r is equal to $(60 \times 10^{-6}$ m$)^2$ therefore $r^2$ is equal to $3.6 \times 10^{-9}$ m$^2$. Thus, each opening provides $3.14 \times (3.6 \times 10^{-9}$ m$^2)$ which is equal to $1 \times 10^{-8}$ m$^2$ of open area. Therefore, the open area provided by the ten micro-perforations may be substantially equal to $10 \times (1 \times 10^{-8}$ m$^2)$ which equals $1.1 \times 10^{-7}$ m$^2$. The position of the micro-perforations was designed to allow continued functionality even when the resealable packaging device is opened and resealed.

The use of atmospheric control attributes and inherent gas transmission properties of the materials can provide the resealable packaging device embodiment a total Moisture Vapor Transmission Rate (MVTR) of 0.58 g/100 sq. in/day. This MVTR control provided by the current invention, as shown in the table below, promotes desirable atmospheric conditions within the resealable packaging device and thereby provides all the advantages of the current invention. These advantages include the promotion of desirable marketable characteristics, significantly reduced deterioration for longer periods of time and prolonged shelf-life for the food product. The control device, with the non-breathable peel reseal film provides a Moisture Vapor Transmission Rate (MTVR) of 0.52 g/100 sq. in/day. As shown in the table below, this lack of MTVR control fails to provide any of the advantages of the current invention and thereby the food product quality is significantly deteriorated, the observation and/or presence of undesirable marketable characteristics is seen earlier and may be more pronounced and shelf-life is significantly reduced.

The results are shown in table below:

| Storage at 5° C. | |
| --- | --- |
| Control | Bloating was observed after 3 days. On opening the leaves had a strong off-odor showing anaerobiosis |
| Invention | The salad mix had a crunchy texture and good color. No issues were found for 21 days |

Opening and resealing of the resealable packaging device on days 7, 10, 13, 16, and 19 did not affect the quality of the product.

Example 10 compares the shelf life of lunchables packed in compartment trays, containing grilled chicken, cheese, salad mix and strawberries that were packed in APET trays and sealed with non-breathable peel reseal and breathable peel reseal. The lunchable was packed in control and a resealable packaging device and the samples were held at 5° C. The resealable packaging device included a total of five (5) micro-perforations of one hundred microns (100 μm) En diameter registered in specific compartments to protect the quality of the product. Assuming the opening of the micro-perforation is circular, the surface area for each opening is equal to $\pi r^2$, where r is equal to $(50 \times 10^{-6}$ m$)^2$ therefore $r^2$ is equal to $2.5 \times 10^{-9}$ m$^2$. Thus, each opening provides $3.14 \times (2.5 \times 10^{-9}$ m$^2)$ which is equal to $7.85 \times 10^{-9}$ m$^2$ of open area. Therefore, the open area provided by the five micro-perforations may be substantially equal to $5 \times (7.85 \times 10^{-9}$ m$^2)$ which equals $4 \times 10^{-8}$ m$^2$. The position of the micro-perforations was designed to allow continued functionality even when the resealable packaging device is opened and resealed.

The use of atmospheric control attributes and inherent gas transmission properties of the materials can provide the resealable packaging device embodiment a total Moisture Vapor Transmission Rate (MVTR) of 0.54 g/100 sq. in/day. This MVTR control provided by the current invention, as shown in the table below, promotes desirable atmospheric conditions within the resealable packaging device and thereby provides all the advantages of the current invention. These advantages include the promotion of desirable marketable characteristics, significantly reduced deterioration for longer periods of time and prolonged shelf-life for the food product. The control device, with the non-breathable peel reseal film provides a Moisture Vapor Transmission Rate (MTVR) of 0.52 g/100 sq. in/day. As shown in the table below, this lack of MTVR control fails to provide any of the advantages of the current invention and thereby the food product quality is significantly deteriorated, the observation and/or presence of undesirable marketable characteristics is seen earlier and may be more pronounced and shelf-life is significantly reduced.

The results are shown in table below:

| Storage at 5° C. | |
| --- | --- |
| Control | Bloating was observed after 3 days in salad mix and strawberry compartment. |
| Invention | The salad mix had a crunchy texture and good color. Strawberries maintained texture and color for 14 days |

Opening and resealing of the resealable packaging device on days 7, 10, and 13 did not affect the quality of the product.

Example 11 evaluates the feasibility of using PP trays instead of APET trays on the products tested in examples 1, 2, 5, 8, 9 and 10. The number of micro-perforations were maintained the same as the exemplary embodiments of the current invention in the examples. The results of the breathable peel reseal film constructed from 3-layer coextruded film on PP trays were consistent to the observations made with APET trays.

Figure 10:
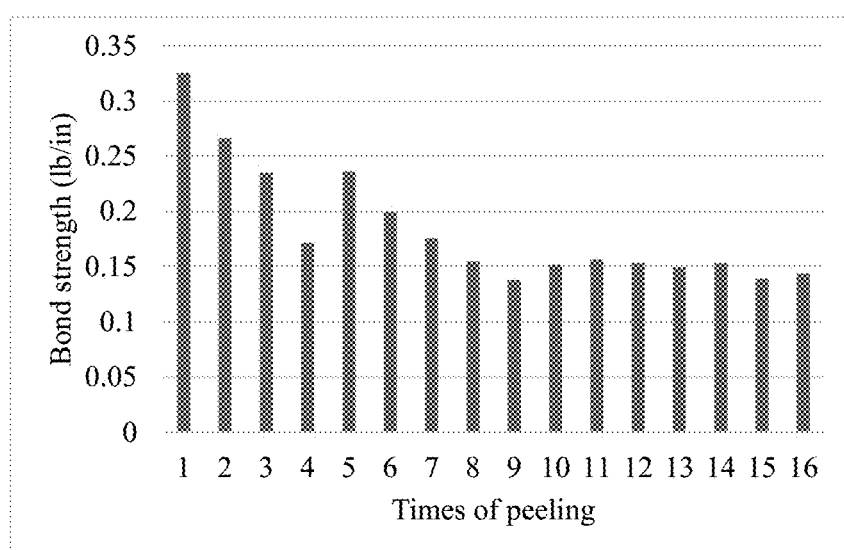
FIG. 10 is a table illustration showing the results of bond strength determinations made for the functionality provided under Example 12 in accordance with an exemplary embodiment of the current invention.

Example 12 illustrates the bond strength of the peelable structure in an exemplary embodiment of the current invention provided as a five layered breathable composite peel/reseal film structure. The peelable layer is adhered to the heat sealable layer through a weak adhesive polymer layer and the adhesive covers the entire surface of the peelable layer. In this example the peelable layer cannot be separated completely from the heat sealable layer as the die-cut in the peelable layer is registered with a portion left non-scored for making sure the peelable layer stays attached to the sealable layer on one end for aid in resealing. The total thickness of the structure is 2.5 mil. ASTM method was utilized to evaluate the bond strength of the peelable structure and the change in bond strength with each peel and reseal. The results, as shown in FIG. 10, indicate that the bond strength is greatest the first time peeling as expected at 0.33 lb/in. The bond strength decreases with repeated peeling and resealing and finally plateaus at 0.14-0.15 lb/in.

Figure 11:
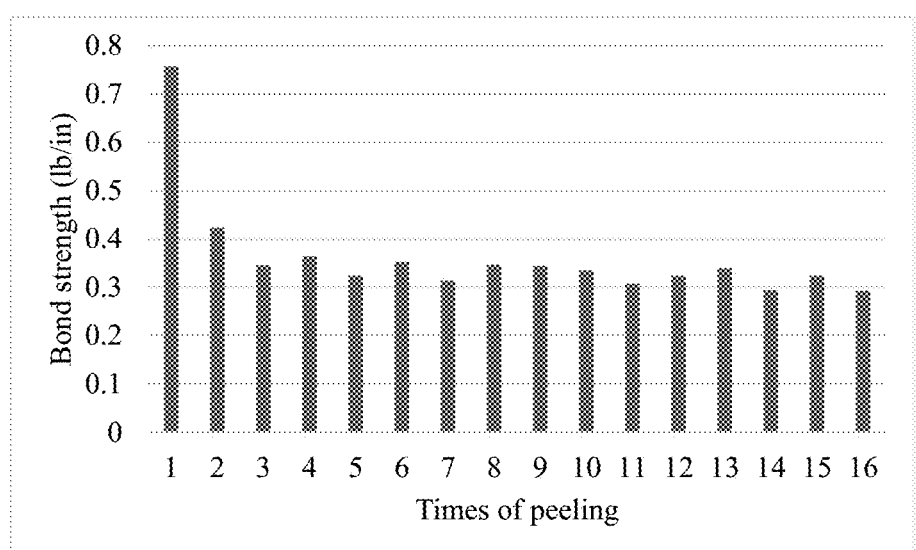
FIG. 11 is a table illustration showing the results of bond strength determinations made for the functionality provided under Example 13 in accordance with an exemplary embodiment of the current invention.

Example 13 illustrates the bond strength of the peelable structure in the three layered breathable composite peel/reseal film structure. The peelable layer is adhered to the heat sealable layer through a weak adhesive polymer layer and the adhesive is registered to selective area between the peelable and heat sealable layer. In this example the peelable layer is more like a label adhered to the heat sealable layer. The total thickness of the structure is 4.2 mil. ASTM method was utilized to evaluate the bond strength of the peelable structure and the change in bond strength with each peel and reseal. The results, as shown in FIG. 11, indicate that the bond strength is greatest the first time peeling as expected at 0.76 lb/in. The bond strength decreases drastically to 0.42 lb/in with the second peel/reseal and finally plateaus at 0.28-0.31 lb/in with subsequent peel/reseal.

Example 14 compares the shelf life of blueberry that were packed in APET trays and sealed with non-breathable peel reseal film (water based adhesive), and breathable peel reseal film (water based adhesive). 5 oz of blueberries were packed in control and a resealable packaging device and the samples were held at 5° C. Standard APET tray sizes were used for the test. The resealable packaging device included a plurality of atmospheric control attributes. In the current resealable packaging device embodiment, the plurality of atmospheric control attributes comprises four (4) macro-perforations of six millimeters (6 mm) in diameter. Assuming the opening of the macro-perforation is circular, the surface area for each opening is equal to $\pi r^2$, where r is equal to $(3000 \times 10^{-6}$ m$)^2$ therefore $\pi r^2$ is equal to $7.07 \times 10^{-6}$ m$^2$. Thus, the open area provided by each of the four macro-perforations may be substantially equal to $2.83 \times 10^{-5}$ m$^2$.

These atmospheric control attributes provide the resealable packaging device embodiment a total Moisture Vapor Transmission Rate (MVTR) of 16.5 g/100 sq. in/day. This MVTR control provided by the current invention, as shown in the table below, promotes desirable atmospheric conditions within the resealable packaging device and thereby provides all the advantages of the current invention. These advantages include the promotion of desirable marketable characteristics, significantly reduced deterioration for longer periods of time and prolonged shelf-life for the food product. The control device, with the non-breathable peel reseal film provides a Moisture Vapor Transmission Rate (MTVR) of 0.52 g/100 sq. in/day. As shown in the table below, this lack of MTVR control fails to provide any of the advantages of the current invention and thereby the food product quality is significantly deteriorated, the observation and/or presence of undesirable marketable characteristics is seen earlier and may be more pronounced and shelf-life is significantly reduced.

The results are shown in table below:

| | Storage at 5° C. |
|---|---|
| Control | Bloating was observed after 5 days. On opening the fruit was soft with strong off-odor notes showing anaerobiosis. The water-based adhesive turned into white glue which affected the presentation and marketing attributes of the product. |
| Invention | The fruit had a firm texture and good flavor up to 26 days of holding at 5° C. The water-based adhesive did not change color and the package looked normal |

Opening and resealing of the resealable packaging device on days 7, 20, and 26 did not affect the quality of the product.

Example 15 compares the shelf life of grape tomato that were packed in APET trays and sealed with non-breathable peel reseal film (water based adhesive), and breathable peel reseal film (water based adhesive). 5 oz of grape tomatoes were packed in control and a resealable packaging device and the samples were held at 5° C. Standard APET tray sizes were used for the test. The resealable packaging device included a plurality of atmospheric control attributes. In the current resealable packaging device embodiment, the plurality of atmospheric control attributes comprises four (4) macro-perforations of twelve millimeters (12 mm) in diameter. Assuming the opening of the macro-perforation is circular, the surface area for each opening is equal to $\pi r^2$, where r is equal to $(6000 \times 10^{-6} \text{ m})^2$ therefore $\pi r^2$ is equal to $2.83 \times 10^{-5}$ m$^2$. Thus, the open area provided by each of the four macro-perforations may be substantially equal to $1.13 \times 10^4$ m$^2$.

These atmospheric control attributes provide the resealable packaging device embodiment a total Moisture Vapor Transmission Rate (MVTR) of 65 g/100 sq. in/day. This MVTR control provided by the current invention, as shown in the table below, promotes desirable atmospheric conditions within the resealable packaging device and thereby provides all the advantages of the current invention. These advantages include the promotion of desirable marketable characteristics, significantly reduced deterioration for longer periods of time and prolonged shelf-life for the food product. The control device, with the non-breathable peel reseal film provides a Moisture Vapor Transmission Rate (MTVR) of 0.52 g/100 sq. in/day. As shown in the table below, this lack of MTVR control fails to provide any of the advantages of the current invention and thereby the food product quality is significantly deteriorated, the observation and/or presence of undesirable marketable characteristics is seen earlier and may be more pronounced and shelf-life is significantly reduced.

The results are shown in table below:

| | Storage at 5° C. |
|---|---|
| Control | Bloating was observed after 3 days. On opening the fruit was soft with strong off-odor notes showing anaerobiosis. The water-based adhesive turned into white glue which affected the presentation and marketing attributes of the product. |
| Invention | The fruit had a firm texture and good aroma up to 18 days of holding at 5° C. The water-based adhesive did not change color and the package looked normal |

Opening and resealing of the resealable packaging device on days 7, 15, and 18 did not affect the quality of the product.

The following examples provide a comparison of the micro- and/or macro-perforation packaging devices of the present invention with the resealable multilayer base film and conventional (non-perforated) packaging devices. Non-resealable perforated base films are used as reference to compare the benefits of resealability on freshness and quality preservation. Comparison of performance characteristics of the packaging devices and the food products contained within are detailed for quality and shelf-life.

While broccoli and tomatoes have been used as test models for this invention, the teachings of this invention may easily be extended to other food product offerings that have respiring perishable/fresh food products, such as fresh produce and/or meats, in their ingredient mixes.

Example 16(a) compares the shelf life of broccoli florets that were packed in APET trays and sealed with non-breathable sealable multilayer base film (control), breathable, sealable, non-reclosable multilayer base film (BSN-R) and breathable, sealable, reclosable multilayer base film (BSR). One pound of broccoli was packed in control, BSN-R and BSR packaging device and the samples were held at 5° C. and 22° C. for 21 days to mimic product distribution. Standard APET tray sizes (205 mm wide, 305 mm length and 120 mm depth) were used for the test. The effective surface area of the sealable film in contact with the storage container was 96.91 sq in.

The BSN-R and BSR, packaging device included twenty-five (25) micro-perforations of one hundred twenty microns (120 μm) in diameter. Assuming the opening of the micro-perforation is circular, the surface area for each opening is equal to $\pi r^e$, where it is equal to 3.14 and r is equal to $(60 \times 10^{-6}$ m) and therefore $r^2$ is equal to $3.6 \times 10^{-9}$ m$^2$. Thus, each opening provides $3.14 \times (3.6 \times 10^{-9}$ m$^2)$ which is equal to $1 \times 10^{-8}$ m$^2$ of open area. Therefore, the open area provided by the twenty-five micro-perforations may be substantially equal to $25 \times (1 \times 10^{-8}$ m$^2)$ which equals $2.8 \times 10^{-7}$ m$^2$.

The use of atmospheric control attributes and inherent gas transmission properties of the materials can provide the packaging device embodiment a total Moisture Vapor Transmission Rate (MVTR) of 0.60 g/100 sq. in/day. This MVTR control provided by the current invention, as shown in the table below, promotes desirable atmospheric conditions within the packaging device and thereby provides all the advantages of the current invention. These advantages include the promotion of desirable marketable characteristics, significantly reduced deterioration for longer periods of time and prolonged shelf-life for the food product. The control device, with the non-breathable film provides a Moisture Vapor Transmission Rate (MTVR) of 0.42 g/100 sq. in/day. As shown in the table below, this lack of breathability fails to provide any of the advantages of the current invention and thereby the food product quality is significantly deteriorated, the observation and/or presence of undesirable marketable characteristics is seen earlier and may be more pronounced and shelf-life is significantly reduced.

|  | Storage at 5° C. | Storage at 22° C. |
| --- | --- | --- |
| Control | Bloating was observed after 2 days. On opening strong off-flavor noticed indicating fermentation. | Bloating was observed within 24 hours. On opening strong off-flavor noticed indicating fermentation. |
| BSN-R | Florets remained green and quality maintained for 21 days | Florets remained green and quality maintained for 6 days |
| BSR | Florets remained green and quality maintained for 21 days | Florets remained green and quality maintained for 6 days |

Example 16(b) compares the shelf life of broccoli florets that were packed in APET trays and sealed with invention. One pound of broccoli was packed En control, BSN-R and BSR packaging device of the current invention and the samples were held at 5° C. The set-up was same as example 1a. In this example, the packaging device was opened on day 7 and resealed. The process was repeated every 3 days, until day 21. The results are shown in the table below. The position of the micro-perforations was designed to allow continued functionality, making BSR film maintain quality and freshness even when the resealable packaging device is opened and resealed multiple times.

|  | Storage at 5° C. |
| --- | --- |
| Control | Bloating was observed on day 3. On opening strong off-flavor noticed indicating fermentation. |
| BSN-R | Florets remained green and quality maintained for 7 days, until the product remained sealed with the BSN-R base film. On day 9, the florets started to dehydrate and wilt and on day 12 yellowing of the florets were observed. |
| BSR | Florets remained green and quality maintained for 21 days |

Example 17 compares the shelf life of pineapple spears that were packed in PP trays and sealed with non-breathable sealable multilayer base film (control), breathable, sealable, non-reclosable multilayer base film (BSN-R) and breathable, sealable, reclosable multilayer base film (BSR). Half a pound of pineapple spears was packed in control, BSN-R and BSR packaging device and the samples were held at 5° C. Square PP trays were used for the test. PP tray sizes (177.8 mm wide, 177.8 mm length and 106.6 mm depth) were used for the test. The effective surface area of the sealable film in contact with the storage container was 49 sq in.

The packaging device included four (4) micro-perforations of one hundred microns (100 μm) in diameter. Assuming the opening of the micro-perforation is circular, the surface area for each opening is equal to $\pi r^e$, where r is equal to $(50 \times 10^{-6}$ m$)2$ and therefore $r^2$ is equal to $2.5 \times 10^{-9}$ m$^2$. Thus, each opening provides $3.14 \times (2.5 \times 10^{-9}$ m$^2)$ which is equal to $7.85 \times 10^{-9}$ m$^2$ of open area. Therefore, the open area provided by the four micro-perforations may be substantially equal to $4 \times (7.85 \times 10^{-9}$ m$^2)$ which equals $3 \times 10^{-8}$ m$^2$.

The use of atmospheric control attributes and inherent gas transmission properties of the materials can provide the packaging device embodiment a total Moisture Vapor Transmission Rate (MVTR) of 0.50 g/100 sq. in/day. This MVTR control provided by the current invention, as shown in the table below, promotes desirable atmospheric conditions within the packaging device and thereby provides all the advantages of the current invention. These advantages include the promotion of desirable marketable characteristics, significantly reduced deterioration for longer periods of time and prolonged shelf-life for the food product. The control device, with the non-breathable film provides a Moisture Vapor Transmission Rate (MTVR) of 0.42 g/100 sq. in/day. As shown in the table below, the lack of breathability control fails to provide any of the advantages of the current invention and thereby the food product quality is significantly deteriorated, the observation and/or presence of undesirable marketable characteristics is seen earlier and may be more pronounced and shelf-life is significantly reduced.

The quality results are shown in the table below:

|  | Storage at 5° C. for 14 days | Storage at 5° C. and film opened on day 7 |
| --- | --- | --- |
| Control | Bloating was observed after 3 days. On opening strong off-flavor and tissue breakdown noticed indicating fermentation. | Bloating was observed after 3 days. On opening strong off-flavor and tissue breakdown noticed indicating fermentation. |
| BSN-R | Color was maintained and the pineapple spears had an acceptable texture for 14 days | On day 9 the spears started to brown and show tissue damage. |
| BSR |  | Color was maintained and the pineapple spears had an acceptable texture for 14 days |

Example 18 compares the shelf life of grape tomato that were packed in APET trays and sealed With non-breathable sealable multilayer base film (control), breathable, sealable, non-reclosable multilayer base film (BSN-R) and breathable, sealable, reclosable multilayer base film (BSR). One pound of grape tomatoes was packed in control, BSN-R and BSR packaging device and the samples were held at 5° C. Standard APET tray sizes were used for the test. Standard APET tray sizes (205 mm wide, 305 mm length and 120 mm depth) were used for the test. The effective surface area of the sealable film in contact with the storage container was 96.91 sq in.

The packaging device included a plurality of atmospheric control attributes. In the current resealable packaging device embodiment, the plurality of atmospheric control attributes comprises twenty (20) macro-perforations of twelve millimeters (12 mm) in diameter. Assuming the opening of the macro-perforation is circular, the surface area for each opening is equal to $\pi r^2$, where r is equal to $(6000 \times 10^{-6}$ m$)^2$ therefore $\pi r^2$ is equal to $2.83 \times 10^{-5}$ m$^2$. Thus, the open area provided by each of the twenty macro-perforations may be substantially equal to $20 \times 1.13 \times 10^4$ m$^2$ ($2.26 \times 10^{-4}$ m$^2$).

These atmospheric control attributes provide the packaging device embodiment a total Moisture Vapor Transmission Rate (MVTR) of 0.50 g/100 sq. in/day. This MVTR control provided by the current invention, as shown in the table below, promotes desirable atmospheric conditions within the packaging device and maintains it in the device, thereby provides all the advantages of the current invention. These advantages include the promotion of desirable marketable characteristics, significantly reduced deterioration for longer periods of time and prolonged shelf-life for the food product. The control device, with the non-breathable film provides a Moisture Vapor Transmission Rate (MTVR) of 0.42 g/100 sq. in/day. As shown in the table below, this lack of MTVR control fails to provide any of the advantages of the current invention and thereby the food product quality is significantly deteriorated, the observation and/or presence of undesirable marketable characteristics is seen earlier and may be more pronounced and shelf-life is significantly reduced.

| | Storage at 5° C. for 21 days | Storage at 5° C. and film opened on day 7 |
|---|---|---|
| Control | Bloating was observed after 4 days. On opening the fruit was soft with strong off-odor notes showing anaerobiosis and fungal growth near the stem area | Bloating was observed after 4 days. On opening strong off-flavor and tissue breakdown noticed indicating fermentation. On day 12 the tomatoes started to shrivel and about 3% weight loss observed. Color was maintained and minimal to no weight loss observed. The product maintained quality |
| BSN-R | Color was maintained and minimal to no weight loss observed. The product maintained quality | |
| BSR | | |

Figure 12:
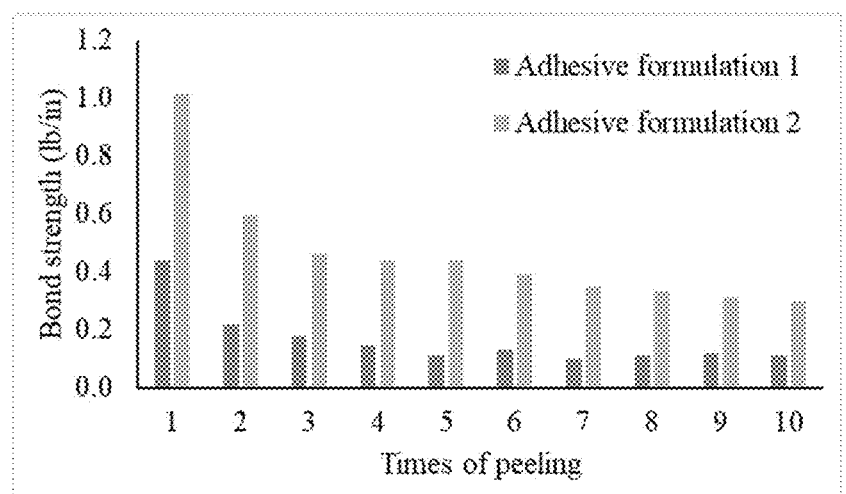
FIG. 12 is a table illustration showing the results of bond strength determinations made for the functionality provided under Example 19 in accordance with an exemplary embodiment of the current invention.

Example 19 illustrates the bond strength of the peelable structure in an exemplary embodiment of the current invention. Two adhesive film formulations, one with solids content of 50% (Adhesive formulation 1) and another one with solids content of 60% (Adhesive formulation 2) were coated onto 3 layer co-extruded film. The coextruded film comprised of various proportions of low density polyethylene (LDPE), high density polyethylene (HDPE), modified ethylene acrylate (DuPont, USA), melthene MX66A (Tosh Corporation, Japan). The peelable film is adhered directly to an APET tray using two adhesive formulations. The total thickness of the structure is 2.5 mil. ASTM method was utilized to evaluate the bond strength of the peelable structure and the change in bond strength with each peel and reseal. The results, as shown in FIG. 12, indicate that the bond strength is greatest the first time peeling as expected at 0.44 and 1.01 lb/in for adhesive formulations 1 and 2, respectively. The bond strength decreases with repeated peeling and resealing and finally plateaus at 0.10-0.13 and 0.30-0.33 lb/in for adhesive formulation 1 and 2, respectively.

Figure 13:
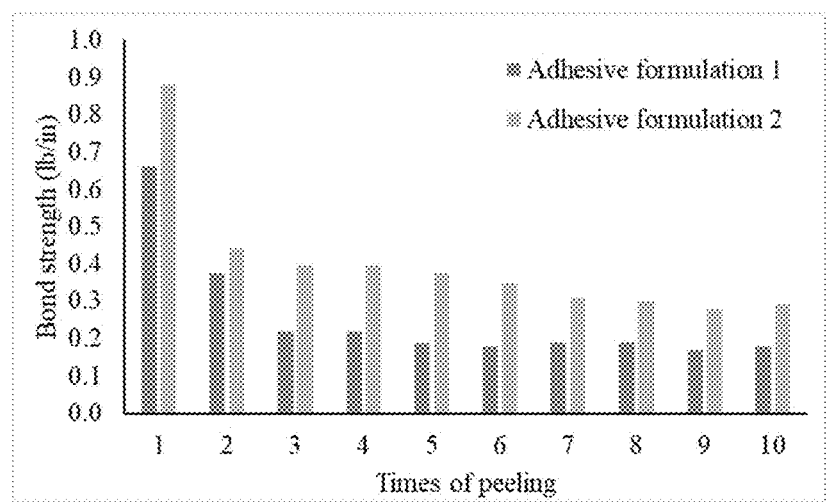
FIG. 13 is a table illustration showing the results of bond strength determinations made for the functionality provided under Example 20 in accordance with an exemplary embodiment of the current invention.

Example 20 illustrates the bond strength of the peelable structure in an exemplary embodiment of the current invention. Two adhesive film formulations, one with solids content of 50% (Adhesive formulation 1) and another one with solids content of 60% (Adhesive formulation 2) were coated onto 3 layer co-extruded film. The coextruded film comprised of various proportions of low density polyethylene (LDPE), high density polyethylene (HDPE), modified ethylene acrylate (DuPont, USA), melthene MX02D (Tosh Corporation, Japan). The peelable film is adhered directly to a PP tray using two adhesive formulations. The total thickness of the structure is 2.5 mil. ASTM method was utilized to evaluate the bond strength of the peelable structure and the change in bond strength with each peel and reseal. The results, as shown in FIG. 13, indicate that the bond strength is greatest the first time peeling as expected at 0.66 and 0.88 lb/in for adhesive formulation 1 and 2, respectively. The bond strength decreases with repeated peeling and resealing and finally plateaus at 0.17-0.19 and 0.28-0.31 lb/in for adhesive formulation 1 and 2, respectively.

The current invention provides significant benefits over the prior art and/or previous food product storage technologies. The exemplary embodiments of the resealable films, resealable packaging devices and methods of the instant invention can be used by various food product suppliers/distributors and consumers for promoting the extension of the shelf life of food products stored within, whether purchased as items in such packages and/or as loose items from various outlets, such as supermarkets, convenience stores or the like. Use of the current invention also allows food products to be packed, distributed, marketed and/or consumed in units of varying amounts (single to multiple items), volumes, weights and sizes further supporting marketing applications that may be geared towards more non-traditional outlets, such as the convenience store market. Still further, the food products stored in embodiments of the current invention promote quality preservation by more effectively withstanding the negative conditions experienced during transportation throughout the distribution and handling from the country or countries of production to the consuming markets than what had been provided previously in the art.

The improved quality preservation capabilities provided by the current invention hold food product at more preferred stages of ripeness for prolonged periods, thereby giving consumers an opportunity to consume food products at the preferred stages of ripeness. This quality preservation can promote additional commercially advantageous characteristics, such as further promoting improved per capita consumption, reducing wastage at the supermarket and household levels, promoting new product offering capabilities (i.e., product differentiation and brand recognition) and/or improving consumer satisfaction.

The invention has been described with references to various preferred embodiments. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

The invention claimed is:

1. A resealable packaging device, comprising:
   a flexible base film, designed for operational connection with a container, providing a resealable connection with at least a portion of the container to provide an opening when peeled away from the container;
   one or more atmospheric control attributes in the flexible base film, configured as at least one perforation, wherein the one or more atmospheric control attributes provides the flexible base films a total open area of 1.5×10-11 m2 to 1.5×10-4 m2 and having a length dimension that penetrates through the flexible base film;
   a container configured with a base section connected to one or more side wall sections forming a storage structure having an open top edge for operationally connecting with the flexible base film, wherein the flexible base film in operational connection with the top edge forms an inner surface defining an enclosure within which an interior atmosphere can be provided and food product can be stored and an outer surface in contact with an exterior environment; and wherein the atmospheric control attributes provides the enclosure, when flexible base film is peeled and resealed to the container, an oxygen transmission rate between the interior atmosphere and exterior environment of at least 50 cc/100-sq inch/day which allows respiration of the food product packaged within the enclosure and maintenance of the interior atmosphere with an O2 content of ≥0.5% and relative humidity of ≥60% during at least a portion of the food product life-cycle within the enclosure.

2. The resealable packaging device of claim 1, wherein the perforations comprise micro-perforations having a diameter of 1-600 μm and are present at a density of 1-100 micro-perforations per unit package and the micro-perforations can further comprise at least one diameter size of: (i) 75 microns (75 μm) providing a per perforation open area of $4.415625 \times 10^{-9}$ m$^2$; (ii) 90 microns (90 μm) providing a per perforation open area of $6.3585 \times 10^{-9}$ m$^2$; (iii) 100 microns (100 μm) providing a per perforation open area of $7.85 \times 10^{-9}$ m$^2$; (iv) 120 microns (120 μm) providing a per perforation open area of $1 \times 10^{-8}$ m$^2$; (v) 130 microns (130 μm) providing a per perforation open area of $1 \times 10^{-8}$ m$^2$; (vi) 150 microns (150 μm) providing a per perforation open area of $2 \times 10^{-8}$ m$^2$; and (vii) 240 microns (240 μm) providing a per perforation open area of $5 \times 10^{-8}$ m$^2$.

3. The resealable packaging device of claim 2, wherein the micro-perforations comprise at least one of (i) one to one hundred (1-100) micro-perforations, wherein each micro-perforation has a diameter of one hundred microns (100 μm); (ii) one to one hundred (1-100) micro-perforations, wherein each micro-perforation has a diameter of one hundred thirty microns (130 μm); (iii) one to one hundred and fifty (1-150) micro-perforations, wherein each micro-perforation has a diameter of approximately seventy-five microns (75 μm); and (iv) ten (10) micro-perforations, wherein each micro-perforation has a diameter of one hundred microns (100 μm) to two hundred and forty microns (240 μm).

4. The resealable packaging device of claim 3, wherein the total open area provided by the atmospheric control attributes ranges from at least one of $7.85 \times 10^{-9}$ m$^2$ to $7.85 \times 10^{-7}$ m$^2$; $1.33 \times 10^{-8}$ m$^2$ to $1.33 \times 10^{-6}$ m$^2$; $4.42 \times 10^{-9}$ m$^2$ to $6.62 \times 10^{-7}$ m$^2$; and $7.85 \times 10^{-8}$ m$^2$ to $4.52 \times 10^{-7}$ m$^2$.

5. The resealable packaging device of claim 1, wherein the atmospheric control attributes provided are configured in at least one of (i) twenty-five (25) micro-perforations of one hundred twenty microns (120 μm) in diameter providing a total open area of $2.8 \times 10^{-7}$ m$^2$; (ii) four (4) micro-perforations of one hundred microns (100 μm) in diameter providing a total open area of $3 \times 10^{-8}$ m$^2$; (iii) eight (8) micro-perforations of one hundred microns (100 μm) in diameter providing a total open area of $6 \times 10^{-8}$ m$^2$; (iv) nine (9) micro-perforations of one hundred microns (100 μm) in diameter providing a total open area of $7 \times 10^{-8}$ m$^2$; (v) fifteen (15) micro-perforations of one hundred microns (100 μm) in diameter providing a total open area of $1.2 \times 10^{-7}$ m$^2$; (vi) one (1) micro-perforations of ninety microns (90μ) in diameter providing a total open area of $6.3585 \times 10^{-9}$ m$^2$; (vii) ten (10) micro-perforations of one hundred and twenty microns (120 μm) in diameter providing a total open area of $1.1 \times 10^{-7}$ m$^2$; and (viii) five (5) micro-perforations of one hundred microns (100 μm) in diameter providing a total open area $4 \times 10^{-8}$ m$^2$.

6. The resealable packaging device of claim 1, wherein the atmospheric control attributes provided are configured as at least one macro-perforation having a per unit package number comprising at least one of (i) one (1) to thirty (30); (ii) two (2) to fifteen (15); and three (3) to ten (10), and wherein each macro-perforation has a diameter of six hundred microns (600 μm) to 800 microns (800 μm).

7. The resealable packaging device of claim 1, wherein a gas transmission rate is modulated such that for a period of time the interior atmosphere can comprise at least one of:

(A) an O2 content of at least one of (i) 0.5% to 20%, (ii) >2%, and (iii) >5% to less than 15%, wherein the rate of oxygen transmission is, in units of cubic centimeters per 100 square inches per day, 50 or higher, and the rate of transmission of oxygen is, in units of cubic centimeters per 100 square inches per day, 100,000 or lower;

(B) a CO2 content of at least one of (i) 1% to 25%, (ii) >2% and (iii)<15%, wherein the rate of carbon dioxide is, in units of cubic centimeters per 100 square inches per day, 100 or higher and the rate of transmission of carbon dioxide is, in units of cubic centimeters per 100 square inches per day, 200,000 or lower; and (C) a relative humidity (RH) of 60% to 100%, wherein the total transmission rate of water vapor is, in units of grams per 100 square inches per day is, 0.01 or higher and the rate of transmission of water vapor is, in units of grams per 100 square inches per day, 100 or lower.

8. The resealable packaging device of claim 1, wherein at least a first portion of the flexible base film is heat sealed to at least a first portion of the top edge of the container and a resealable portion of the flexible base film is between at least one of 10% to 90%, 25% to 75% and 35% to 60% of the total surface area of the flexible base film.

9. A resealable packaging device, comprising:
a flexible base film, designed for making an operational connection of a resealing section of the flexible base film with a container, the operational connection providing a resealable connection with at least a portion of the container to provide an opening when peeled away from the container;

one or more atmospheric control attributes in the flexible base film, configured as at least one perforation, wherein the one or more atmospheric control attributes provides the flexible base films a total open area of $1.5 \times 10^{-11}$ m$^2$ to $1.5 \times 10^{-4}$ m$^2$ and having a length dimension that penetrates through the flexible base film;

a container configured with a base section connected to one or more side wall sections forming a storage structure having an open top edge for operationally connecting with the flexible base film, wherein the flexible base film in operational connection with the top edge forms an inner surface defining an enclosure within which the interior atmosphere can be provided and food product can be stored and an outer surface in contact with an exterior environment; and wherein the atmospheric control attributes provides the enclosure, when flexible base film is peeled and resealed to the container, an oxygen transmission rate between the interior atmosphere and exterior environment of at least 50 cc/100-sq inch/day which allows respiration of the food product packaged within the enclosure and maintenance of the interior atmosphere with an $O_2$ content of ≥0.5% and relative humidity of ≥60% during at least a portion of the food product life-cycle within the enclosure.

10. The resealable packaging device of claim 9, wherein the resealing section of the flexible base film is between at least one of 25% to 75% of the total surface area of the flexible base film.

11. The resealable packaging device of claim 9, wherein a pressure sensitive adhesive is included in the base film to promote the operational connection and the pressure sensitive adhesive is a respiratory condensate resistant adhesive that in conjunction with the atmospheric control attributes, provides a transmission rate based on units of grams per 100 square inches per day of 0.01 or higher for water vapor content present in an interior atmosphere of the resealable packaging device.

12. The resealable packaging device of claim 9, wherein the perforations comprise micro-perforations having a diameter of 1-600 μm and are present at a density of 1-100 micro-perforations per unit package and the micro-perforations can further comprise at least one diameter size of: (i) 75 microns (75 μm) providing a per perforation open area of $4.415625 \times 10^{-9}$ m$^2$; (ii) 90 microns (90 μm) providing a per perforation open area of $6.3585 \times 10^{-9}$ m$^2$; (iii) 100 microns (100 μm) providing a per perforation open area of $7.85 \times 10^{-9}$ m$^2$; (iv) 120 microns (120 μm) providing a per perforation open area of $1 \times 10^{-8}$ m$^2$; (v) 130 microns (130 μm) providing a per perforation open area of $1 \times 10^{-8}$ m$^2$; (vi) 150 microns (150 μm) providing a per perforation open area of $2 \times 10^{-8}$ m$^2$; and (vii) 240 microns (240 μm) providing a per perforation open area of $5 \times 10^{-8}$ m$^2$.

13. The resealable packaging device of claim 12, wherein the micro-perforations comprise at least one of (i) one to one hundred (1-100) micro-perforations, wherein each micro-perforation has a diameter of one hundred microns (100 μm); (ii) one to one hundred (1-100) micro-perforations, wherein each micro-perforation has a diameter of one hundred thirty microns (130 μm); (iii) one to one hundred and fifty (1-150) micro-perforations, wherein each micro-perforation has a diameter of approximately seventy-five microns (75 μm); and (iv) ten (10) micro-perforations, wherein each micro-perforation has a diameter of one hundred microns (100 μm) to two hundred and forty microns (240 μm).

14. The resealable packaging device of claim 13, wherein the total open area provided by the atmospheric control attributes ranges from at least one of $7.85 \times 10^{-9}$ m$^2$ to $7.85 \times 10^{-7}$ m$^2$; $1.33 \times 10^{-8}$ m$^2$ to $1.33 \times 10^{-6}$ m$^2$; $4.42 \times 10^{-9}$ m$^2$ to $6.62 \times 10^{-7}$ m$^2$; and $7.85 \times 10^{-8}$ m$^2$ to $4.52 \times 10^{-7}$ m$^2$.

15. The resealable packaging device of claim 9, wherein the atmospheric control attributes provided are configured in at least one of (i) twenty-five (25) micro-perforations of one hundred twenty microns (120 μm) in diameter providing a total open area of $2.8 \times 10^{-7}$ m$^2$; (ii) four (4) micro-perforations of one hundred microns (100 μm) in diameter providing a total open area of $3 \times 10^{-8}$ m$^2$; (iii) eight (8) micro-perforations of one hundred microns (100 μm) in diameter providing a total open area of $6 \times 10^{-8}$ m$^2$; (iv) nine (9) micro-perforations of one hundred microns (100 μm) in diameter providing a total open area of $7 \times 10^{-8}$ m$^2$; (v) fifteen (15) micro-perforations of one hundred microns (100 μm) in diameter providing a total open area of $1.2 \times 10^{-7}$ m$^2$; (vi) one (1) micro-perforations of ninety microns (90μ) in diameter providing a total open area of $6.3585 \times 10^{-9}$ m$^2$; (vii) ten (10) micro-perforations of one hundred and twenty microns (120 μm) in diameter providing a total open area of $1.1 \times 10^{-7}$ m$^2$; and (viii) five (5) micro-perforations of one hundred microns (100 μm) in diameter providing a total open area $4 \times 10^{-8}$ m$^2$.

16. The resealable packaging device of claim 9, wherein the atmospheric control attributes provided are configured as at least one macro-perforation having a per unit package number comprising at least one of (i) one (1) to thirty (30); (ii) two (2) to fifteen (15); and three (3) to ten (10), and wherein each macro-perforation has a diameter of six hundred microns (600 μm) to 800 microns (800 μm).

17. The resealable packaging device of claim 9, wherein a gas transmission rate is modulated such that for a period of time the interior atmosphere can comprise at least one of:
(A) an O2 content of at least one of (i) 0.5% to 20%, (ii) >2%, and (iii) >5% to less than 15%, wherein the rate of oxygen transmission is, in units of cubic centimeters per 100 square inches per day, 50 or higher and the rate of transmission of oxygen is, in units of cubic centimeters per 100 square inches per day, 100,000 or lower;
(B) a $CO_2$ content of at least one of (i) 1% to 25%, (ii) >2% and (iii)<15%, wherein the rate of carbon dioxide is, in units of cubic centimeters per 100 square inches per day, 100 or higher and the rate of transmission of carbon dioxide is, in units of cubic centimeters per 100 square inches per day, 200,000 or lower; and
(C) a relative humidity (RH) of 60% to 100%, wherein the total transmission rate of water vapor is, in units of grams per 100 square inches per day, 0.01 or higher; and the rate of transmission of water vapor is, in units of grams per 100 square inches per day, 100 or lower.

18. A resealable packaging device, comprising:
a flexible base film, designed for operational connection with a container, providing a resealable connection with at least a portion of the container to provide an opening when peeled away from the container;
one or more atmospheric control attributes in the flexible base film, configured as at least one perforation, wherein the at least one perforation comprise at least one macro-perforation ranging in number from one (1) to fifty (50) macro-perforations, each macro-perforation having a diameter greater than six hundred microns (600 μm) and having a length dimension that penetrates through the flexible base film;
wherein the atmospheric control attributes, provides a transmission rate based on units of grams per 100 square inches per day of 0.01 or higher for water vapor content present in an interior atmosphere of the resealable packaging device;
a container configured with a base section connected to one or more side wall sections forming a storage structure having an open top edge for operationally connecting with the flexible base film, wherein the flexible base film in operational connection with the top edge forms an inner surface defining an enclosure within which the interior atmosphere can be provided and food product can be stored and an outer surface in contact with an exterior environment; and
wherein the atmospheric control attributes provides the enclosure, when flexible base film is peeled and resealed to the container, an oxygen transmission rate between the interior atmosphere and exterior environment of at least 50 cc/100-sq inch/day which allows respiration of the food product packaged within the enclosure and maintenance of the interior atmosphere with a relative humidity of ≥60% during at least a portion of the food product life-cycle within the enclosure.

19. The resealable packaging device of claim 18, wherein the at least one macro-perforations has a number comprising at least one of (i) one (1) to thirty (30); (ii) two (2) to fifteen (15); and three (3) to ten (10), and wherein each perforation has a diameter of at least one of (i) six hundred microns (600 μm) to 800 microns (800 μm); (ii) thirteen (13) to thirty (30) millimeters; (iii) one (1) to twelve (12) millimeters; and (iv) three (3) to six and a half (6.5) millimeters, and wherein the total open area provided by the macro-perforations ranges from $8.45 \times 10^{-7}$ m$^2$ to $2.26 \times 10^{-3}$ m$^2$.

20. The resealable packaging device of claim 19, wherein the atmospheric control attributes provided are twenty (20) macro-perforations of twelve (12 mm) millimeters in diameter providing a total open area of $2.26 \times 10^{-3}$ m$^2$.

* * * * *